United States Patent

Ishihara et al.

[11] Patent Number: 5,949,486
[45] Date of Patent: Sep. 7, 1999

[54] UNIT FOR DETECTING MOTION VECTOR FOR MOTION COMPENSATION

[75] Inventors: Kazuya Ishihara; Shinichi Uramoto; Tetsuya Matsumura; Satoshi Kumaki; Atsuo Hanami, all of Hyogo; Shinichi Masuda, Tokyo, all of Japan

[73] Assignees: Mitsubishi Denki Kabushiki Kaisha; Mitsubishi Electric Engineering Co., Ltd., both of Tokyo, Japan

[21] Appl. No.: 08/795,217

[22] Filed: Feb. 5, 1997

[30] Foreign Application Priority Data

Sep. 3, 1996  [JP]  Japan ................................. 8-233364

[51] Int. Cl.[6] ........................................................ H04N 7/12
[52] U.S. Cl. ........................... 348/402; 348/416; 348/420; 348/699
[58] Field of Search ..................... 348/416, 699, 348/402, 407, 409, 411, 412, 413, 415, 420, 714, 715, 716, 718, 403; 382/209, 217, 232, 236, 238; H04N 7/12

[56] References Cited

U.S. PATENT DOCUMENTS

| | | | |
|---|---|---|---|
| 5,398,079 | 3/1995 | Liu et al. ................................ | 348/699 |
| 5,400,087 | 3/1995 | Uramoto et al. . | |
| 5,568,203 | 10/1996 | Lee ......................................... | 348/699 |
| 5,594,813 | 1/1997 | Fandrianto et al. ..................... | 348/415 |
| 5,604,546 | 2/1997 | Iwata ....................................... | 348/699 |
| 5,696,836 | 12/1997 | Yoshino et al. ......................... | 348/699 |
| 5,737,020 | 4/1998 | Hall et al. ............................... | 348/403 |

FOREIGN PATENT DOCUMENTS 2-265387  10/1990  Japan .
6-96209   4/1994   Japan .

OTHER PUBLICATIONS

F. Jutand, "A Versatile and Powerfull Chip for Real Time Motion Estimation" 1989, pp. 2453–2456.

*Primary Examiner*—Tommy P. Chin
*Assistant Examiner*—Y. Lee
*Attorney, Agent, or Firm*—McDermott, Will & Emery

[57] ABSTRACT

Each of element processors arranged in correspondence to pixels of a template block and a search window block respectively includes an A register and a B register provided in parallel with each other for storing search window block pixel data respectively, and a T register for storing template block pixel data. Motion vector evaluation value calculation is performed through a first one of the A and B registers and the pixel data stored in the T register, while operated data is transferred to the second one of the A and B registers from the first one of the A and B registers in parallel with the calculation operation, for storing head search window block pixel data of a next search window. A motion vector is detected at a high speed in excellent coding efficiency.

13 Claims, 49 Drawing Sheets

TB1e : (0, −2) FOR ODD FIELD
TB1o : (0, −1) FOR EVEN FIELD
TB1 :     (0, −3)

IN A REGISTER

IN DATA BUFFER

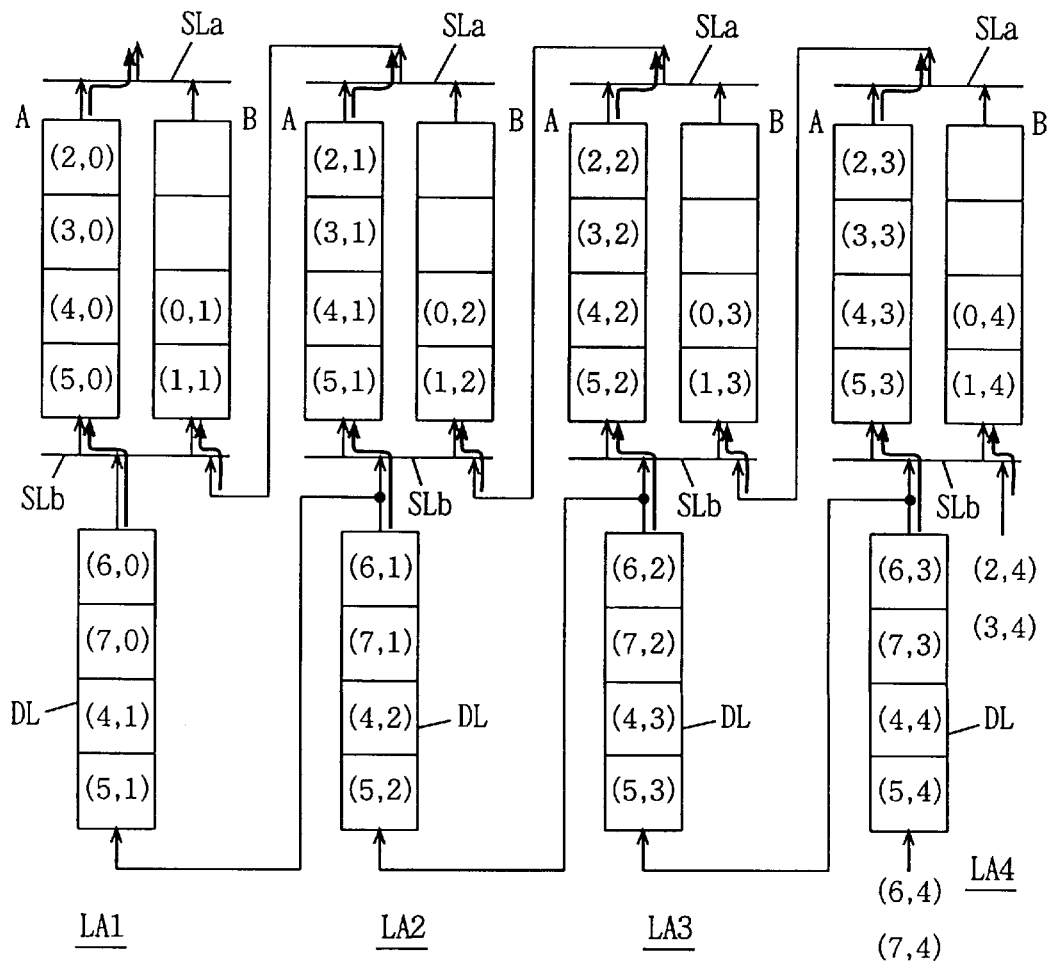

SEARCH WINDOW CHANGE

PIXELS IN COMMON FIELD

| | #1 | #2 | #3 | #4 | #5 | #6 | #7 | | #N-2 | #N-1 | #N |
|---|---|---|---|---|---|---|---|---|---|---|---|
| T1 REGISTER | S1 | S2 | LOAD | S4 | S5 | S6 | LOAD | | SN-2 | SN-1 | LOAD |
| | N1 | N1 | | N4 | N4 | N4 | | | NN-2 | NN-2 | |
| T2 REGISTER | S1 | S2 | S3 | LOAD | S5 | S6 | S7 | LOAD | SN-2 | SN-1 | SN |
| | N2 | N2 | N2 | | N5 | N5 | N5 | | NN-1 | NN-1 | NN-1 |
| T3 REGISTER | LOAD | S2 | S3 | S4 | LOAD | S6 | S7 | | LOAD | SN-1 | SN |
| | | N3 | N3 | N3 | | N6 | N6 | | | NN | NN |

| | | | | | | | |
|---|---|---|---|---|---|---|---|
| SUBSEARCH AREA | S1 | S2 | S3 | S4 | -------- | SN-1 | SN |
| TEMPLATE BLOCK | N1 | N2 | N3 | N4 | -------- | NN-1 | NN |

FIG. 56

| WRITE ADDRESS | 0 | 1 | 2 | 3 | 4 | 5 | 6 | 7 | 0 | 1 | 2 | 3 | 4 | 5 | 6 | 7 |
|---|---|---|---|---|---|---|---|---|---|---|---|---|---|---|---|---|
| READ ADDRESS | 4 | 5 | 6 | 7 | 0 | 1 | 2 | 3 | 4 | 5 | 6 | 7 | 0 | 1 | 2 | 3 |
| INPUT PIXEL | SY1 | SY2 | SY3 | SY4 | SY5 | SY6 | SY7 | SY8 | SY9 | SY10 | SY11 | SY12 | SY13 | SY14 | SY15 | SY16 |
| OUTPUT PIXEL | INVALID DATA | | | | SY1 | SY2 | SY3 | SY4 | SY5 | SY6 | SY7 | SY8 | SY9 | SY10 | SY11 | SY12 |

UNIT FOR DETECTING MOTION VECTOR FOR MOTION COMPENSATION

BACKGROUND OF THE INVENTION

1. Field of the Invention

The present invention relates to a unit for detecting a motion vector which is employed for motion compensation for predictive-coded motion picture.

2. Description of the Background Art

In order to transmit or store image signals having an enormous data quantity, a data compression technique for reducing the data quantity is indispensable. Image data have considerable redundancy resulting from correlation between adjacent pixels, human perception and the like. A data compression technique of suppressing the data redundancy for reducing the transmission data quantity is called high efficiency coding. Such high efficiency coding includes inter-frame (-field) predictive coding. In the inter-frame (-field) predictive coding, the following processing is executed:

A predictive error which is the difference between each pixel data of a current screen image (frame or field) to be currently coded and each pixel data of the same position of a referred preceding screen image is calculated. The calculated predictive error is employed for subsequent coding. According to this method, an image having a small motion can be coded in high efficiency, due to high correlation between the screen images. As to an image having a large motion, however, the error is increased due to small correlation between the screen images, and hence the transmission data quantity is disadvantageously increased.

Inter-frame (-field) predictive coding with motion compensation is adapted to solve the aforementioned problem. In this method, the following processing is executed: Before calculation of a predictive error, a motion vector is calculated through pixel data of a current screen (frame or field) and a preceding screen. A predictive image of the preceding screen is moved in accordance with the calculated motion vector. Image data of the preceding screen in a position displaced by the motion vector is regarded as a reference pixel, which in turn is employed as a predictive value. Then, a predictive error between respective pixels of the preceding and current screen images following this motion is calculated, so that the predictive error and the motion vector are transmitted.

FIG. 58 is a block diagram schematically illustrating the overall structure of an encoder for coding image data in accordance with a conventional predictive coding system with motion compensation. Referring to FIG. 58, the encoder includes a preprocessing circuit 910 for executing prescribed preprocessing on an inputted image signal, a source coding circuit 912 for executing elimination of redundancy on the signal preprocessed by the preprocessing circuit 910 and quantization of the input signal, and a video multiplex coding circuit 914 for coding the signal from the source coding circuit 912 in accordance with a prescribed format for multiplex into a code train of a predetermined data structure.

The preprocessing circuit 910 transforms the input image signal to a common intermediate format (CIF) through time and space filters, and executes filter processing for noise elimination.

The source coding circuit 912 performs orthogonal transform processing such as discrete cosine transformation (DCT) on the supplied signal as well as motion compensation on the input signal, and quantizes the orthogonally transformed image data.

The video multiplex coding circuit 914 performs two-dimensional variable length coding on the supplied image signal while executing variable-length coding on various attributes (such as a motion vector) of a block which is a unit of data processing, and thereafter multiplexes the same to a code train of the predetermined data structure.

The encoder further includes a transmission buffer 916 for buffer the image data from the video multiplex coding circuit 914, and a transmission coding circuit 918 for adapting the image data from the transmission buffer 916 to a transmission channel.

The transmission buffer 916 smoothes an information generating rate to a constant level. The transmission coding circuit 918 executes addition of an error correction bit, voice signal data and the like.

FIG. 59 illustrates an exemplary structure of the source coding circuit 912 shown in FIG. 58. Referring to FIG. 59, the source coding circuit 912 includes a motion compensation predictor 920 for detecting a motion vector for the input image signal supplied from the preprocessing circuit 910 and forming a reference image motion-compensated in accordance with the motion vector, a loop filter 922 for performing filter processing on reference image pixel data from the motion compensation predictor 920, a subtracter 924 for obtaining the difference between an output of the loop filter 922 and the input image signal, an orthogonal transformer 926 for orthogonally transforming an output of the subtracter 924, and a quantizer 928 for quantizing the data orthogonally transformed by the orthogonal transformer 926.

The motion compensation predictor 920, the structure of which is described later, includes a frame memory for storing pixel data preceding by one frame (in case of inter-frame predictive coding), for detecting the motion vector and forming motion-compensated reference image pixel data in accordance with input image signal data (pixel data) and pixel data in this frame memory. The loop filter 922 is provided to improve the picture quality.

The orthogonal transformer 926 performs orthogonal transformation such as DCT on data from the subtracter 924, in a block of a prescribed size (8 by 8 pixels, in general) as a unit. The quantizer 928 quantizes the orthogonally transformed pixel data.

The motion compensation predictor 920 and the subtracter 924 execute inter-frame prediction (or inter-field prediction) with motion compensation, for eliminating temporal redundancy in a motion image. On the other hand, the orthogonal transformer 926 performs orthogonal transformation, for eliminating spatial redundancy in a motion image signal.

The source coding circuit 912 further includes an inverse quantizer 930 for transforming the data quantized by the quantizer 928 to a signal state before the quantization, an inverse orthogonal transformer 932 for performing inverse orthogonal transformation on an output of the inverse quantizer 930, and an adder 934 for adding up outputs of the loop filter 922 and the inverse orthogonal transformer 932. The inverse quantizer 930 and the inverse orthogonal transformer 932 form an image employed for inter-frame prediction (or inter-field prediction) for a next frame (or field). The formed pixel data is written in the frame memory included in the motion compensation predictor 920. The adder 934 adds the image signal (inter-frame (-field) difference data) to the output of the loop filter 922, whereby image pixel data of a current frame (field) is reproduced. In general, the inverse quantization processing, the inverse orthogonal transform processing and the addition processing are called local decoding processes. Calculation of a motion vector is now specifically described as to a frame image. Block matching is generally employed for calculation of a motion vector.

Consider that an image A in an (m−1)-th frame moves to A' in an m-th frame, as shown in FIG. 60A. In the block matching, a screen (one frame in this case) is divided into blocks of P by Q pixels (P=Q in general). A block which is most approximate to that of interest in the current frame is found out from a preceding frame. The displacement from the block of interest to the most approximate block in the preceding screen is called "motion vector". This method is now described in more detail.

As shown in FIG. 60B, the m-th frame is regarded as a target frame to be coded. The frame is divided into blocks of N by N pixels (P=Q=N). It is assumed here that Xm(Nk, Nl) represents the value of pixel data in the left upper pixel position (Nk, Nl) in each block of N by N pixels in the m-th frame. The sum of the absolute values of differences with respect to data of corresponding pixels in a block of the preceding frame whose pixel position is displaced by a vector (i, j) and in a block of interest of the current frame is obtained. Then, the displacement vector (i, j) is changed to various values, for obtaining respective absolute difference value sums. The absolute difference value sums are generally called evaluation function values or evaluation values. The position (i, j) providing the minimum absolute difference value sum is defined as the motion vector.

A single motion vector must be transmitted per pixel block. If the block size is reduced, transmission information is so increased that efficient data compression cannot be performed. If the block size is increased, on the other hand, it is difficult to perform effective motion detection. Therefore, the block size is set as 16 by 16 pixels, and the motion vector search range (the maximum change width of i, j) is set as −15 to +15, in general. Motion vector calculation by the block matching is now described specifically.

FIG. 61 illustrates a specific method of calculating a motion vector by the block matching. Consider an image 950 consisting of 352 dots (pixels) by 288 lines, as shown in FIG. 61. This image 950, which may be either a field image or a frame image, is assumed to be a frame image, in order to simplify the illustration. The image 950 is divided into a plurality of blocks each consisting of 16 by 16 pixels. Detection of motion vectors is executed in units of the blocks. With reference to a block 954 in a preceding frame which is on the same position as a block (hereinafter referred to as a template block) 952 to be subjected to motion vector detection processing in the image 950, a block 956 which is larger by "16 pixels" in the horizontal and vertical directions on the screen is assumed to be a search block (hereinafter referred to as a search area). Motion vector search with respect to the template block 952 is executed in the search area 956. A motion vector search method in accordance with the block matching includes the following processing steps:

A block (shown by a vector (i, j) in FIG. 61) having displacement corresponding to a motion vector candidate is obtained. An evaluation function value such as a absolute difference value sum (or sum of squares of difference values) of each pixel of the obtained block and a pixel on a corresponding position of the template block 952 is obtained.

The aforementioned operation is executed for all displacements in the range of (−16, −16) to (+16, +16) as the vector (i, j). After evaluation function values (evaluation values) are obtained for all predictive image blocks (all image blocks in the search area 956), a predictive image block having the minimum evaluation function value is detected. A vector going from the block (the block 954 shown by a vector (0, 0) in FIG. 61) on the same position (hereinafter referred to as right behind block) as the template block 952 to the predictive image block having the minimum evaluation function value is decided as the motion vector for the template block 952.

FIG. 62 illustrates the overall structure of a conventional motion vector detection unit implemented by hardware, described in Proceeding of 1989 IEEE, ICASSP '89, pp. 2453 to 2456, by A. Artieri et al. for example. Referring to FIG. 62, the conventional motion vector detection unit includes a search area input register 962 for inputting pixel data of a search area by one column thereof, a processor array 966 including a plurality of processors which are arranged in a matrix of rows and columns in correspondence to evaluation points (candidates for a motion vector in correspondence to displacement vectors) of a template block respectively, search area side registers 964a and 964b for storing data of the same column in the search area with respect to the processor array 966, and a motion vector detection part 968 for detecting the motion vector in accordance with operation results of the processor array 966.

In the processor array 966, the processors are arranged in correspondence to the evaluation points, i.e., displacement vectors (i, j) respectively. Namely, a processor Pij which is arranged on an i-th row and a j-th column calculates a displacement vector D(i, j).

FIG. 63 illustrates the structure of each processor 970 included in the processor array 966 shown in FIG. 62. Referring to FIG. 63, the processor 970 includes a three-input register 972 for receiving search area pixel data transmitted from horizontal and vertical three-directional processors in the processor array 966 (see FIG. 62) and passing one input in response to a selection signal SEL, a distortion calculation part 974 for calculating a distortion D (absolute difference value sum) on the basis of search area pixel data Y from the three-input register 972 and template block pixel data X supplied from the exterior, and a two-input register 976 for receiving the distortion D from the distortion calculation part 974 and that from a horizontally adjacent processor in the array 966 and selecting and passing either distortion in accordance with a selection signal To.

The processors each having the structure shown in FIG. 63 are two-dimensionally arranged in correspondence to the evaluation points in the search area, i.e., all displacement vectors serving as candidates for the motion vector. The template block pixel data X is supplied in common to the respective processors of the processor array 966 (see FIG. 62). At this time, each processor 970 is supplied with corresponding pixel data in a search area block. In case of template block pixel data X(m, n), for example, the processor Pij is supplied with search area block pixel data Y(i+m, j+n). Search window pixel data is transferred through the search area side registers 964a and 964b shown in FIG. 62 and each processor 970 in the processor array 966. In order to correctly supply the search area block pixel data Y(i+m, j+n) to each processor 970 with respect to the externally supplied template block pixel data X(m, n), the template block and the search area block are scanned with certain regularity.

FIG. 64 illustrates a data scan mode for a template block 999 in the aforementioned motion vector detection unit.

Referring to FIG. 64, the template block 999 is first downwardly scanned from the uppermost along a single column, then pixel data of an adjacent column is upwardly scanned from the lowermost, and then pixel data of a next column is downwardly scanned from the uppermost as shown by arrow for forming template block pixel data, which is successively supplied to the motion vector detection unit. This scan method is called "snake scan". In accordance with the "snake scan" of the template block pixel data, search area block pixel data supplied to the processor array 966 is also scanned in a similar manner to the above.

Each processor 970 must vertically or leftwardly transfer the search area pixel data in FIG. 63 depending on its position in the processor array 966. The three-input register 972 is provided to implement such three-directional transfer. The two-input register 976 (see FIG. 63) is provided to transmit the distortion calculated in the processor 970 to the motion vector detection part 968, in order to obtain a displacement vector providing the minimum distortion (evaluation function value) in the motion vector detection part 968 (see FIG. 62) after the evaluation function value of each displacement vector is calculated.

The motion vector detection part 968 detects the minimum distortion among those from the respective processors in the processor array 966, obtains the position of the processor providing the minimum distortion, and decides the position of the processor as the motion vector. The operation of the motion vector detection unit shown in FIGS. 62 and 63 is now briefly described.

In the processor array 966, the processor Pij arranged on the i-th row and the j-th column calculates a distortion D(i, j) which is expressed as follows:

$$D(i, j) = \Sigma |X(m, n) - Y(m+i, n+j)|$$

The summation $\Sigma$ is made in relation to m and n. The variation range of m and n is decided by the horizontal and vertical sizes of the template block.

Consider pixels which are arranged in M rows and N columns as a template block 980, as shown in FIG. 65. In a first cycle, each processor 970 in the processor array 966 stores search area block pixel data 982. A pixel X(1, 1) on the first row and the first column in the template block 980 is supplied in common to all processors in the processor array 966. Each processor 970 in the processor array 966 obtains and accumulates absolute difference values of search area block (search window) pixel data Y and supplied template block pixel data X.

In a next cycle, the search area block is downwardly shifted by one row in FIG. 65 in the processor array 966, which in turn stores search area block pixel data 983. In this state, next pixel data X(2, 1) of the template block 982 is supplied. The processor Pij stores search area block pixel data Y(m+i, n+j+1). Absolute difference values are obtained and accumulated again for such pixel data. This operation is repeated M times.

Due to such repetition of the aforementioned operation by M times, all pixel data (X(1, 1) to X(M, 1)) in the first column of the template block 980 are calculated. Then, search area pixel data of the next single column of the search area are written from the exterior through the search area input register 962 shown in FIG. 62. Pixel data of an unnecessary column of the search area are discarded. Thus, new search area pixel data are stored in the search area side registers 964a and 964b and the processor array 966. This operation is repetitively executed every column.

As shown in FIG. 66, calculation of absolute difference value sums is first executed through a search window (a block including all rows in the search area). After completion of M cycles, similar calculation is executed again through pixel data of a next search window (a block adjacent by one column in the search area). Thereafter a similar operation is executed through search windows 994, . . . . When calculation with respect to all pixel data in a search area 996 is finally executed, the processor Pij obtains and holds the distortion D(i, j). The distortion D(i, j) obtained in this processor Pij is transmitted to the motion vector detection part 968, which in turn detects the displacement vector providing the minimum distortion as the motion vector.

When pixel data of a column in the search area is scanned, pixel data of the adjacent column must be newly loaded, as shown in FIG. 66. The processor cannot perform operation during such loading of the pixel data in change of the search window, leading to such a problem that the motion vector cannot be detected at a high speed.

Further, the template block pixel data is supplied in common to all processors in the processor array, and hence a circuit for writing the pixel data of the template block requires high driving capability. Thus, current consumption is increased in this template block pixel data write circuit, disadvantageously leading to increased power consumption in the overall unit.

In case of the aforementioned motion vector detection unit, the respective processors are arranged in correspondence to the displacement vectors (evaluation points) serving as motion vector candidates. When the search area is in the range of +16 to −16 in the vertical direction and −16 to +16 in the horizontal direction, the number of the displacement vectors serving as motion vector candidates is 33×33= 1089. Thus, the number of the processors is extremely increased to disadvantageously increase the occupied area of the unit.

Some systems have been proposed in relation to predictive image detection in inter-frame (or inter-field) predictive coding with motion compensation. In order to attain better coding efficiency, it is necessary to select the optimum predictive image detection system after performing motion detection processing in accordance with a plurality of predictive image detection systems, for detecting the motion vector in accordance with the optimum predictive image detection system. Screens are formed in units of fields or frames. A single frame is formed by two fields (odd and even fields). For example, the following predictive image detection system is conceivable for each case:

(A) In case of coding pixel data in units of fields:
  (a) A field image is divided into a plurality of blocks in a unit of P by Q pixels, for detecting a single motion vector every block (a single predictive image is formed in units of blocks).
  (b) Each divided block is further divided into two blocks in relation to the vertical direction of the screen, for detecting a single motion vector for each of the vertically divided blocks. With respect to each block of P by Q pixels, therefore, motion vectors are detected for the upper and lower divided blocks (two predictive images are formed for a single block).

(B) In case of coding pixel data in units of frames:
  (a) A frame image is divided into a plurality of blocks in a unit of block of P by Q pixels, for detecting a single motion vector for each block (a single predictive image is formed for a single block).
  (b) Each block of P by Q pixels is divided into two pixel groups of pixels present in common fields, i.e., those belonging to odd and even fields respectively, for detecting a single motion vector for each pixel group. With respect to each block of P by Q pixels, therefore, motion vectors are detected for the pixel groups belonging to the odd and even fields respectively (two predictive images are formed for a single block).

In case of the aforementioned motion vector detection unit shown in FIGS. 62 and 63, the processors in the processor array are arranged in correspondence to the displacement vectors (evaluation points) which are the motion vector candidates. Further, the respective processors receive common template block pixel data. Therefore, the processors can merely obtain distortions (evaluation function values) in accordance with the common predictive image system, and cannot detect a plurality of motion vectors in a parallel mode in accordance with a plurality of predictive image detection systems. When the supplied template block pixel data X(m, n) is decided, the supplied search window pixel data Y(m+i, n+j) is also uniquely decided in response thereto, as clearly understood from the expression of the distortion D(i, j) calculated by the processor Pij. In order to execute a plurality of predictive image detection systems for improving coding efficiency, therefore, it is necessary to provide motion vector detection units at least in correspondence to the plurality of predictive image detection systems respectively for driving the motion vector detection units in parallel with each other. Thus, the unit scale as well as the power consumption are disadvantageously increased.

SUMMARY OF THE INVENTION

An object of the present invention is to provide a motion vector detection unit which can detect a motion vector at a high speed, and a method therefor.

Another object of the present invention is to provide a motion vector detection unit which can perform an evaluation value calculation operation without interrupting its arithmetic operation also in search window update.

Still another object of the present invention is to provide a motion vector detection unit which can detect motion vectors in accordance with a plurality of predictive modes at a high speed in a parallel mode.

The motion vector detection unit according to the present invention includes a plurality of first registers which are arranged in the form of an array in correspondence to pixels of a template block for motion vector detection of a current screen image for storing corresponding template block pixel data, a plurality of second and third registers which are provided in parallel with each other in the form of an array in correspondence to the plurality of first registers respectively for storing pixel data of a reference block in a search area of a reference screen image related to the template block, and a plurality of data buffers which are arranged in correspondence to respective columns of the matrix array for storing pixel data other than those of the reference block of the search area. Output parts of the respective ones of the plurality of data buffers are coupled to input parts of data registers adjacent in one direction, for forming a one-dimensional array.

The motion vector detection unit according to the present invention further includes selective coupling circuits which are arranged on respective columns of the array for coupling initial stage registers of either the second or third registers of the corresponding columns with the output parts of the data buffers of the corresponding columns while coupling the final stage registers of either the second or third registers of the corresponding columns with the initial stage registers of the third or second registers of the adjacent columns, a plurality of operation elements which are provided corresponding to the first registers and sets of the second and third registers for performing prescribed arithmetic processing on pixel data stored in the corresponding registers and calculating components of evaluation values serving as motion vector candidates, and evaluation value calculation circuit for receiving output signals of the plurality of operation elements in parallel with each other, performing prescribed arithmetic processing and calculating evaluation values of the reference block. The search area is defined by predetermined horizontal and vertical vector search ranges.

The motion vector detection unit according to the present invention further comprises control circuitry for switching the connection mode of the selective coupling circuits every switching of horizontal vector while performing data transfer through interconnection over a plurality of columns of the second and third registers from switching of the horizontal vector up to transfer of all pixel data columns of the reference block to adjacent columns, and supplying pixel data of register columns coupled to the data buffers to the operation elements among the second and third registers.

In the motion vector detection unit according to the present invention, the selective connection circuit transfers pixel data of a search window through the data buffers and either the second or third registers along one direction. In updating of horizontal vector component, i.e., in search window change, the third or second registers and the data buffers already store pixel data of a new search window. Therefore, evaluation values can be continuously calculated without interrupting the arithmetic operation also in the search window change, whereby motion vectors can be detected at a high speed.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 13A and 13B specifically illustrate the operation of the motion vector detection unit according to the embodiment 1 of the present invention;

FIG. 56 illustrates the operation of the data buffer shown in FIG. 55;

DESCRIPTION OF THE PREFERRED EMBODIMENTS

Embodiment 1

Figure 1:
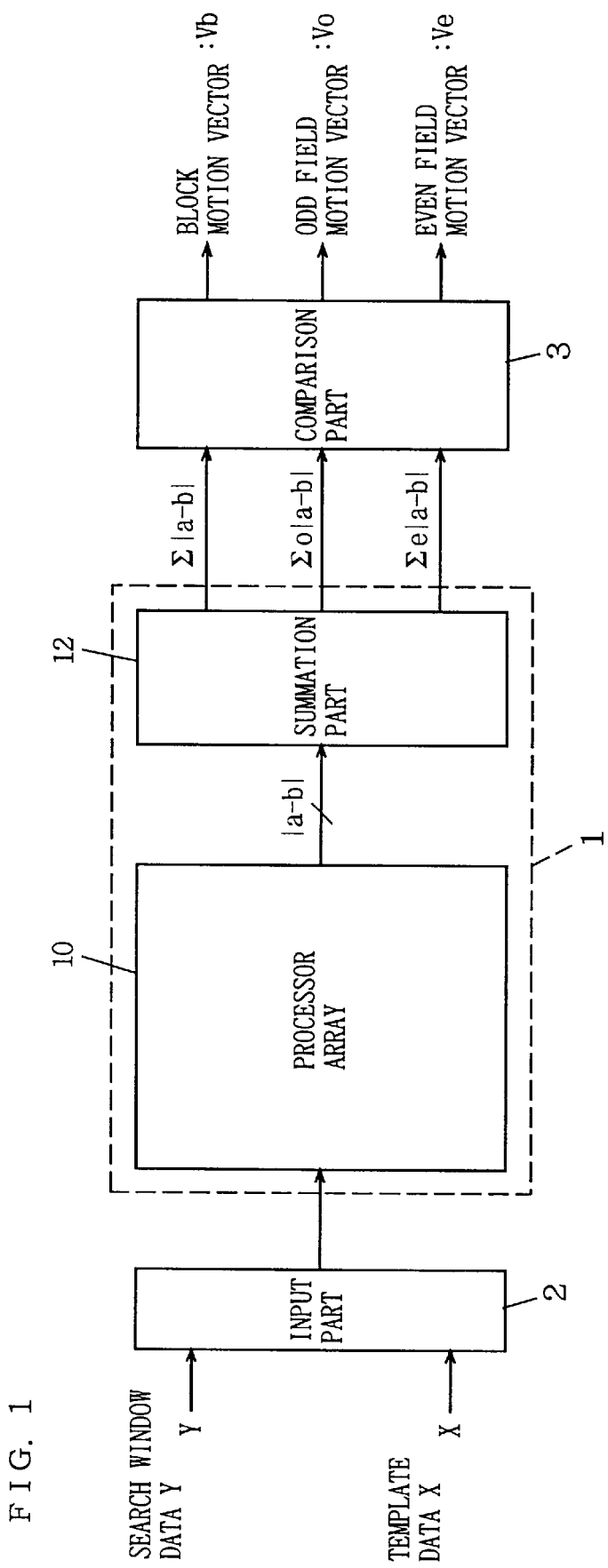
FIG. 1 schematically illustrates the overall structure of a motion vector detection unit according to an embodiment 1 of the present invention.

FIG. 1 schematically illustrates the overall structure of a motion vector detection unit according to an embodiment 1 of the present invention. This figure shows a structure coding pixels in units of frames.

Referring to FIG. 1, the motion vector detection unit includes an input part 2 for receiving search window (described later in detail) pixel data Y in a prescribed area of a search area and template block pixel data X and outputting the received pixel data X and Y at prescribed timings respectively, an operation part 1 for calculating three evaluation function values or evaluation values (absolute difference value sums in this embodiment) $\Sigma|a-b|$, $\Sigma o|a-b|$ and $\Sigma e|a-b|$ as to a displacement vector with respect to a single template block on the basis of the pixel data X and Y supplied from the input part 2, and a comparison part 3 for receiving the three evaluation function values $\Sigma|a-b|$, $\Sigma o|a-b|$ and $\Sigma e|a-b|$ obtained in the operation part 1, obtaining the minimum evaluation function values as to the respective evaluation function values, and deciding displacement vectors corresponding to the respective evaluation function values as motion vectors.

The evaluation function value $\Sigma|a-b|$ corresponds to that of a frame predictive mode for obtaining the evaluation function value with all pixels of a current image block (template block). The characters a and b represent template block pixel data and corresponding pixel data of a reference image block (search window block). $\Sigma o|a-b|$ corresponds to an evaluation function value in accordance with an odd field predictive mode for detecting a predictive image with pixels included in an odd field of the template block. $\Sigma e|a-b|$ represents an evaluation function value calculated in accordance with an even field predictive mode for detecting a predictive image with pixels included in an even field of the template block.

The comparison part 3 outputs motion vectors decided in accordance with the respective predictive modes, i.e., a block motion vector Vb decided in accordance with the frame predictive mode, an odd field block motion vector Vo decided in accordance with the odd field predictive mode and an even field block motion vector Ve decided in accordance with the even field predictive mode, in parallel with each other. These predictive modes are described later in detail.

The operation part 1, the structure of which is described later in detail, includes a processor array 10 including a plurality of element processors arranged in a two-dimensional array in correspondence to the respective pixels of the template block, and a summation part 12 for classifying operation result values (absolute difference values |a-b| in this embodiment) outputted from the respective element processors of the processor array 10 in accordance with the predictive modes, summing up the same every class and obtaining the total sum. The summation part 12 outputs the evaluation function values $\Sigma|a-b|$, $\Sigma o|a-b|$ and $\Sigma e|a-b|$ corresponding to the respective predictive modes in parallel with each other.

The element processors included in the processor array 10 store different template block pixel data, and the pixel data of the reference image block in the search area related to the template block are successively transmitted through the element processors along one direction. The element processors in the processor array 10 execute operations of pixel data of the template block and those of a single reference image block (hereinafter referred to as a search window block). Outputs of the element processors are outputted in parallel with each other. Therefore, each element processor calculates a component of an evaluation function value indicating the degree of correlation between a single template block and a single search window block.

The processor array 10 constantly stores the template block pixel data during the cycle for obtaining the motion vector as to the template block. On the other hand, the search window block pixel data is shifted between the element processors in the processor array 10 by one pixel every operation cycle (evaluation function value calculation cycle). Each element processor includes two search window block pixel data storage registers which are provided in parallel with each other, for storing search window block pixel data employed for operation and first (leading) search window block pixel data for a next horizontal vector component respectively.

The element processors are arranged in correspondence to the respective pixels of the template block. In the odd and even field predictive modes, the element processors calculate evaluation function values with the pixel data belonging to the odd and even fields of the template block respectively. A frame includes odd and even fields, and odd and even field pixels are alternately arranged every horizontal scanning line on the screen. Therefore, the outputs of the element processors arranged in correspondence to the odd field pixels represent components of evaluation function values in accordance with the odd field predictive mode, and those of the element processors arranged in correspondence to the even field pixels represent components of evaluation function values in accordance with the even field predictive mode respectively. Thus, it is possible to calculate evaluation function values corresponding to a plurality of predictive modes respectively in parallel with each other by classifying the outputs of the element processors depending on the positions in the processor array 10. In case of the frame predictive mode, evaluation function values are obtained by simply adding the evaluation function values of the odd and even fields. The specific structure of the operation part 1 shown in FIG. 1 is now described.

Figure 2:
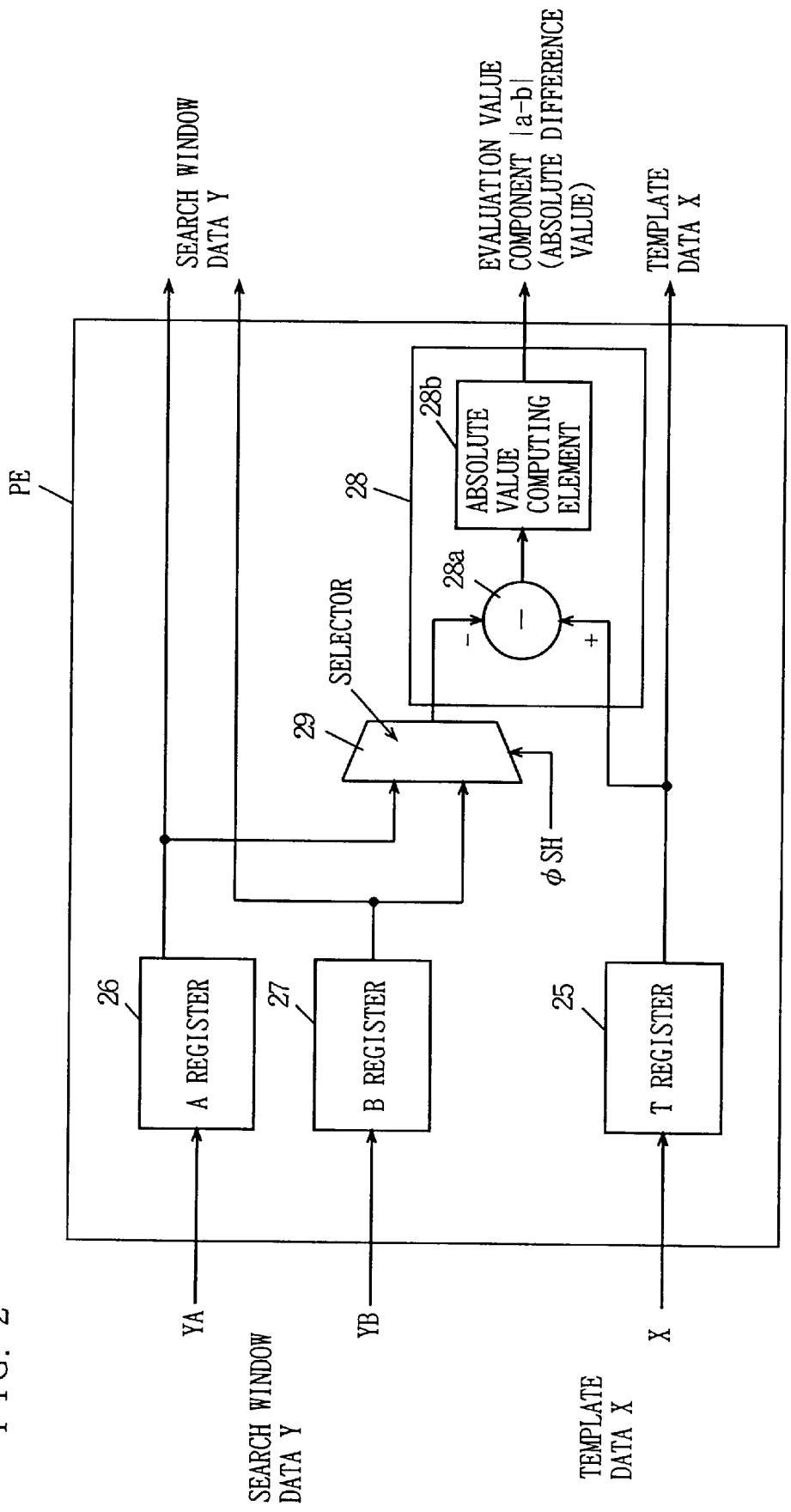
FIG. 2 schematically illustrates the structure of each element processor included in the motion vector detection unit according to the embodiment 1 of the present invention.

FIG. 2 schematically illustrates the structure of each element processor PE included in the processor array 10 shown in FIG. 1. Such element processors PE shown in FIG. 2 are arranged in an array having rows and columns in correspondence to the pixels of the template block.

Referring to FIG. 2, the element processor PE includes a template (T) register 25 for storing corresponding template pixel data X, A and B registers 26 and 27 which are provided in parallel with each other for storing pixel data of different reference blocks respectively, a selector 29 for selecting pixel data stored in either the A register 26 or the B register 27 in accordance with a selection signal φSH, and a computing element 28 for performing prescribed arithmetic processing on the template pixel data X stored in the template (T) register 25 and pixel data supplied through the selector 29 and forming an evaluation value component.

When one of the A and B registers 26 and 27 stores the pixel data selected by the selector 29 and operated, the remaining register stores and holds pixel data of a first (leading) reference block for a next horizontal vector.

The computing element 28 includes a subtracter 28a for subtracting the pixel data X from the T register 25 and the pixel data supplied through the selector 29, and an absolute value computing element 28b for taking the absolute value of output data from the subtracter 28a. The absolute value computing element 28b outputs an evaluation value component |a-b|. In the structure shown in FIG. 2, the evaluation value component is provided by an absolute difference value. The T, A and B registers 25, 26 and 27 can transfer the pixel data only along one direction (rightward in FIG. 2).

Figure 3:
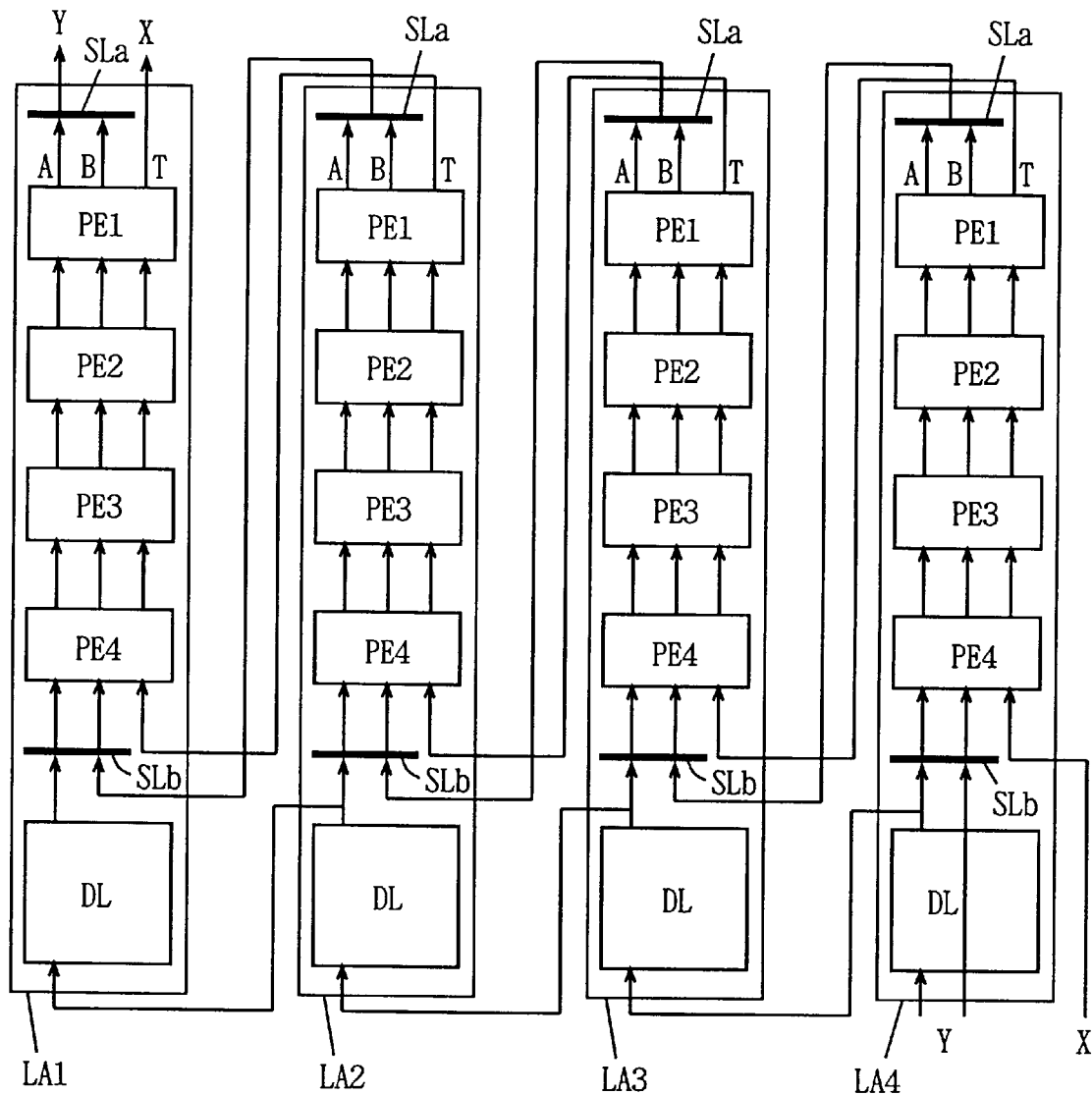
FIG. 3 illustrates the structure of a processor array shown in FIG. 1.

FIG. 3 schematically illustrates the structure of the processor array 10 shown in FIG. 1. Referring to FIG. 3, the processor array 10 includes linear processor arrays LA1 to LA4 which are arranged in four columns for processing a search window block of 4 by 4 pixels by size, for example. The respective ones of the linear processor arrays LA1 to LA4 are arranged in correspondence to the respective columns of the template block and the reference image block. In the processor array 10 shown in FIG. 3, therefore, each of the template block and the reference image block includes pixel data which are arranged in four columns. Each of the linear processor arrays LA1 to LA4, which are identical in structure to each other, includes four element processors PE1 to PE4 arranged in a cascade and a data buffer DL for storing R search window pixel data and serving also as delay means.

The element processors PE1 to PE4 transmit the search window pixel data and the template block pixel data along one direction (vertical direction in FIG. 3) in the linear processor arrays LA (generically representing LA1 to LA4) to which the same belong. As to the template block pixel data, template pixel data P from each final stage (output stage) element processor PE1 is transmitted to the template block pixel data register (T register) 26 of the lowermost stage (initial input stage) element processor PE4 of the adjacent linear processor array LA.

In each of the linear processor arrays LA1 to LA4, a selector SLb is arranged between the data buffer DL and the initial stage element processor PE4, while a selector SLa is provided on a search window block pixel data output part of the uppermost stage (final stage) element processor PE1. The selector SLa selects one of the search window pixel data A and B supplied from the final stage element processor PE1 and supplies the same to the selector SLb of the upstream adjacent linear processor array LA. In each of the linear processor arrays LA1 to LA4, the A registers 26 are interconnected with each other, the B registers 27 are also interconnected with each other, and the T registers 25 are also interconnected with each other. Therefore, the pixel data stored in the A registers 26 are successively transferred in the A registers 26 through the element processors PE1 to PE4. Similarly, the pixel data stored in the B registers 27 and the T registers 25 are successively transferred through these B and T registers 27 and 25 in the corresponding linear processor array. The template block pixel data X are transferred only through the element processors PE1 to PE4.

The selector SLb transfers pixel data for operation supplied from the data buffer DL to one of the A and B registers 26 and 27 of the corresponding element register PE4, while transferring the search window pixel data supplied from the downstream linear processor array LA or the input part to the remaining register of the input stage element processor PE4. When the search window block pixel data selected by the selector SLa are stored in the A or B registers 26 or 27 of the element processors PE1 to PE4 in the upstream linear processor array LA respectively, no transfer is thereafter performed. On the other hand, the selector SLb transfers search window block pixel data supplied from the corresponding data buffer DL every operation cycle. The connection mode of the selectors SLa and SLb is switched every horizontal vector updating.

The data buffer DL transfers the search window block pixel data to the corresponding input stage element processor PE4. While simultaneously transferring the search window block pixel data to an input stage of the data buffer DL in the upstream adjacent linear processor array LA. The data buffer DL has a delay function as well as a function of outputting supplied data in a first-in, first-out (FIFO) manner. The data buffer DL may be formed of a data latch having a shift function, or a register file whose addresses are successively incremented or decremented every operation cycle.

Figure 4A:
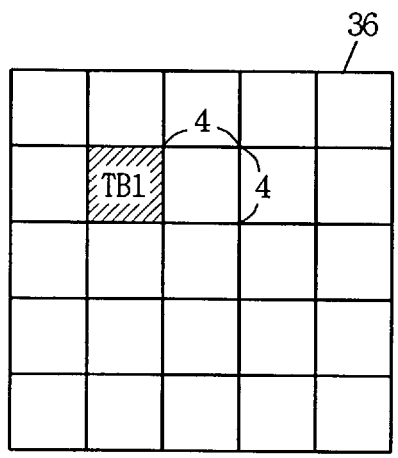
FIGS. 4A and 4B illustrate the size and the structure of a template block.
Figure 4B:
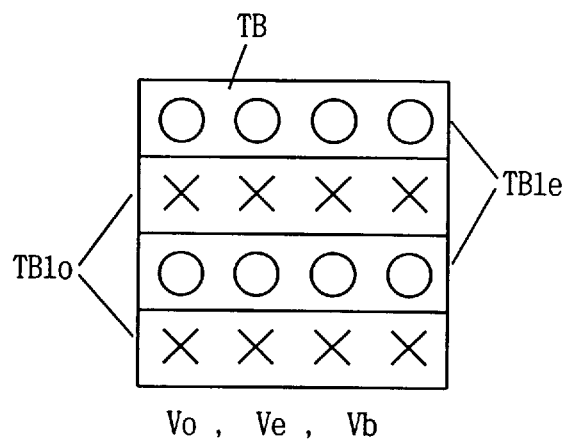

Consider that an image 36 of one frame is divided into macro blocks each of 4 by 4 pixels, as shown in FIG. 4A. Referring to FIG. 4A, a macro block shown by slant lines in the one frame image 36 is assumed to be a template block TB1. This template block TB1 includes odd field pixels X and even field pixels 0. as shown in FIG. 4B. Motion vectors Vo, Ve and Vb for odd subtemplate blocks TB1o of 4 by 2 pixels formed only by the pixels belonging to the odd field, even subtemplate blocks TB1e of 4 by 2 pixels formed by only the pixels belonging to the even field and the template block TB1 of 4 by 4 pixels are obtained respectively in parallel with each other.

Figure 5A:
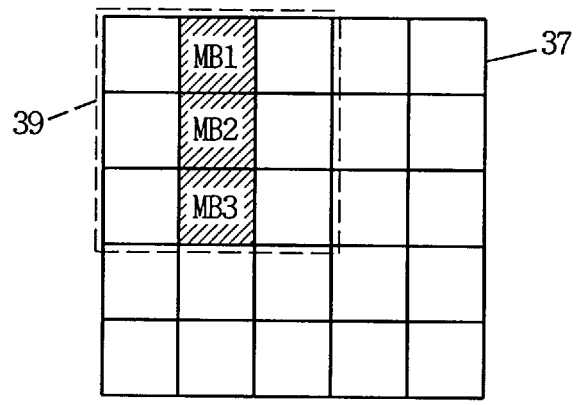
FIGS. 5A and 5B illustrate a search area and the structure of a search window respectively.
Figure 5B:
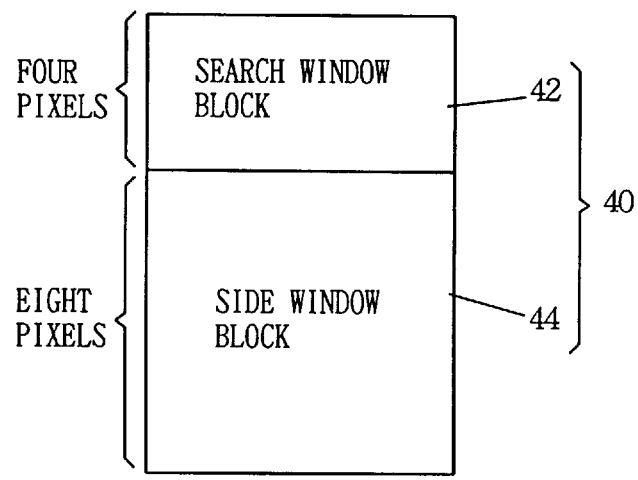

As shown in FIG. 5A, it is assumed that a motion vector search range of the template block TB1, i.e., a search area 39, is in the range of −4 to +4 in the horizontal direction (horizontal vector component) and −4 to +4 in the vertical direction (vertical vector component) respectively. Namely, the search area 39 has a size of 12 by 12 pixels. In this case, the processor array 10 stores three macro blocks MB1, MB2 and MB3 shown by slant lines in a preceding frame image 37. Pixel data of the template block TB1 shown in FIG. 4A are stored in the T registers 25 of the element processors PE. As to the search window pixel data, on the other hand, a pixel data of the area of the macro block MB1 is stored in either the A register 26 or the B register 27 of the element processor PE. In the following description, the search window pixel data stored in the element processor PE and employed for arithmetic operation for motion vector detection is referred to as search window block pixel data. The search window pixel data of the remaining macro blocks MB2 and MB3 are stored in each data buffer DL. The search window pixel data stored in the data buffer DL are referred to as side window block pixel data. A search window 40 includes a search window block 42 and a side window 44. In this embodiment, the search window block 42 and the side window block 44 have sizes of 4 by 4 pixels and 8 by 4 pixels respectively. The operation is now described.

Figure 6:
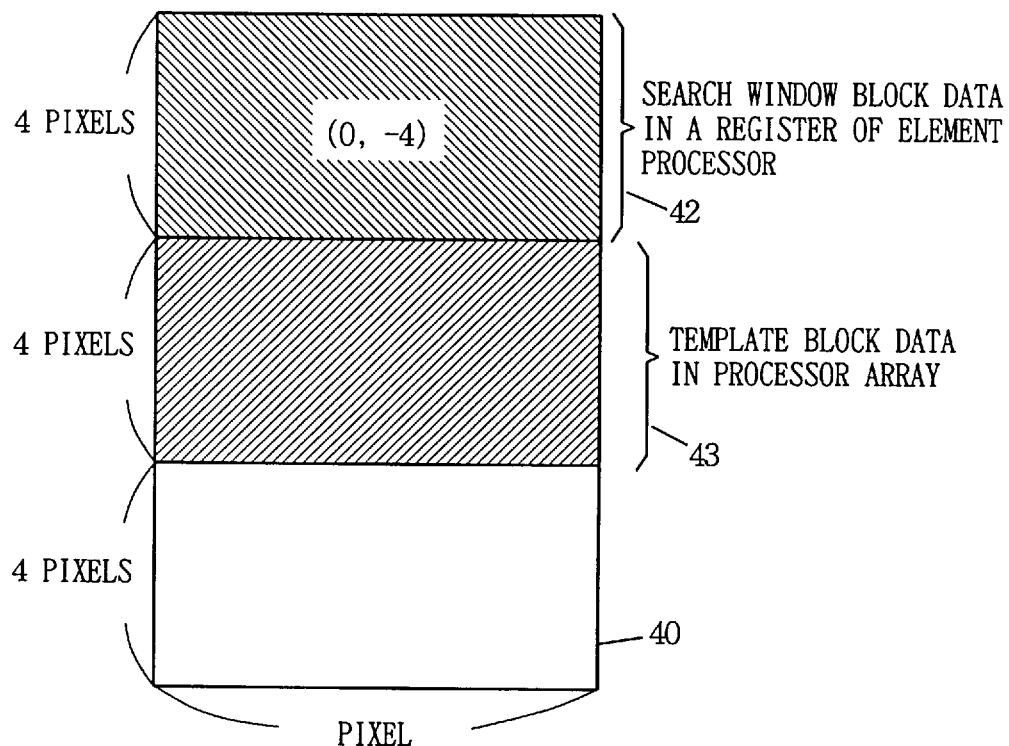
FIG. 6 illustrates arrangement of search window pixel data in a motion vector search operation in the embodiment 1 of the present invention.

FIG. 6 illustrates a pixel data storage situation in a first operation cycle in the motion vector detection operation. Referring to FIG. 6, pixel data of a template block 43 consisting of pixel data of 4 rows by 4 columns are stored in the T registers 25 of the element processors PE of the processor array 10 respectively. In correspondence thereto, pixel data of the search window block 42 of 4 rows by 4 columns are stored in the A registers 26 of the element processors PE of the processor array 10 respectively. This state corresponds to a frame displacement vector (0, −4) with respect to the template block TB1, and displacement vectors (0, −2) and (0, −2) for the odd and even fields with respect to the odd and even subtemplate blocks TB1o and TB1e respectively. In this case, the element processors PE obtain the absolute difference values Σ|a-b| of the corresponding template block pixel data stored in the T registers 25 and the search window block pixel data stored in the corresponding A registers 26. The absolute difference values Σ|a-b| obtained in the respective element processors PE are transmitted to the summation part 12.

The summation part 12 calculates the summation (odd subblock evaluation value) of the absolute difference values corresponding to the odd subtemplate blocks and the sum (even subblock evaluation value) of the difference absolute values corresponding to the even subtemplate blocks independently of each other, and thereafter adds up the sums for obtaining the total sum (block evaluation value) of the difference absolute values corresponding to the template block TB1. Thus, evaluation values with respect to three displacement vectors are obtained in parallel with each other.

Then, only the search window pixel data is transferred from each A register 26 to the A register 26 of the higher order element processor PE while the template block pixel data is held in each element processor PE. At this time, the search window block pixel data from the A register 26 of the output stage element processor PE1 of each of the linear processor arrays LA1 to LA4 is transferred to the B register 27 of the input stage element processor PE4 of the higher order adjacent linear processor array. Therefore, the B register 27 also transfers pixel data of one pixel. Further, search window pixel data is stored in the data buffer DL of the linear processor array LA4 and the B register 27 of the element processor PE4 from the exterior.

Figure 7A:
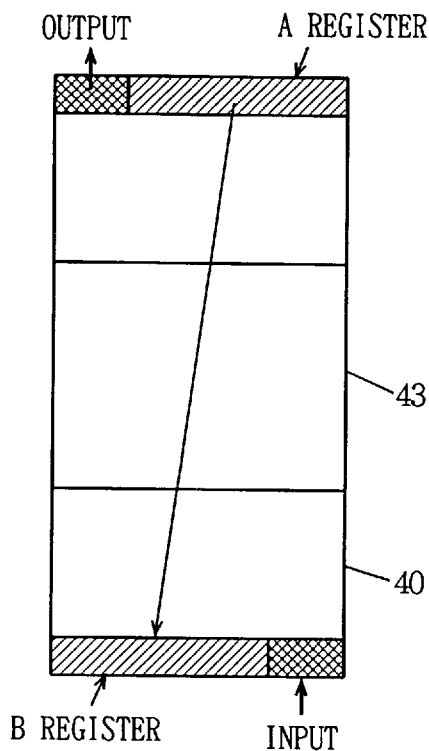
FIGS. 7A and 7B illustrate the operation of the motion vector detection unit according to the embodiment 1 of the present invention.

After completion of this transmission operation, the pixel data of the uppermost row in the search window block 42 is transferred to the B register 27 of the input stage element processor PE4 of the linear processor array LA of the adjacent column while the pixel data of the uppermost row in the side window block 44 is transferred from each data buffer DL to the A register 26 of the corresponding element processor PE4 and to the data buffer DL of the adjacent column in parallel therewith, as shown in FIG. 7A. In response to this transfer operation, the first (leading) pixel data of the search window block 42 is shifted out. Referring to FIG. 7A, the shifted-out search window pixel data is shown by slant lines.

Figure 7B:
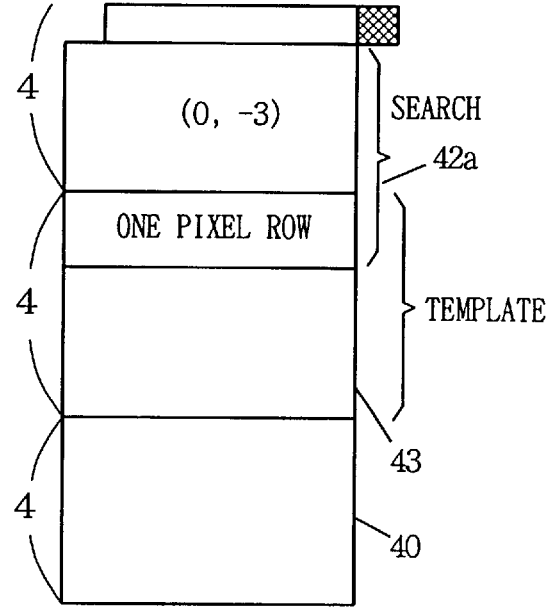

Thus, the A register 26 in the element processor PE of the processor array 10 stores a search window block 42a which is downwardly displaced by one row in the search window 40, as shown in FIG. 7B.

Figure 8:
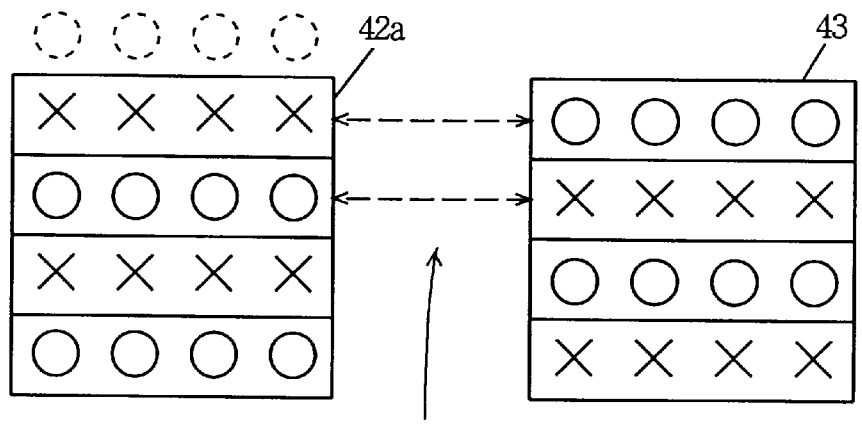
FIG. 8 illustrates displacement vectors of the template block in the state shown in FIG. 7B.

As shown in FIG. 8, the search window block 42a is displaced from the template block 43 by a vector (0, −3), due to the displacement by one pixel row. On the other hand, the pixel data of the odd field stored in this search window block 42a remains unchanged since the even field pixel data is shifted out, and hence the displacement vector of the odd field also remains unchanged. Therefore, the even subtemplate block TB1e is displaced by the vector (0, −2) for the odd field. On the other hand, the odd subtemplate block TBo is displaced by a vector (0, −1) with respect to the even field since the corresponding even field is displaced by one row.

In this state, operation of absolute difference values and summing operation are performed again similarly to the above, so that evaluation values for corresponding three types of vectors are obtained respectively in parallel with each other.

Figure 9A:
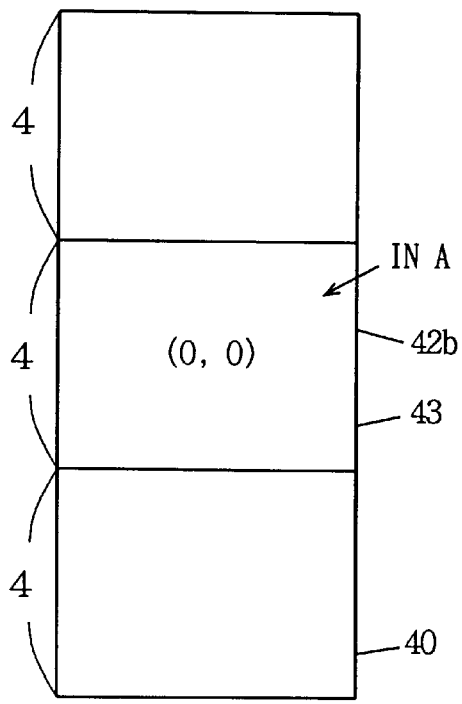
FIGS. 9A and 9B illustrate the operation of the motion vector detection unit according to the embodiment 1 of the present invention.
Figure 9B:
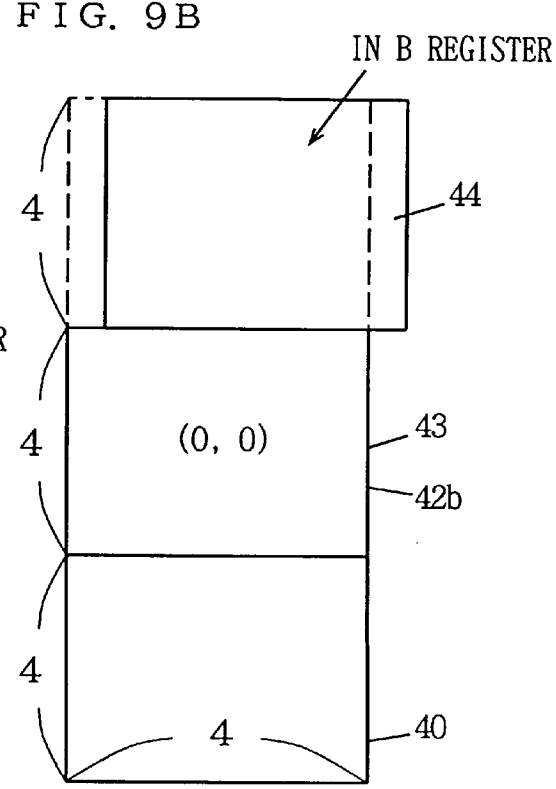

This operation thereafter repeated so that data stored in the A register 26 included in each element processor PE is stored in the B register 27 of the element processor PE of the adjacent linear processor array LA, and pixel data from the corresponding data buffer DL is shifted in each A register 26. When the displacement vector for the template block becomes (0, 0), i.e., the vector (0, 0) for the odd field with respect to the odd subtemplate block TB1o and the displacement vector (0, 0) for the even field with respect to the even template block TB1e due to the repetition of the operation, the search window block 42b stored in the A register 26 of the element processor PE in the search window 40 corresponds to a position right behind the template block 43. In this state, the pixel data of the search window 40 stored in the B register 27 in the element processor PE is that position rightwardly displaced by one column in FIG. 9B in an upper area of 4 by 4 pixels, i.e., a first search window block in evaluation value calculation as to a next horizontal component.

As hereinabove described, search window pixel data of a next column is newly shifted in in parallel with an evaluation value calculation operation while successively transferring search window pixel data used for arithmetic operation in the search window pixel data storage registers (the B registers 27) not used for the arithmetic operation of the element processors in the adjacent linear processor arrays, and the search window pixel data is shifted in also with respect to each data buffer DL, whereby the search window pixel data of the next column is stored. In this state, the B registers 27 of the element processors PE which are not used for the arithmetic operation store all first search window block pixel data for the next horizontal vector component, whereby a data transfer operation between the B registers 27 is stopped so that the respective B registers 27 hold the pixel data.

New search window pixel data are inputted only in the data buffers DL, so that the data are transferred through the data buffers DL and the A registers 26 of the element processors PE.

Figure 10A:
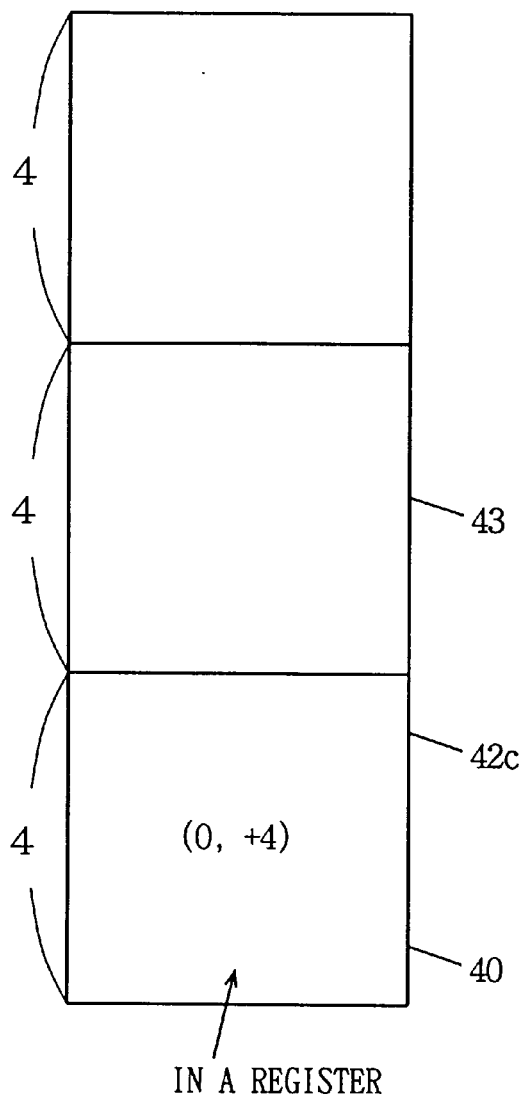
FIGS. 10A and 10B specifically illustrate the operation of the motion vector detection unit according to the embodiment 1 of the present invention.

When the operation is further repeated and the displacement vectors with respect to the template block TB1, the odd subtemplate block TB1o and the even subtemplate block TB1e are (0, +4), (0, +2) for the odd field and (0, +2) for the even field respectively, a search window block 42c stored in the A registers 26 of the element processors PE is in the lowermost area of the search window 40, as shown in FIG. 10A. At this time, data of the search window 40 stored in the data buffer DL is in a position rightwardly displaced by one column in a lower area of 4 by 8 pixels, as shown in FIG.

Figure 10B:
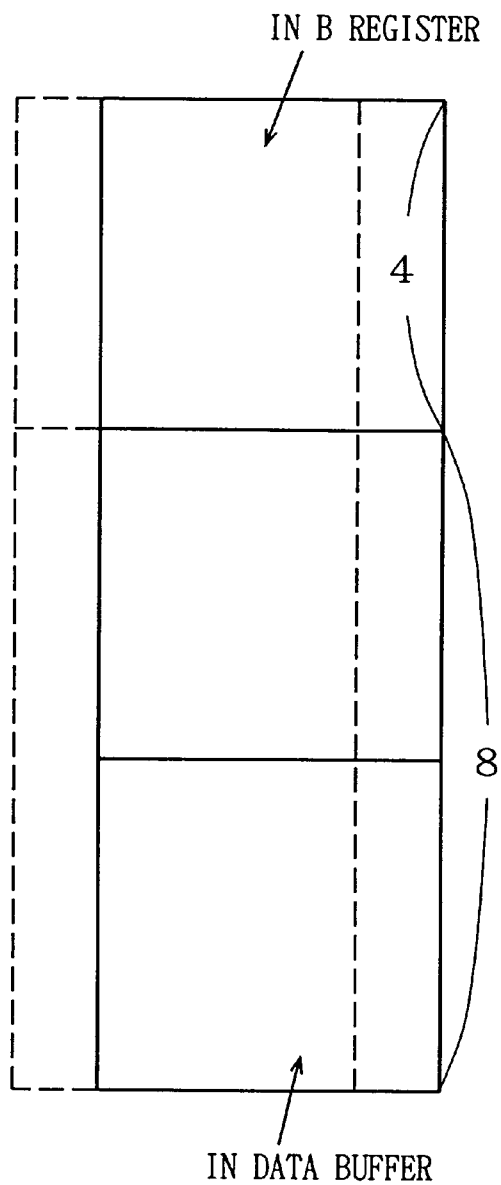

10B. Namely, pixel data of the search window rightwardly displaced by one column in the search area, i.e., for incremented-by-one horizontal vector component, is stored as shown in FIG. 10B, when the pixel data stored in the B register 27 of the element processor PE and the data buffer DL are combined with each other.

At a next step, the search window register employed for the arithmetic operation is changed from the A register 26 to the B register 27, for calculating evaluation values with respect to a search window having the horizontal vector component incremented by one and rightwardly displaced by one column in the search area. At this time, the pixel data stored in the B register 27 employed for the arithmetic operation is transferred to the A register 26 in the element processor PE of the upstream adjacent linear processor array, reference block (search window block) pixel data for the next horizontal vector is shifted in the A register 26 of the input stage element processor PE4 of the input stage linear processor array LA4, and pixel data of a next row of the reference block of the next horizontal vector component is successively shifted in the data buffer DL of the linear processor array LA4. After performing vector evaluation (the horizontal vector corresponds to −1) nine times, the A and B registers 26 and 27 are exchanged as to the preceding operation so that a similar evaluation value calculation operation is performed.

All necessary evaluation values for the template block 43 can be calculated by repeating the aforementioned operation in the search area. With respect to all calculated evaluation values, the comparison part 3 obtains the minimums of the evaluation values corresponding to the respective predictive modes, so that the displacement vectors therefor are decided as the motion vectors Vb, Vo and Ve for the template block (TB1) 43, the odd subtemplate block TB1o and the even subtemplate block TB1e respectively. A specific evaluation value calculation operation is now described.

Figures 11A, 11B:
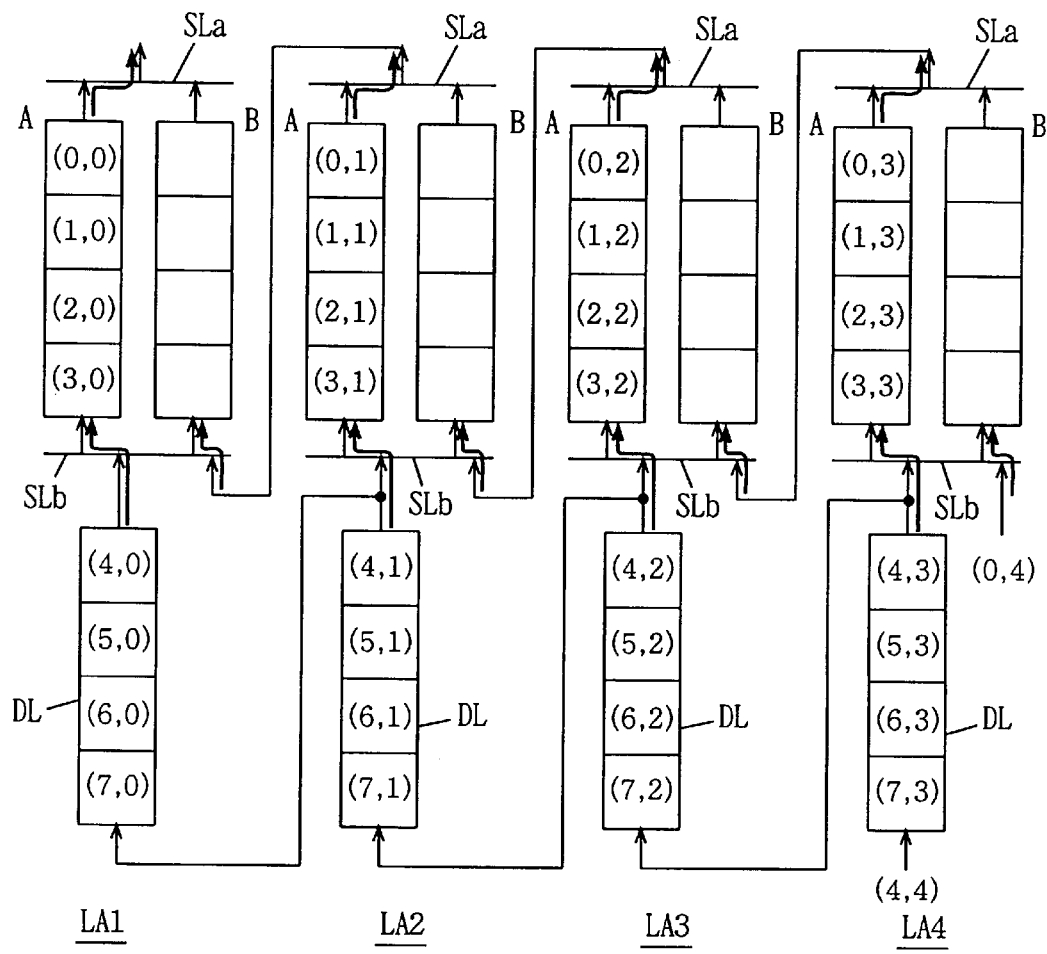
FIGS. 11A and 11B specifically illustrate the operation of the motion vector detection unit according to the embodiment 1 of the present invention.

As shown in FIG. 11A, it is assumed here that a search window is formed by 8 by 4 pixels, and each of a search window block 42d and a template block is formed by 4 by 4 pixels. Each pixel indicates a position in the search window block 42d with coordinate components. Now consider that pixels (0, 0) to (0, 3), . . . , (3, 0) to (3, 3) of the search window block 42d are stored in the processor array 10 in an initial state, as shown in FIG. 11A.

The processor array 10 includes the A registers which are arranged in four rows and four columns, the B registers which are also arranged in four rows and four columns, and the four stages of data buffers DL which are arranged in correspondence to the respective columns. The respective columns of the pixel data of the search window block 42d are stored in the A registers of the linear processor arrays LA1 to LA4 respectively. The B registers currently store no valid pixel data. The data buffers DL store the respective columns of the side window block pixel data of this search window respectively. In the respective ones of the linear processor arrays LA1 to LA4, the selectors SLa are set in states of selecting the corresponding A register trains.

On the other hand, the selectors SLb are set in states of transferring the pixel data shifted therein from the corresponding data buffers DL to the input stage A registers of the corresponding A register trains while transferring the pixel data supplied from the selectors SLa of the lower linear processor arrays to the input stage B registers of the corresponding B register trains respectively. In the linear processor array LA4 provided on the input part, the data buffer DL is coupled to receive side window block pixel data, while the selector SLb is set in a state of inputting pixels of a first search window block of a next horizontal vector component. A shift operation of the search window pixel data is executed in each operation cycle.

When the A registers and the data buffers DL store necessary pixel data as shown in FIG. 11B, calculation of evaluation values of motion vectors as to the search window block 42d shown in FIG. 11A is executed as to each predictive mode. When the arithmetic operation with respect to the search window block 42d is completed, a head pixel P(0, 4) which is the first search window block pixel of the next horizontal vector component is stored in the B register of the linear processor array LA4 in a next cycle. In the following description, the pixels are denoted as P(i, j), for clarifying the difference between the same and the displacement vectors.

In the linear processor array LA4, a head pixel P(4, 4) of a side window block of the next horizontal vector component is shifted in the data buffer DL. The selector SLb couples the corresponding data buffer DL to the input stage register of the corresponding A registers. Due to the shift-in operation of the pixel P(4, 4) in the data buffer DL, therefore, the pixel data stored in each A register is shifted by one pixel, and the pixel data of the data buffer DL is also shifted by one pixel. The selector SLa transfers pixel data from the output stage register of the corresponding A registers to the selector SLb of the upstream adjacent linear processor array, while the selector SLb transfers the pixel data transferred from the selector SLa to the input stage one of the corresponding B registers.

Figures 12A, 12B:
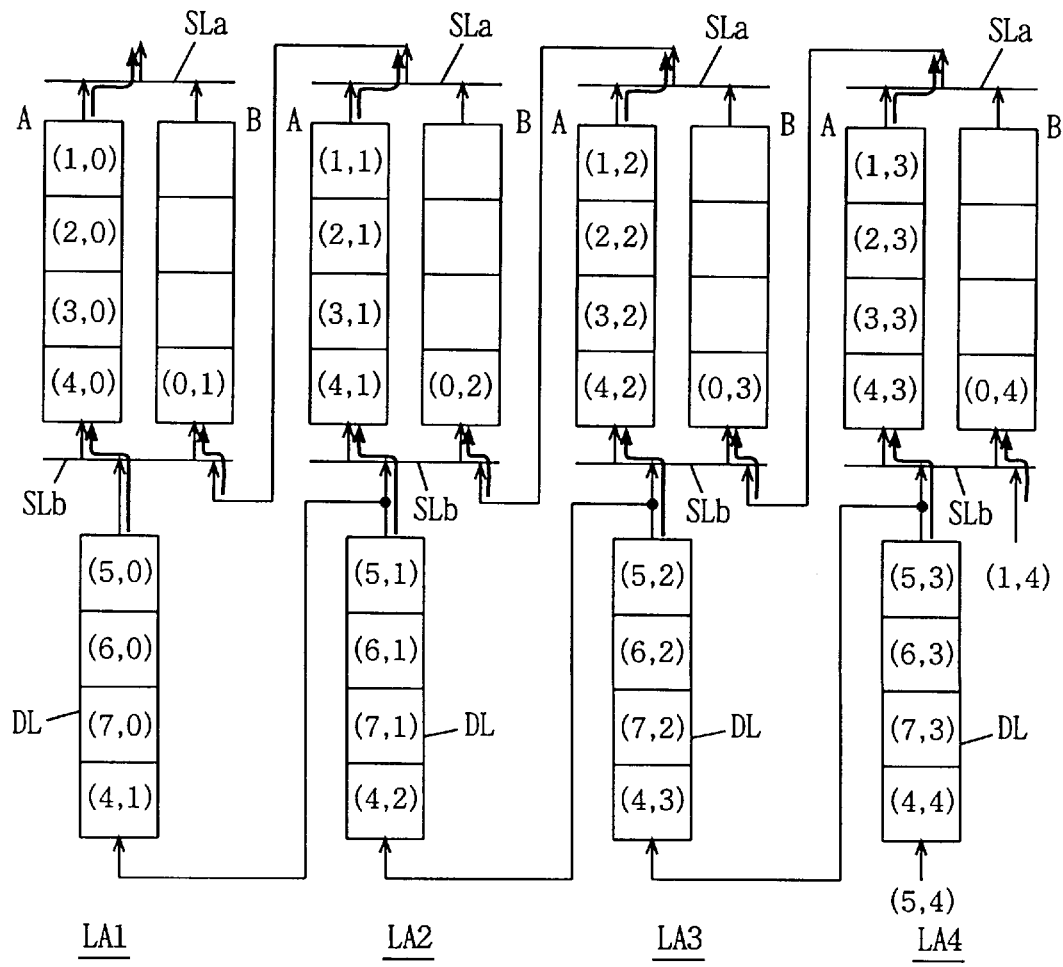
FIGS. 12A and 12B specifically illustrate the operation of the motion vector detection unit according to the embodiment 1 of the present invention.

In this state, therefore, pixel data included in a search window block 42e are stored in the A registers of the linear processor arrays LA1 to LA4 respectively, as shown in FIGS. 12A and 12B. On the other hand, the input stage registers of the B registers store pixel data P(0, 1), P(0, 2), P(0, 3) and P(0, 4) of the first row of a search window block of the next horizontal vector component respectively.

In each of the data buffers DL, the storage data are shifted by a single pixel respectively, and pixel data P(4, 1), P(4, 2), P(4, 3) and P(4, 4) of the side window block with respect to the next horizontal vector component are stored in input stage buffer registers of the data buffers DL respectively. In this state, evaluation values of the motion vector with respect to the search window block 42e are calculated in accordance with each predictive mode. When this arithmetic operation is completed, pixel data P(1, 4) is inputted in the selector SLb of the linear processor array LA4, while pixel data P(5, 4) is similarly inputted in the data buffer DL.

In this state, the A registers perform a single pixel shift operation, whereby a search window block 42f is in a position having a head pixel P(2, 0), as shown in FIG. 13A. On the other hand, the B registers store pixel data of two rows of the search window block for the next horizontal vector component, as shown in FIG. 13B. Similarly, the data buffers DL store side window block pixel data of the remaining two rows of the search window of the current horizontal vector component and pixel data of the first two rows of the side window block of the next horizontal vector component. After this storage, the evaluation values for the motion vector as to the search window block 42f are calculated in accordance with each predictive mode.

When this arithmetic operation is completed, pixel data P(2, 4) and P(3, 4) are successively transferred in the initial stage linear processor array LA4 through the selector SLb, pixel data P(6, 4) and P(7, 4) are successively supplied to the data buffer DL, and two search window blocks are successively loaded in the element processors. Arithmetic processing is performed and evaluation values are calculated as to the respective supplied pixel data.

Figure 14A:
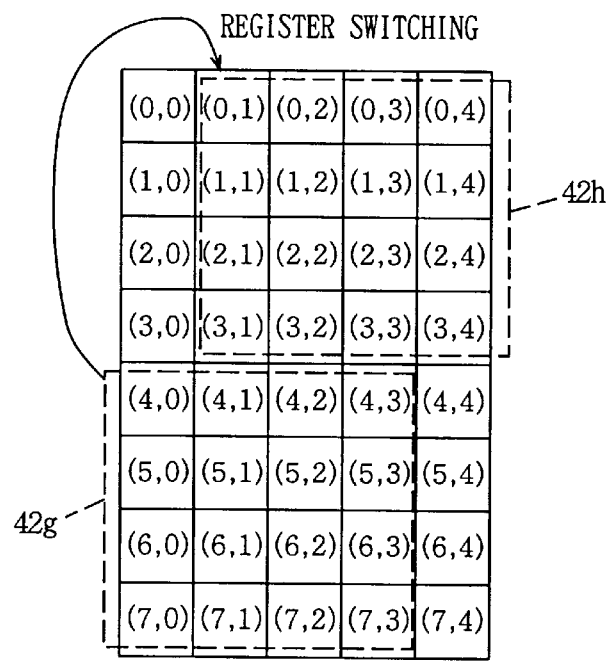
FIGS. 14A and 14B illustrate the specific operation state of the motion vector detection unit according to the embodiment 1 of the present invention.
Figure 14B:
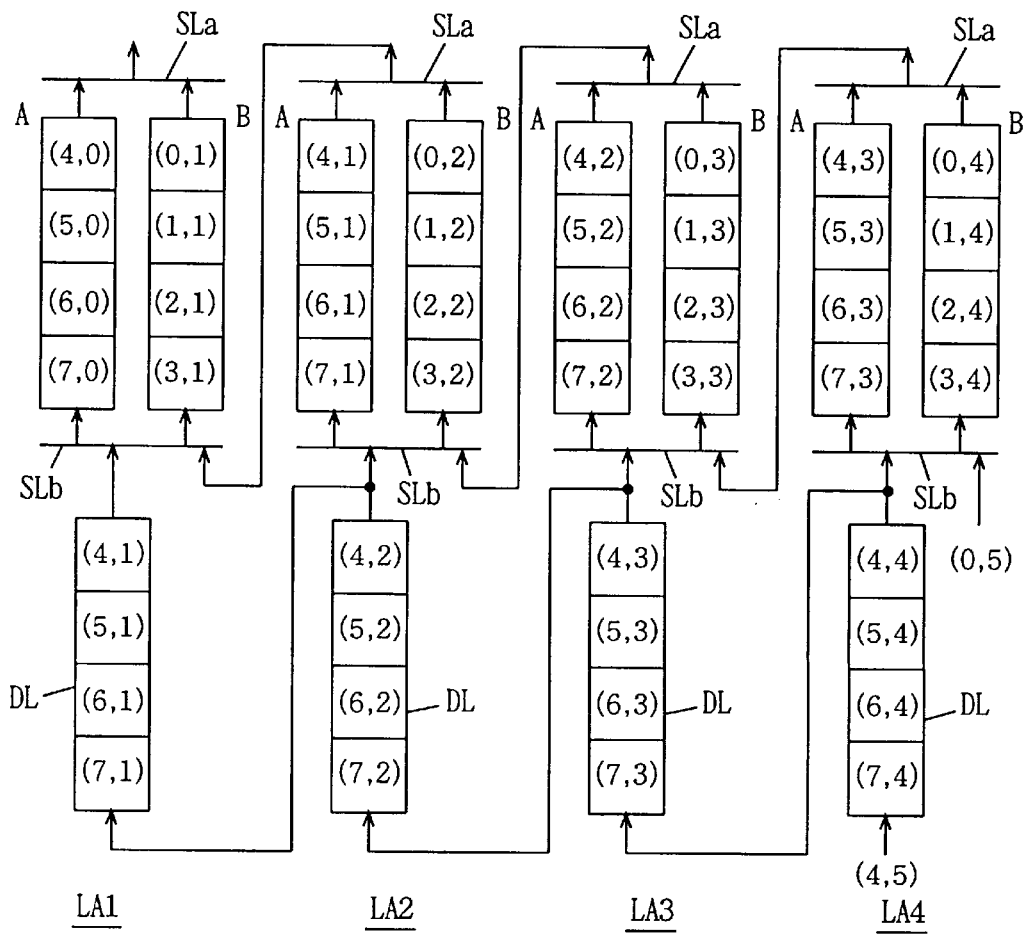

When the pixel data P(3, 4) and P(7, 4) are inputted respectively, the A registers of the linear processor arrays LA1 to LA4 store pixel data of a search window block 42g shown in FIG. 14A. This search window block 42g is on the lowermost position of the search window. The data buffers DL of the linear processor arrays LA1 to LA4 store the pixel data of the side window block as to the next horizontal vector component as shown in FIG. 14B, while the B registers store pixel data of a first search window block 42h as to the next horizontal vector component. After the evaluation value calculation operation for the motion vector with respect to the search window block 42g is completed, therefore, the connection paths of the selectors SLa and SLb are switched. In this cycle, no shift in/out operation is performed for new pixel data. In parallel with the connection path switching by the selectors SLa and SLb, the selectors (29) select the B registers in place of the A registers in the element processors, so that evaluation values of a motion vector as to the search window block 42h are calculated.

Transition from the lowermost search window block 42g of the search window to the uppermost search window block 42h as to the next horizontal vector component can be performed without stopping the operation cycle since the B registers already store the pixel data of the search window block 42h. Thus, time loss in search window change is eliminated so that evaluation value calculation operations can be continuously performed. When evaluation value calculation as to the search window block 42h is completed, pixel data P(0, 5) and P(4, 5) of the first search and side window blocks as to the next horizontal vector component are newly supplied to the selector SLb and the data buffer DL of the linear processor array LA4 respectively.

Figures 15A, 15B:
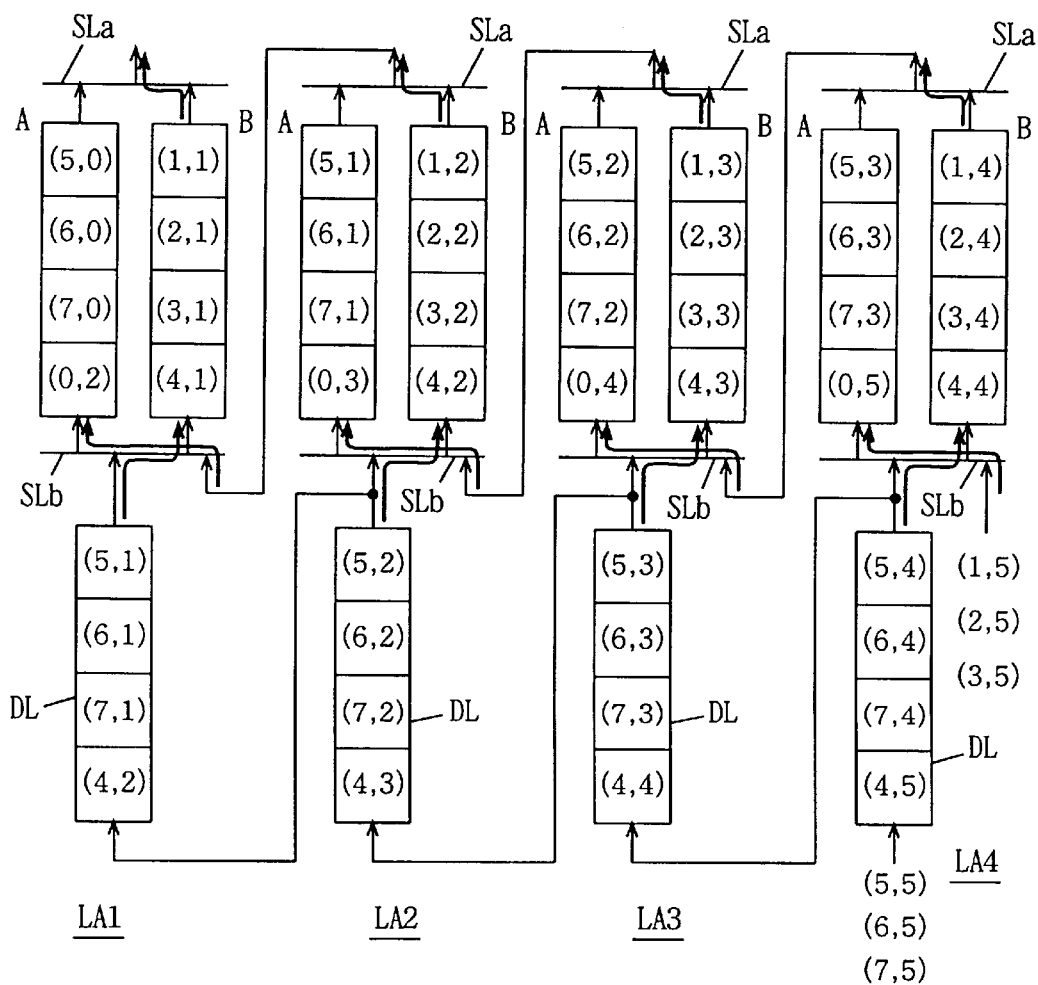
FIGS. 15A and 15B specifically illustrate the operation of the motion vector detection unit according to the embodiment 1 of the present invention.

In the shift-in operation for the pixel data P(0, 5) and P(4, 5), the selectors SLa are set in states of selecting pixel data shifted out from the corresponding B registers respectively. On the other hand, the selectors SLb are set in states of transferring pixel data transferred from the corresponding data buffers DL to the input stage registers of the corresponding B registers while transferring pixel data supplied from the exterior or the selectors SLa to the input stage registers of the corresponding A registers. When the pixel data P(0, 5) and P(4, 5) are shifted in, the B registers store pixel data of a search window block 42i which is below the search window block 42h by one row, as shown in FIGS. 15A and 15B, since the data buffers DL input pixel data of the first row of the side window block in the B registers. On the other hand, the input stage registers of the A registers store pixel data P(0, 2), P(0, 3), P(0, 4) and P(0, 5) of a head row of a search window block which is rightward by one column in the figure since the data shifted out from the B registers are shifted therein.

In this state, respective evaluation values for a motion vector of the search window block 42i are calculated. When this arithmetic operation is completed, pixel data P(1, 5), P(2, 5) and P(3, 5) are successively shifted in the A registers through the selector SLb of the linear processor array LA4, while pixel data P(5, 5), P(6, 5) and P(7, 5) are successively inputted in the data buffer DL of the linear processor array LA4. Evaluation values for a motion vector are calculated and preparation for search window pixel data for a next horizontal vector component is performed every input of pixel data.

Figure 16A:
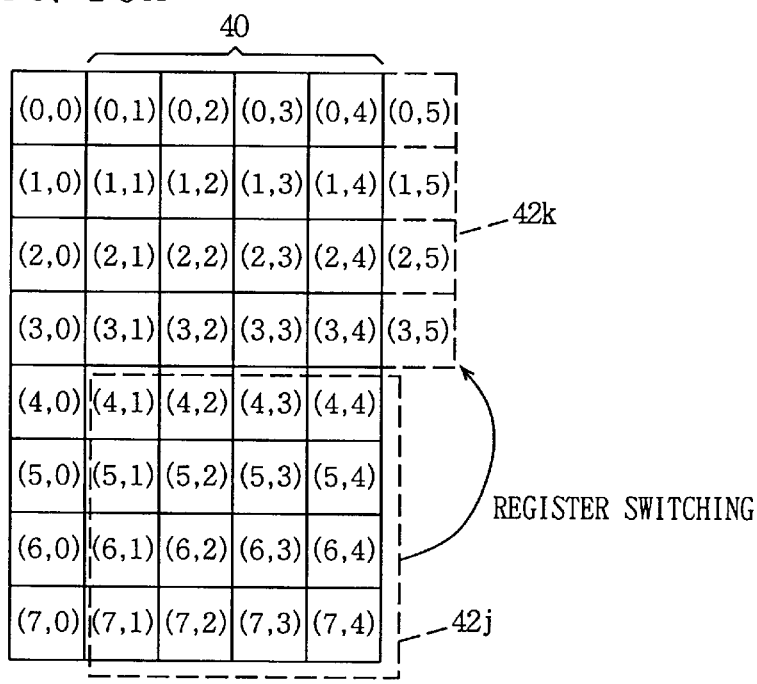
FIGS. 16A and 16B illustrate the specific operation state of the motion vector detection unit according to the embodiment 1 of the present invention.
Figure 16B:
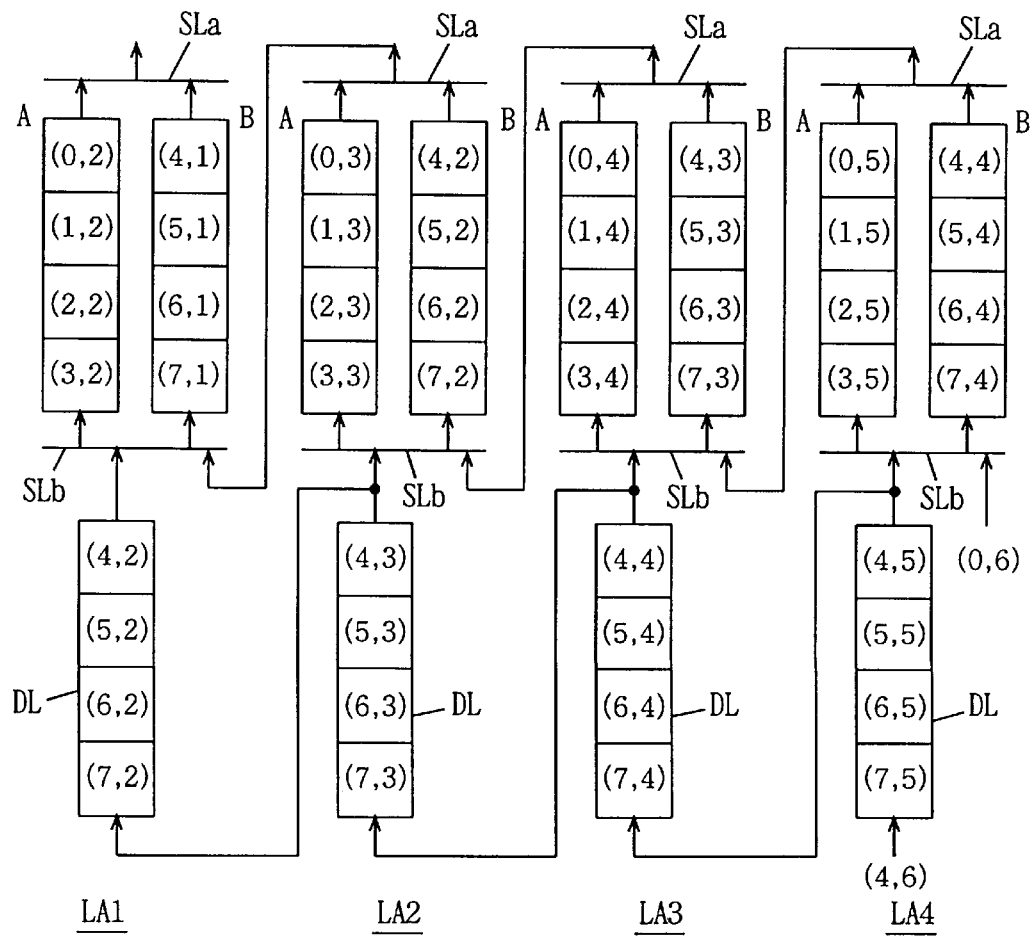

When the pixel data P(3, 5) and P(7, 5) are loaded in the A registers and the data buffer DL of the linear processor array LA4, the B registers of the linear processor arrays LA1 to LA4 store pixel data of a search window block 42j shown in FIG. 16A. As shown in FIGS. 16A and 16B, this search window block 42j is on the lowermost position of the search window 40. When the pixel data of the search window block 42j are stored in the B registers, the A registers of the linear processor arrays LA1 to LA4 store pixel data of a first search window block 42k of a next search window (see FIG. 16B). Therefore, no pixel data are loaded in a next cycle after evaluation value calculation for the search window block 42j, but the connection paths of the selectors SLa and SLb are switched so that the element processors calculate the evaluation values with the pixel data of the search window block 42k stored in the A registers. After evaluation values for the search window block 42k are calculated, pixel data P(0, 6) and P(4, 6) are loaded in the B register and the data buffer DL of the linear processor array LA4 respectively.

It is possible to continuously perform arithmetic operations also in search window block switching in search window change (horizontal vector component change) by transferring pixel data employed for arithmetic operations to registers not employed therefor.

Thereafter evaluation values are calculated through the A registers, while the B registers store pixel data of the first search window block of the next search window.

Figure 17:
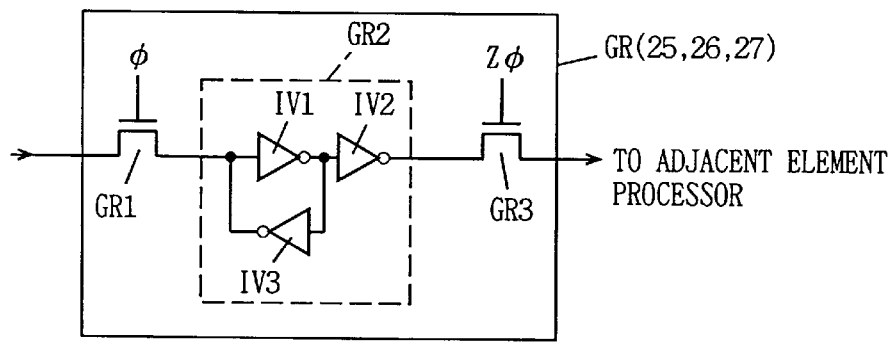
FIG. 17 illustrates an exemplary structure of a register shown in FIG. 2.

FIG. 17 schematically illustrates the structure of each of the T, A and B registers 25, 26 and 27 shown in FIG. 2. The T, A and B registers 25, 26 and 27 are identical in structure to each other, and FIG. 17 generically shows a register GR. These registers 25, 26 and 27 are merely supplied with different clock signals.

Referring to FIG. 17, the register GR includes a transfer gate GR1 which conducts in response to a clock signal φ for incorporating pixel data supplied from a downstream side (the element processor, the data buffer or the exterior), a latch circuit GR2 for latching the data supplied through the transfer gate GR1, and a transfer gate GR3 which conducts in response to a clock signal φ for transferring the pixel data latched by the latch circuit GR2 to a downstream adjacent element processor or the exterior. The transfer gates GR1 and GR3, which are illustrated as being formed by n-channel MOS transistors, may alternatively be formed by CMOS transmission gates or in structures of clocked inverters, for example, so far as the same are elements performing transfer operations in accordance with the clock signals φ and Zφ respectively.

Figure 18:
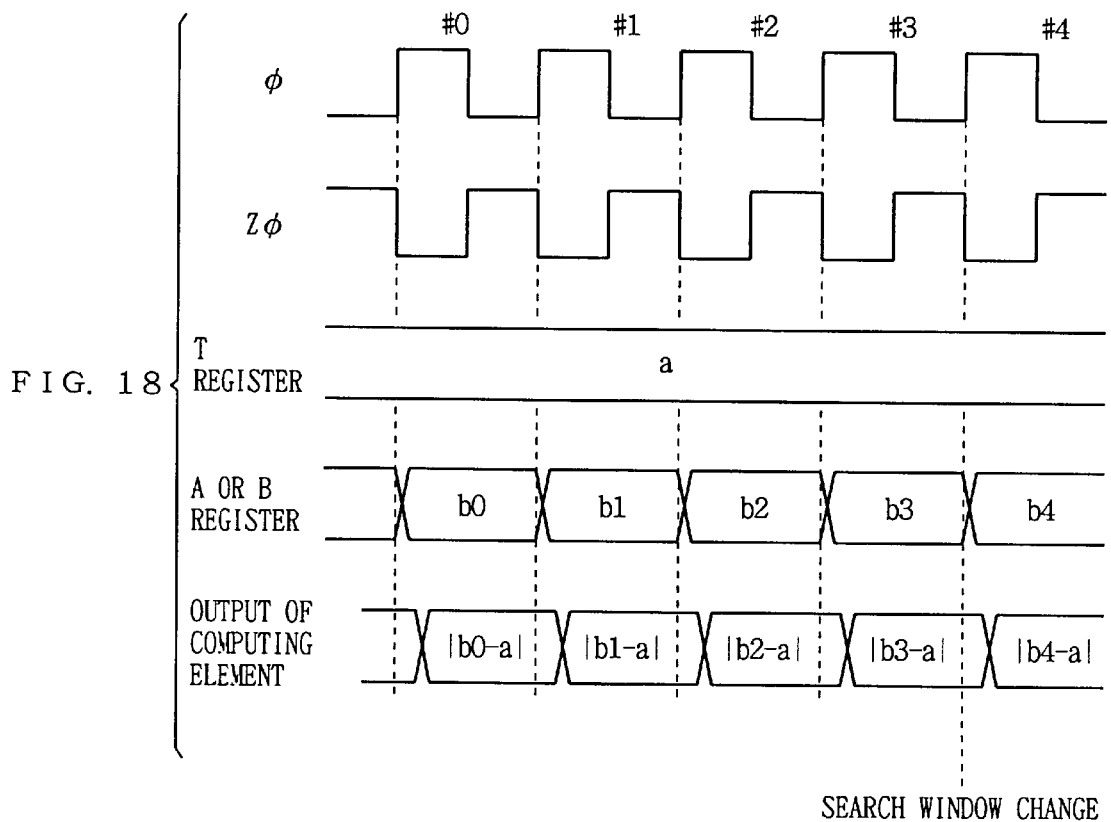
FIG. 18 is a timing chart representing the operation of the element processor shown in FIG. 2.

The latch circuit GR2 includes two stages of cascade-connected invertor circuits IV1 and IV2 for receiving the pixel data from the transfer gate GR1, and an invertor circuit IV3 for inverting and transferring an output signal from the invertor circuit IV1 to an input part of the invertor circuit IV1. The latch circuit GR2, having the so-called "invertor latch" structure, may be in another structure, so far as the same has a latch function. With reference to a timing chart shown in FIG. 18, a data transfer operation and an arithmetic operation of the register GR shown in FIG. 17 is now described.

The clock signals φ and Zφ, which are complementary to each other, define both operation and data transfer cycles. The T register 25 stores template block pixel data a, which is resident in the T register 25 during processing for detecting the motion vector of the template block. On the other hand, the A or B register 26 or 27 performs an image data transfer operation in accordance with the clock signals φ and Zφ.

In a clock cycle #0, the transfer gate GR1 conducts in response to rise of the clock signal φ, so that pixel data b0 is transferred to the register GR (the A or B register). The computing element performs arithmetic processing with the transferred search window block pixel data b0 and the template block pixel data a, for forming and outputting an absolute difference value |b0-a|.

When the clock signal φ is at a high level, the clock signal Zφ is at a low level and the transfer gate GR3 is in a nonconducting state, and hence no pixel data is transferred. When the clock signal φ goes low, the clock signal Zφ goes high and the transfer gate GR3 conducts to transfer pixel data latched by the latch circuit GR2. In an adjacent element processor, however, the transfer gate GR1 is in a nonconducting state and data stored in each register GR remains unchanged.

In a clock cycle #1, the clock signal φ rises to a high level, whereby the transfer gate GR1 conducts to transfer supplied search window block pixel data b1 to the latch circuit GR2. The search window block pixel data b1 latched by the latch circuit GR2 is supplied to the computing element through a selector (not shown), so that an absolute difference value |b1-a| is formed.

Thereafter search window block pixel data are transferred in clock cycles #2 and #3 in response to rise of the clock signal φ so that absolute difference values |b2-a| and |b3-a| are formed through pixel data b2 and b3 respectively. When the search window has a structure of 8 rows by 4 columns as described above, the search window block is positioned on the lowermost part of the search window in the clock cycle #3. Therefore, the register is switched in a clock cycle #4 so that an absolute difference value |b4-a| is calculated with search window block pixel data b4 stored in the switched register. Therefore, arithmetic operations can be continuously executed also in update of the search window, i.e., the horizontal vector component.

Figure 19:
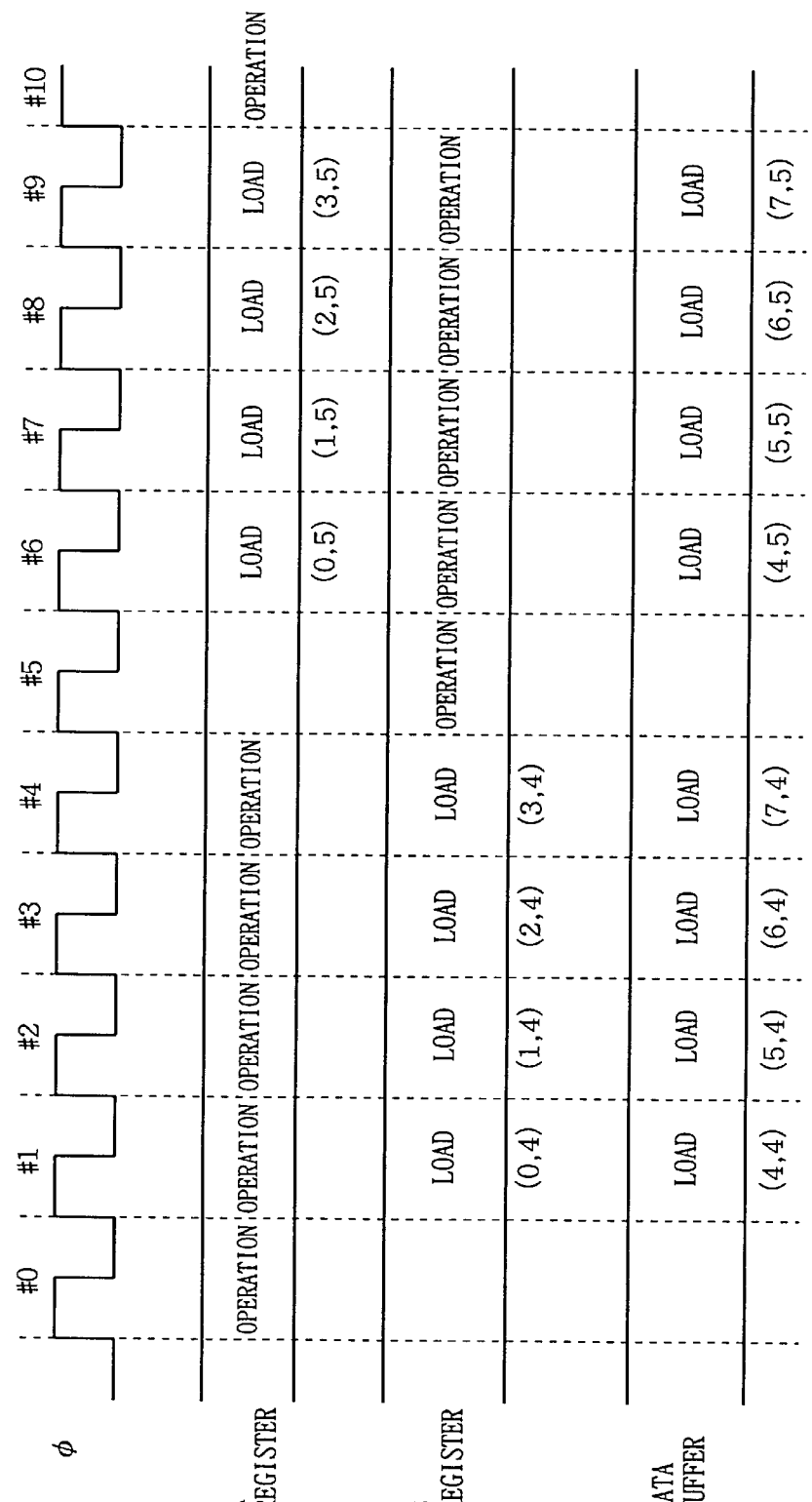
FIG. 19 is a timing chart representing an operation of the motion vector detection shown in FIGS. 11A to 16B.

FIG. 19 is a timing chart of the evaluation value calculation operation shown in FIGS. 11 to 16. With reference to FIG. 19, the data transfer operation is now described.

In a cycle #0 of the clock signal φ, the A register stores pixel data of the first search window block, so that evaluation values are calculated as to the first search window block. When an arithmetic operation in accordance with the pixel data stored in the A register is completed in this clock cycle #0, the A register performs a shift operation, while pixel data P(0, 4) and P(4, 4) are loaded in the B register and the data buffer respectively. In this cycle #1 of shifting and loading, the A register stores pixel data of the next search window block in accordance with a load operation, so that arithmetic processing is performed with the pixel data.

In a clock cycle #2, pixel data P(1, 4) and P(5, 4) are loaded in the B register and the data buffer respectively. The pixel data of the next search window block is shifted in the A register due to the load operation, so that new evaluation values are calculated with the shifted pixel data.

Then, pixel data P(2, 4) and P(3, 4) are loaded in the B register while pixel data (6, 4) and P(7, 4) are loaded in the data buffer in clock cycles #3 and #4 respectively. Arithmetic processing is performed with shifted pixel data in accordance with shift and load operations of the A register, so that evaluation values are calculated respectively.

When the clock cycle #4 is completed, the search window block stored in the A register is positioned on the lowermost part of the search window. On the other hand, the B register and the data buffer store pixel data of the head search window block and the side window block of the next search window respectively. Between this clock cycle #4 and a clock cycle #5, therefore, the registers to be employed are switched so that evaluation values are calculated with pixel data stored in the B register. No new pixel data are loaded in the clock cycle #5.

In a clock cycle #6, pixel data stored in the A register is changed by a shift operation of the B register, while pixel data P(0, 5) is newly loaded from the exterior. New pixel data P(4, 5) is loaded also in the data buffer in this clock cycle #6. In this cycle #6, stored pixel data is shifted in the B register so that evaluation values are calculated with the shifted pixel data.

Thereafter new pixel data P(1, 5), P(2, 5) and P(3, 5) are successively loaded in the A register in clock cycles #7, #8 and, #9 respectively. At the same time, pixel data P(5, 5), P(6, 5) and P(7, 5) are loaded in the data buffer. A pixel data group is shifted in the B register from the corresponding data buffer, so that evaluation values are calculated with the shifted pixel data. When the clock cycle #9 is completed, the search window block stored in the B register is positioned on the lowermost part of the search window. In a next clock cycle #10, therefore, evaluation values are calculated with the pixel data stored in the A register. No pixel data are shifted and loaded in the clock cycle #10.

As clearly understood from the timing chart shown in FIG. 19, evaluation values can be continuously calculated in the respective clock cycles by switching the registers employed for the arithmetic operation, whereby motion vector detection can be performed at a high speed.

Modification

Figure 20:
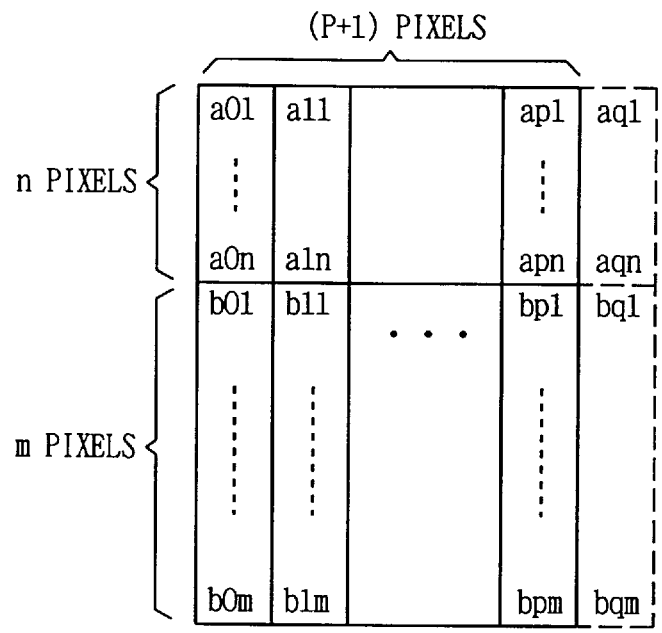
FIG. 20 generally illustrates the operation of the motion vector detection unit according to the embodiment 1 of the present invention.

Description is now made on an evaluation value calculation operation performed when a search window is formed by pixels of (m+n) rows and (p+1) columns and a search window block is formed by n by (p+1) pixels, as shown in FIG. 20. Referring to FIG. 20, an element processor stores pixel data a01 to ap1, . . . , a0n to apn. A data buffer stores pixel data b01 to bp1, . . . , b0m to bpm of a side window block.

Figure 21:
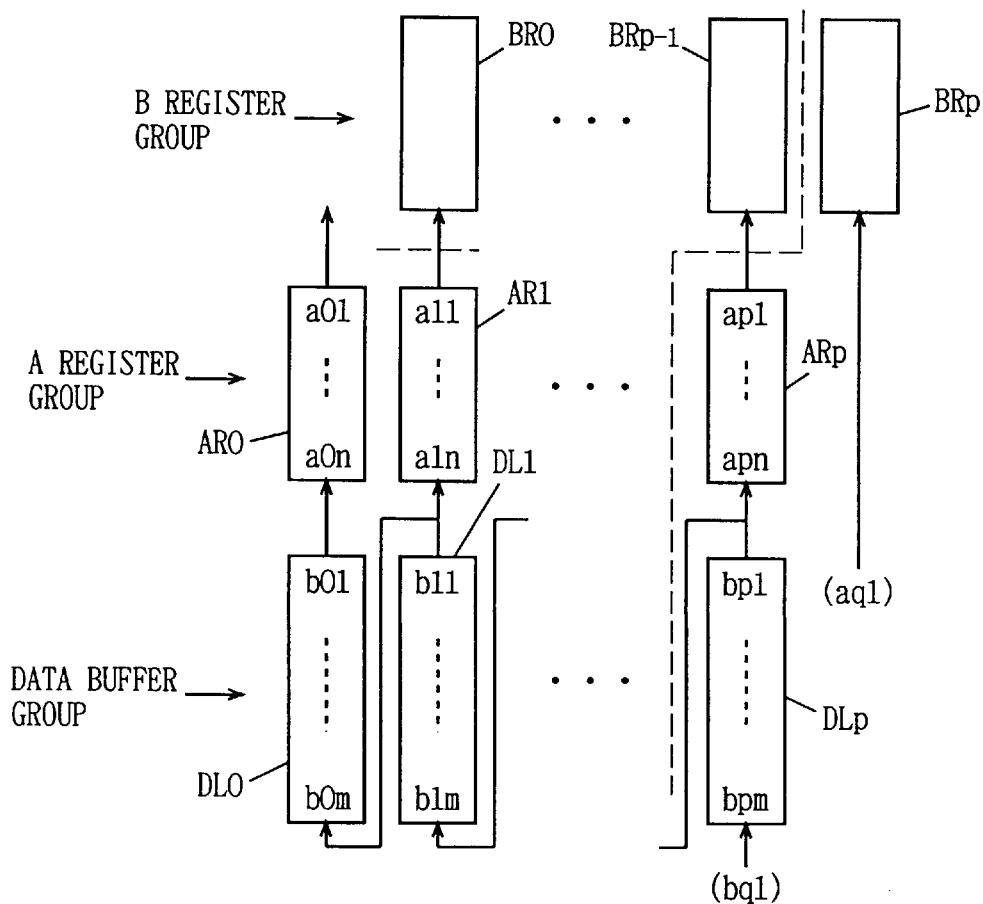
FIG. 21 illustrates the general operation of the motion vector detection unit according to the embodiment 1 of the present invention.
Figure 22:
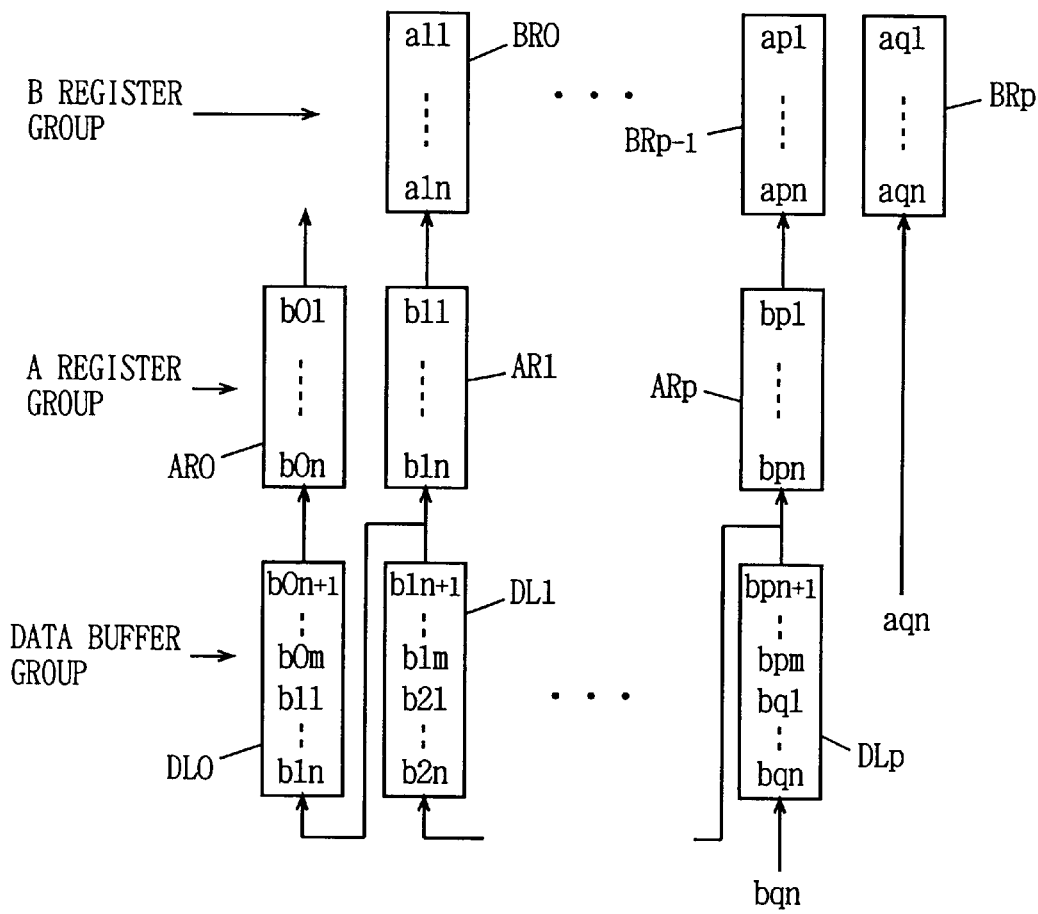
FIG. 22 illustrates the general operation of the motion vector detection unit according to the embodiment 1 of the present invention.

In this structure, A and B registers arranged in n rows and (p+1) columns and data buffers DL0 to DLp arranged in correspondence to the (p+1) columns are provided in a processor array, as shown in FIG. 21. Referring to FIG. 21, The group of A registers arranged in correspondence to respective columns are denoted by AR0, AR1 to ARp, and the group of B registers are similarly denoted by BR0 to BRp-1, BRp. In the A register group, the A register trains AR0 to ARp store pixel data of the corresponding columns respectively, while the data buffers DL0 to DLp store pixel data of a side search window block. Output parts and output stages of the data buffers DL0 to DLp are connected to input parts of upstream data buffers and input parts of the corresponding A register trains AR0 to ARp respectively. Output parts of the A register trains AR1 to ARp are connected to input parts of B registers BR0 to BRp-1 in adjacent upstream linear processor arrays. This connection structure is implemented by selectors (not shown in FIG. 21).

When evaluation values are completely calculated with the pixel data stored in the A register trains AR0 to ARp, pixel data bq1 and aq1 are loaded in the data buffer DLp and the B register train BLp respectively. Due to the loading of the pixel data in the data buffer DLp, data stored in the data buffers DL0 to DLp are shifted while stored pixel data are shifted also in the A register trains AR0 to ARp in response thereto, so that pixel data a11 to ap1 of uppermost rows from the A register trains AR1 to ARp are shifted in input stage registers of the B register group BR0 to BRp-1 respectively.

Figure 23:
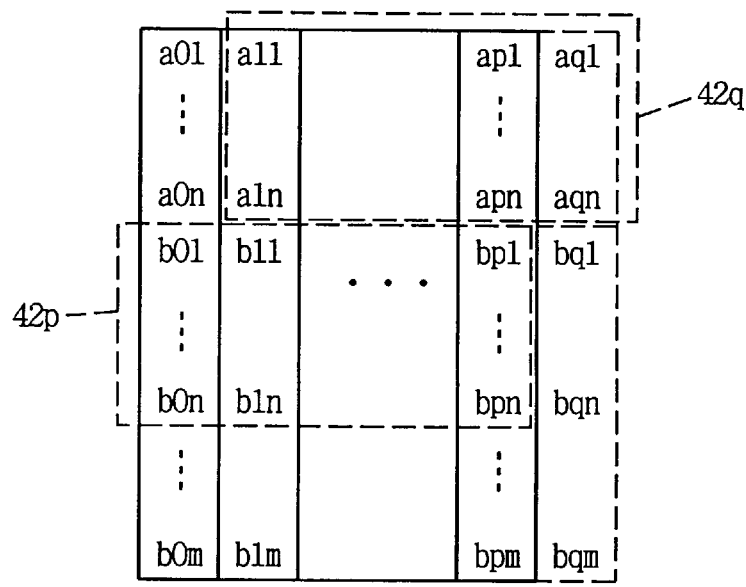
FIG. 23 illustrates arrangement of search window block pixels in a processor array shown in FIG. 22.

When the shift/load operation is performed n times and pixel data aqn and bqn are loaded in the B register train BLp and the data buffer DLp respectively, the A register trains AR0 to ARp store pixel data of a search window block 42p shown in FIG. 23. The B register trains BR0 to BRp store pixel data of a search window block 42q shown in FIG. 23. This search window block 42q is the first search window block of the next search window. Thus, the B register trains BR0 to BRp store all necessary pixel data, whereby loading of pixel data in the B register trains BR0 to BRp is stopped from the next cycle so that the B register trains BR0 to BRp merely hold the stored pixel data, as shown in FIG. 24A.

Figure 24A:
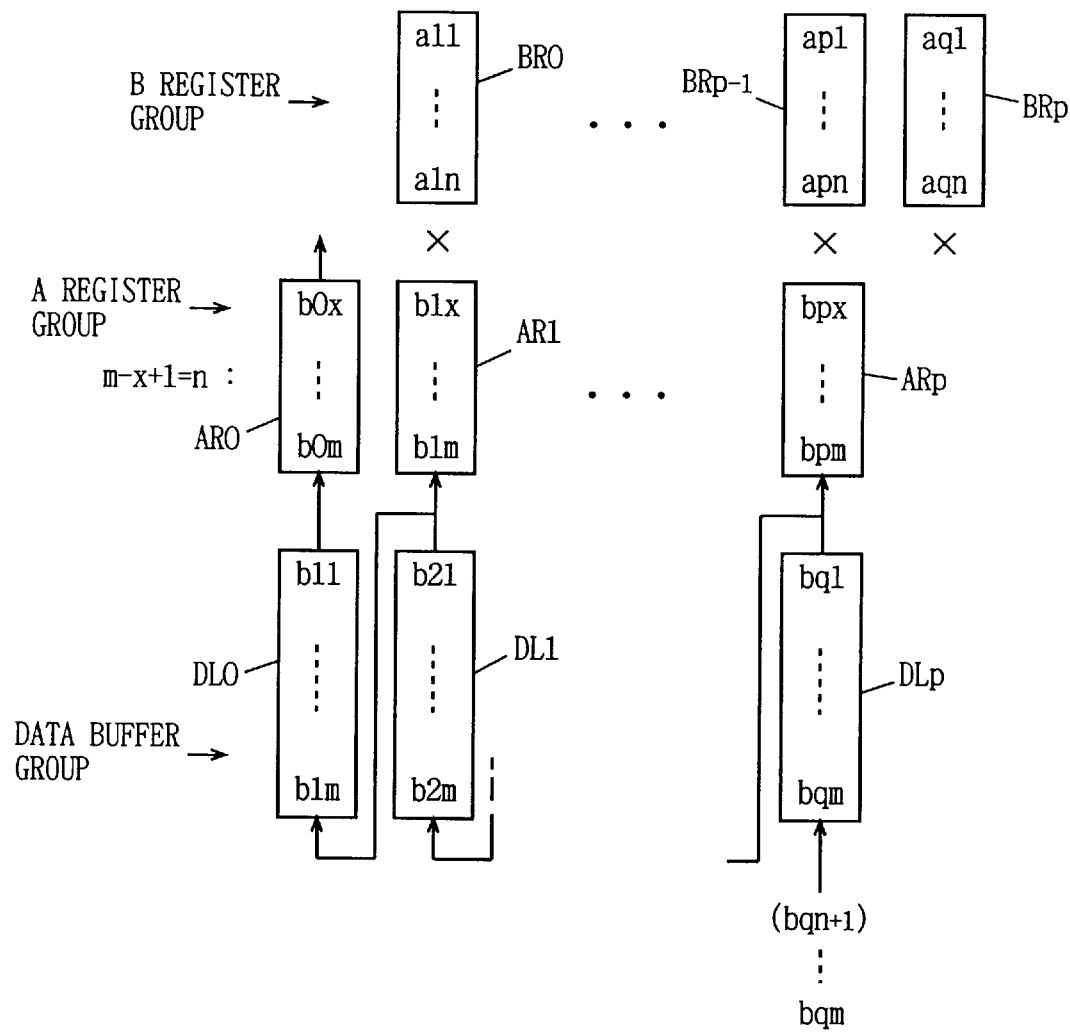
FIGS. 24A and 24B illustrate the general operation of the motion vector detection unit according to the embodiment 1 of the present invention.
Figure 24B:
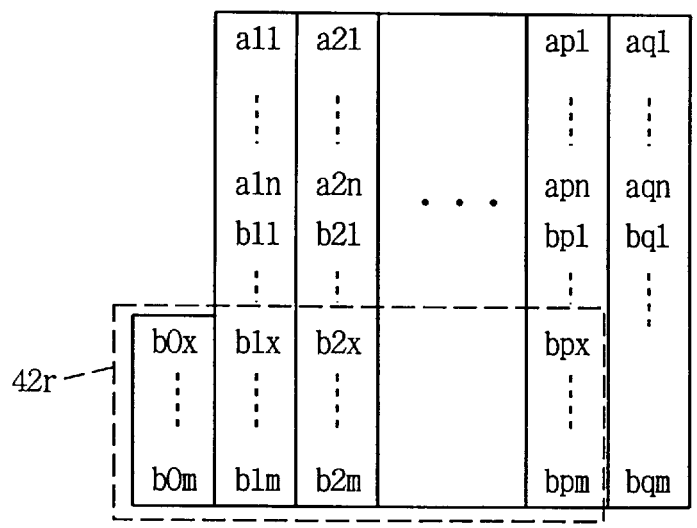

As shown in FIG. 24A, therefore, a shift operation for search window block pixel data through the data buffers DL0 to DLp and the A register trains AR0 to ARp is performed from this cycle, so that evaluation values are calculated for the respective pixel data, as shown in FIG. 24A. When pixel data bqn+1, . . . bqn are successively loaded in the data buffer DLp, data transfer is performed in the data buffers DL0 to DLp in accordance with this load operation, so that a search window block 42r shown in FIG. 24B is stored in the A register trains AR0 to ARp. This search window block 42r is on the lowermost position of the search window. When the calculation operation for the search window block 42r is completed, therefore, connections of the A register trains and the B register trains are switched in a next cycle, as shown in FIG. 25A.

Figure 25A:
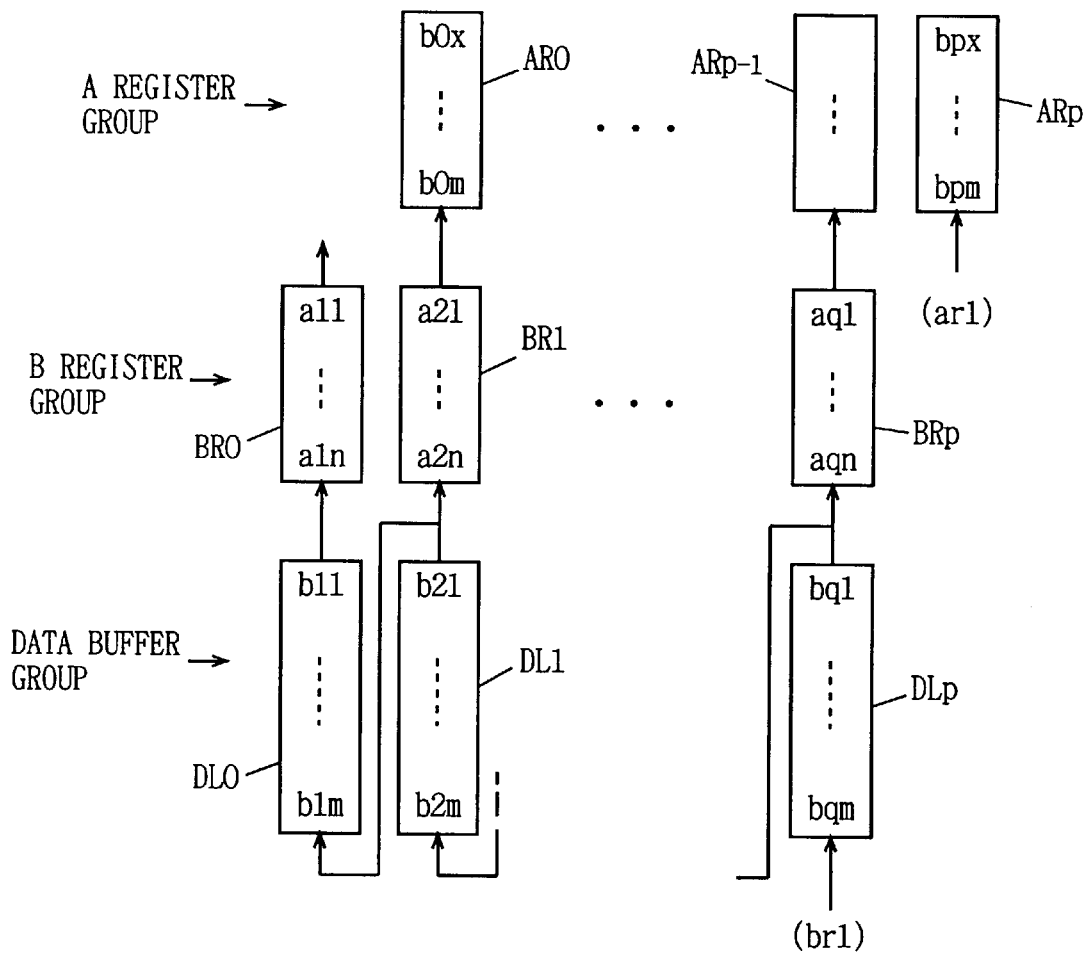
FIGS. 25A and 25B illustrate the general operation of the motion vector detection unit according to the embodiment 1 of the present invention.
Figure 25B:
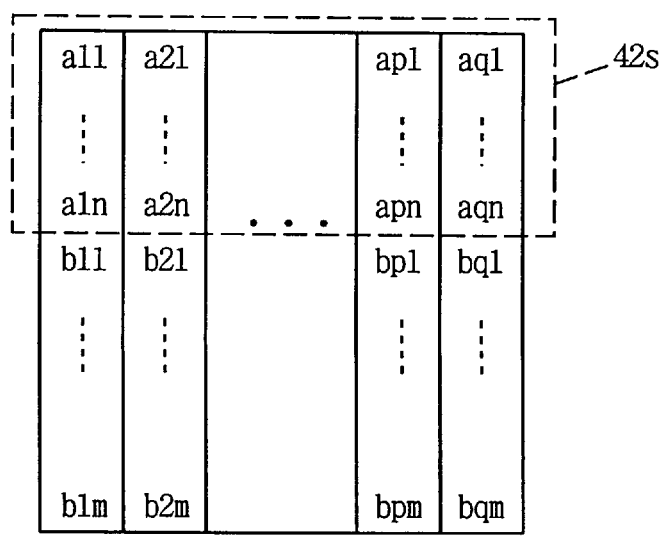

Namely, the data buffers DL0 to DLp are coupled to the B register trains BR0 to BRp of the corresponding columns for shifting pixel data therein, as shown in FIG. 25A. The B register trains BR1 to BRp shift pixel data in A register trains AR0 to ARp-1 of the linear processor array which is upstream by one column respectively. In this state, the B register trains BR0 to BRp already store pixel data a11 to aqn of a search window block 42s, evaluations of which are calculated with the pixel data stored in the B register trains BR0 to BRp. When this evaluation value calculation operation is completed, head pixel data ar1 of a next column is loaded in the A register train ARp, while a head pixel br1 of a side window block of the next column is loaded in the data buffer DLp. A similar operation is thereafter repeated so that evaluation values for the respective search window blocks are calculated.

Figure 26:
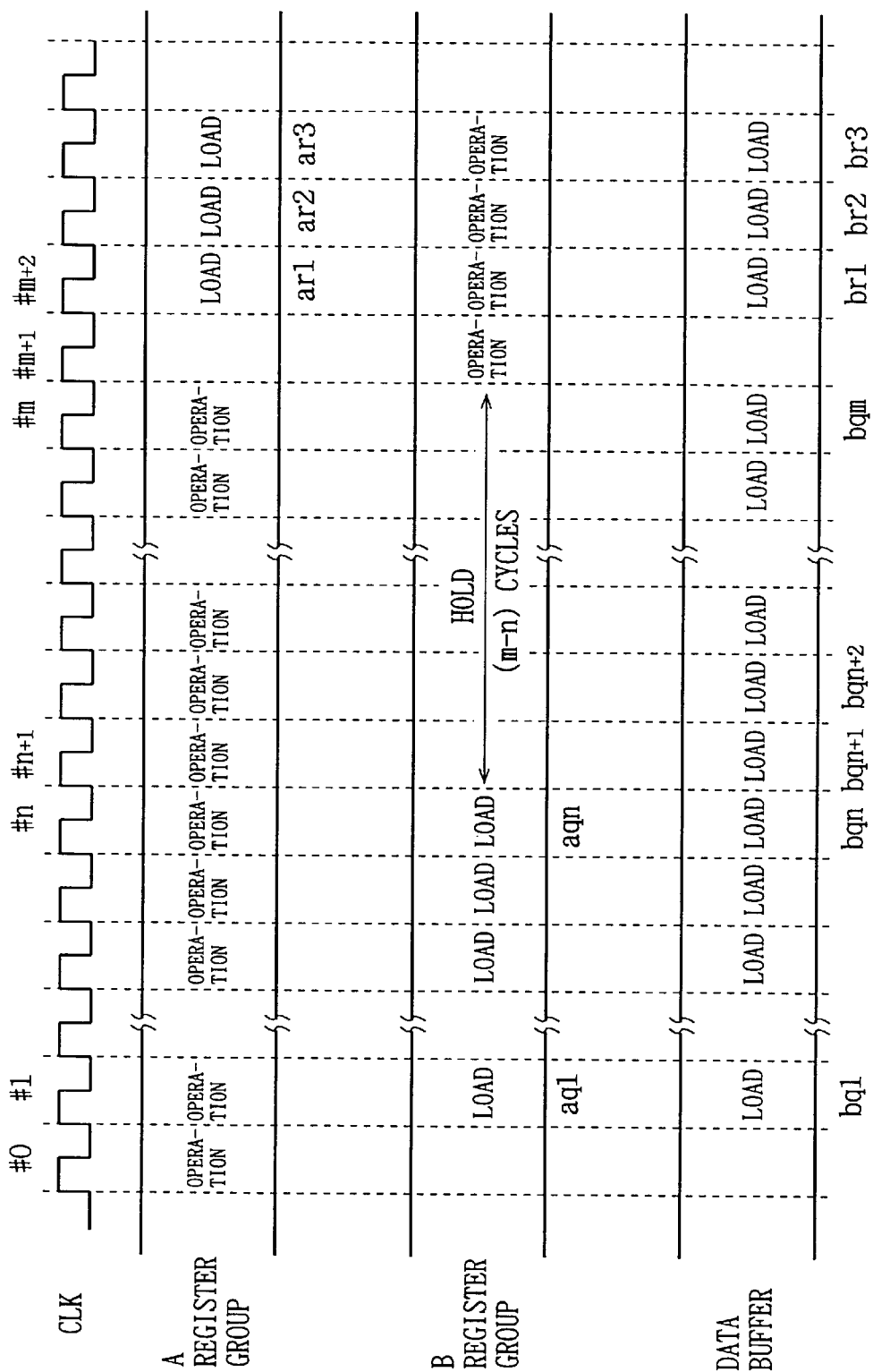
FIG. 26 is a timing chart representing the general operation of the motion vector detection unit according to the embodiment 1 of the present invention.

FIG. 26 is a timing chart showing the operation of this modification. Referring to FIG. 26, evaluation values are calculated in a clock cycle #0 with the pixel data stored in the A register group.

In a next clock cycle #1, the pixel data aq1 and bq1 are loaded in the B register group and the data buffers, the A register group performs shift operations of pixel data, and evaluation values are calculated with the shifted pixel data. Thereafter the load/shift operation for the pixel data and calculation of evaluation values are performed every clock cycle. In a clock cycle #n, pixel data aqn and bqn are loaded in the B register group and the data buffer groups. The A register group calculates evaluation values with pixel data newly shifted therein. In the B register group, all head search window block pixel data of a next search window are loaded. Therefore no pixel data are loaded in the B register group from a next clock cycle (#n+1), and the B register group holds the pixel data held therein. Pixel data are loaded/shifted in the A register group and the data buffers every clock cycle, so that evaluation values are calculated.

In a clock cycle #m, pixel data bqm are loaded in the data buffer, and evaluation values are calculated with pixel data shifted in the A register group. In this clock cycle #m, evaluation value calculation for a single search window is completed. Namely, evaluation value calculation of all vertical vector components as to a single horizontal vector component is completed.

In a next clock cycle (#m+1), the register groups are switched so that evaluation values are calculated with pixel data stored in the B register group. In this clock cycle, no data are loaded in the A register group and the data buffers.

In a next clock cycle (#m+2), pixel data ar1 and br1 are loaded in the A register group and the data buffers respectively. The B register group shifts pixel data in accordance with this loading, for calculating evaluation values with the shifted pixel data. Thereafter evaluation values are calculated with pixel data stored in the B register group, while pixel data of a search window block for a next horizontal vector component are stored in the A register group. The register groups employed for the arithmetic operation are switched every (m+1) cycle.

Structure of Selector

Figure 27A:
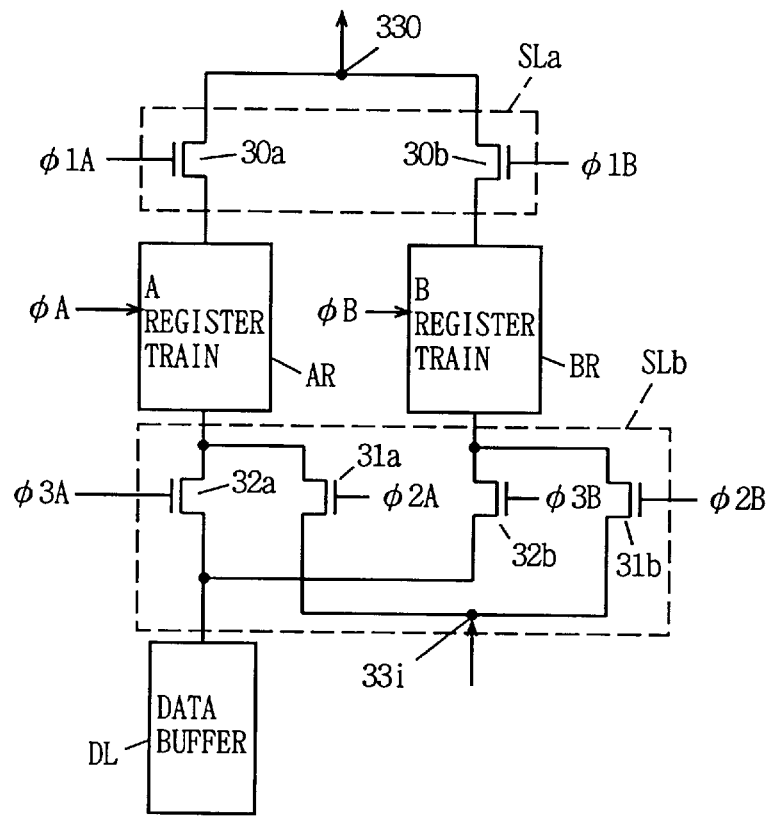
FIG. 27A schematically illustrates the structures of selectors in the processor array shown in FIG. 3.

FIG. 27A schematically illustrates exemplary structures of selectors SLa and SLb included in the processor array. Referring to FIG. 27A, the selector SLa includes a transfer gate 30a which conducts in response to a control signal φ1A for transferring pixel data outputted from an A register train AR to an output node 33o, and a transfer gate 30b which conducts in response to a control signal φ1B for transferring pixel data outputted from a B register train BR to the output node 33o.

The selector SLb includes a transfer gate 31a which conducts in response to a control signal φ2A for transferring pixel data supplied in an input node 33i to an input stage of the A register train AR, a transfer gate 31b which conducts in response to a control signal φ2B for transferring the pixel data supplied to the input node 33i to an input stage of the B register train BR, a transfer gate 32a which conducts in response to a control signal φ3A for transferring pixel data outputted from a corresponding data buffer DL to an input part of the A register train AR, and a transfer gate 32b which conducts in response to the control signal φ3B for transferring the pixel data outputted from the data buffer DL to an input part of the B register train BR.

Referring to FIG. 27A, all transfer gates 30a to 32b are illustrated as being formed by n-channel MOS transistors. Alternatively, these transfer gates 30a to 32b may be formed of arbitrary elements such as CMOS transmission gates or tristate invertor buffers, so far as the same have functions of entering output high impedance states when inactivated while transferring supplied data when activated.

Figure 27B:
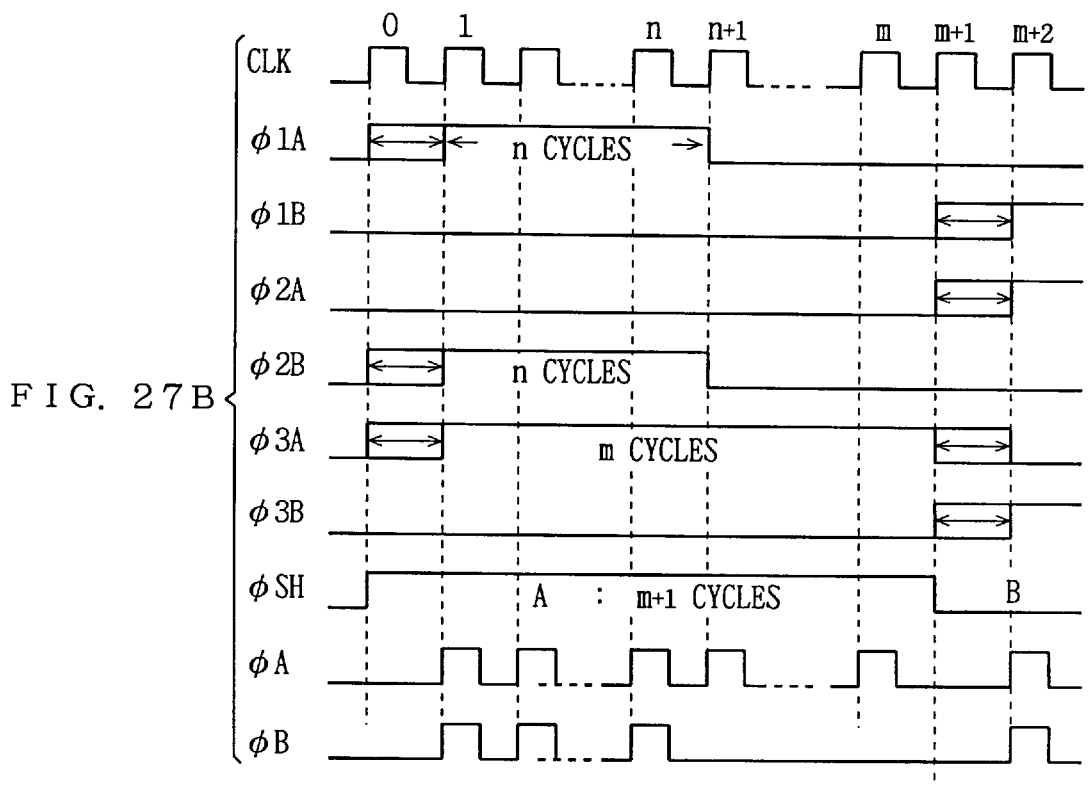
FIG. 27B is a timing chart representing the operations of the selectors.

The A register train AR and the B register train BR perform data transfer between internal registers thereof in accordance with clock signals φA and φB respectively. The operation shown in FIG. 27A is now described with reference to FIG. 27B, which is a timing chart thereof.

In a cycle 0 of a clock signal CLK, the control signals φ1A, φ2B and φ3A go high to allow conduction of the transfer gates 30a, 31b and 32a. Thus, the pixel data outputted from the A register train AR is transferred to the output node 33o through the transfer gate 30a. On the other hand, the inputted pixel data or that outputted from a downstream A register train is inputted in the B register train BR through the transfer gate 31b. The A register train AR is supplied with the pixel data from the data buffer DL through the transfer gate 32a. The control signals φ1A and φ2B maintain active states up to completion of an n-th cycle of the clock signal CLK.

In the cycle 0, required first search window block pixel data of a next necessary search window is stored in the B register train BR. The AR register train AR and the B register train BR transfer pixel data therein in accordance with the clock signals φA and 100 B respectively. These clock signals φA and φB are generated from a first cycle of the clock signal CLK. The clock signal φB is generated during an n cycle period, so that n pixel data are successively stored in the B register train BR. On the other hand, the clock signal φA is continuously generated up to an m-th cycle of the clock signal CLK. Thus, m pixel data successively supplied from the data buffer DL are successively transferred in the A register train AR.

The A register train AR supplies the computing element 28 with pixel data stored therein through the selector 29 shown in FIG. 2 by a control signal φSH. This control signal φSH selects the data stored in the A register train AR from the 0-th cycle up to the m-th cycle.

In the 0-th cycle of the clock signal CLK, the control signals φ1A, φ2B and φ3A may not be activated in particular. These control signals φ1A, φ2B and φ3A may be activated from the first cycle 1 of the clock signal CLK respectively, since actual pixel data transfer is performed from this clock cycle 1.

In an (m+1)-th cycle of the clock signal CLK, the control signal φSH goes low to transfer the pixel data stored in the B register train BR to the corresponding computing element included therein. In this (m+1)-th cycle, no pixel data are shifted/transferred.

The pixel data are shifted/transferred from the next (m+2)-th cycle, from which the control signals φA and φB are generated. In this case, the clock signal φA is generated n times, while the clock signal φB is generated m times. At this time, the control signals φ1B, φ2A and φ3B are activated in the (m+2)-th clock cycle. In this state, the B register train BR is connected to the output node 33o and the data buffer DL through the transfer gates 30b and 32b respectively. The input part of the A register train AR is connected to the input node 33i through the transfer gate 31a. Thus, pixel data employed for an arithmetic operation in a downstream B register train are successively stored in the upstream A registers. Thereafter this operation is repeated every (m+1) cycles. In the (m+1)-th cycle, no pixel data are shifted/transferred. In this period, therefore, the control signals φ1B, φ2A and φ3B may be activated, as shown by arrows in FIG. 27B. Further, the control signal φ3A may be activated during this period.

Structure of Control Signal Generation Part

Figure 28A:
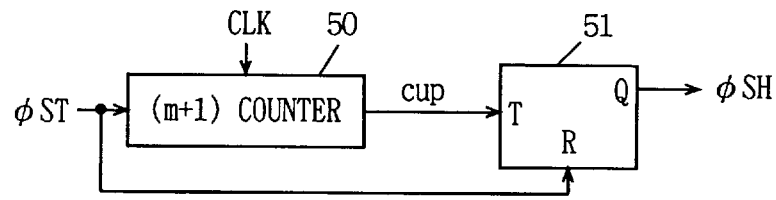
FIG. 28A illustrates the structure of a connection control signal generation part of a selector shown in FIG. 2.

FIG. 28A illustrates the structure of a switching control signal φSH generation part. Referring to FIG. 28A, the switching signal φSH generation part includes an (m+1) counter 50 which is started in response to a motion vector detection operation start instruction signal φST for counting the clock signal CLK, and a T flip-flop 51 for changing the state of the signal φSH from its output Q in response to a count-up signal cup from the counter 50. The start instruction signal fST is supplied to a reset input R of the T flip-flop 51. The (m+1) counter 50 brings the count-up signal cup into a high level of an active state when the same detects rise of the clock signal CLK (m+1) times in starting.

Figure 28B:
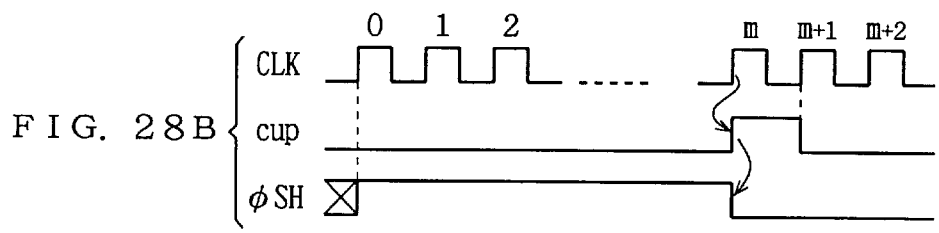
FIG. 28B is a timing chart representing its operation.

As shown in an operation timing chart of FIG. 28B, the T flip-flop 51 is reset so that the signal φSH from its output Q is set in an A register selecting state of a high level when the start instruction signal fST is activated in the cycle 0 of the clock signal CLK. The (m+1) counter 50 is started to count rise of the clock signal CLK from the 0-th cycle. When the rise of the clock signal CLK is counted (m+1) times, the count-up signal cup goes high and the signal φSH outputted from the T flip-flop 51 falls to a low level in response. The count-up signal cup returns to a low level in response to next rise (rise in y the (m+1)-th cycle) of the clock signal CLK. The (m+1) counter 50, which is a cyclic counter, repetitively generates the count-up signal cup until a motion vector of a single template block is detected.

When an evaluation value calculation operation for a single template block is completed through a path (not shown), the count operation of the (m+1) counter 50 is stopped by the signal φST.

It is possible to change the connection switching signal φSH every (m+1) cycles for alternately selecting the A and B registers by utilizing the structure shown in FIG. 28A.

Figure 29A:
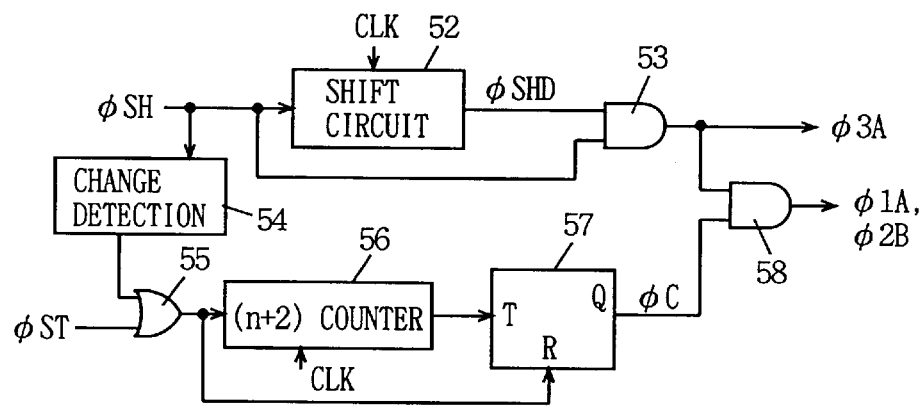
FIG. 29A illustrates the structure of a connection control signal generation part of each selector shown in FIG. 27A.

FIG. 29A illustrates the structure of a part generating the control signals φ1A, φ2B and φ3A shown in FIG. 27A. Referring to FIG. 29A, the control signal generation part includes a shift circuit 52 for performing a shift operation in accordance with the clock signal CLK and delaying the switching control signal φSH by one clock cycle period, and an AND circuit 53 for receiving an output signal φSHD from the shift circuit 52 and the switching control signal φSH. The AND circuit 53 outputs the control signal φ3A.

The control signal generation part further includes a change detection circuit 54 for detecting change of the switching control signal φSH, an OR circuit 55 for receiving a change detection signal from the change detection circuit 54 and the evaluation value operation start instruction signal φST, an (n+2) counter 56 which is started in response to an output signal from the OR circuit 55 for counting rise of the clock signal CLK (n+2) times, a T flip-flop 57 for changing the state of a signal φc from its output Q in accordance with a count-up signal of the (n+2) counter 56, which is reset in response to rise of the output signal of the OR circuit 55, and an AND circuit 58 for receiving output signals of the T flip-flop 57 and the AND circuit 53. The AND circuit 58 outputs the control signals φ1A and φ2B.

Figure 29B:
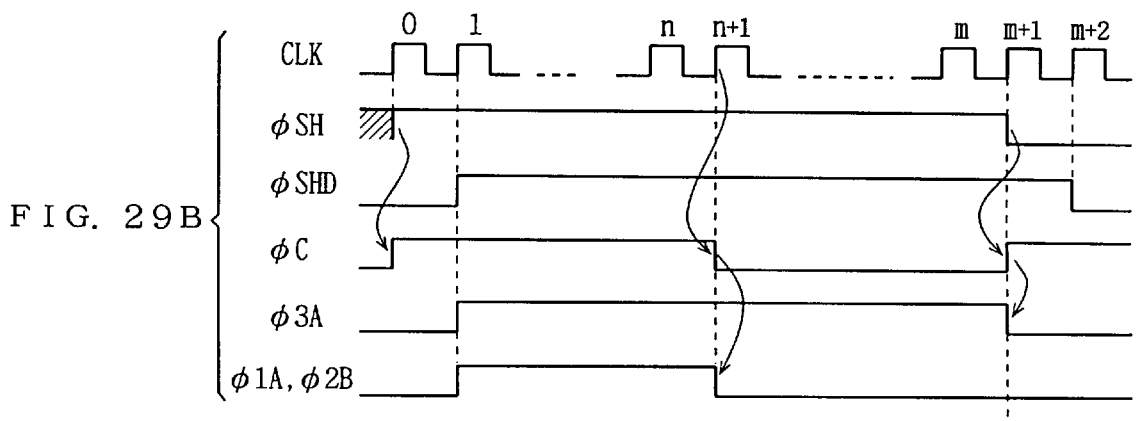
FIG. 29B is a timing chart representing its operation.

The change detection circuit 54 outputs a one-shot pulse signal having a prescribed pulse width in response to each of rise and fall of the switching control signal φSH. A structure employed as an ATD circuit for detecting change of an address signal in a memory field, for example, can be employed for the change detection circuit 54. The operation of the control signal generation part shown in FIG. 29A is now described with reference to a timing chart shown in FIG. 29B.

In the cycle 0 of the clock signal CLK, the switching control signal φSH rises to a high level, the output signal of the OR circuit 55 is activated in accordance with the output signal of the change detection circuit 54 or the operation start instruction signal φST, and the (n+2) counter 56 starts the count operation. In accordance with the output signal of the OR circuit 55, the T flip-flop 57 is reset in accordance with the signal supplied to its reset input R, and the signal φc rises to a high level.

In the cycle 1 of the clock signal CLK, the signal φSHD outputted from the shift circuit 52 goes low, and the control signal φ3A outputted from the AND circuit 53 goes high. Simultaneously with the rise to high level of the control signal φ3A, the control signals φ1A and φ2B outputted from the AND circuit 58 also rise to high levels. Then, the (n+2) counter 56 counts rise of the clock signal CLK (n+2) times, whereby the state of the output signal φc from the T flip-flop 57 is changed and lowered to a low level in a cycle (n+1) of the clock signal CLK. In synchronization with the fall of the control signal φc, the control signals φ1A and φ2B also fall to low levels.

The switching control signal φSH falls to a low level in the clock cycle (m+1), whereby the (n+2) counter 56 is started again in accordance with the output signal of the change detection circuit 54 following this change, to start the count operation. At this time, the T flip-flop 57 is reset so that its control signal φc rises to a high level. When the control signal φSH falls to the low level, the control signal φ3A outputted from the AND circuit 53 falls to a low level.

The control signals φB, φ2A and φ3B can be readily generated by employing an inverted signal ZφSH in place of the switching control signal φSH in the structure shown in FIG. 29A. Also the structure shown in FIG. 29A is activated in start of the motion vector detection operation for the template block, and these circuits are inactivated (the path is not shown) when the motion vector detection operation as to the single template block is completed (the evaluation values are completely calculated). In FIG. 29, the signal φST may be a one shot pulse generated upon starting of a motion vector searching operation. Alternatively, a one shot pulse generator may be provided for the signal φST of the signal φST is kept high during a motion vector searching operation for a single template block.

Figure 30A:
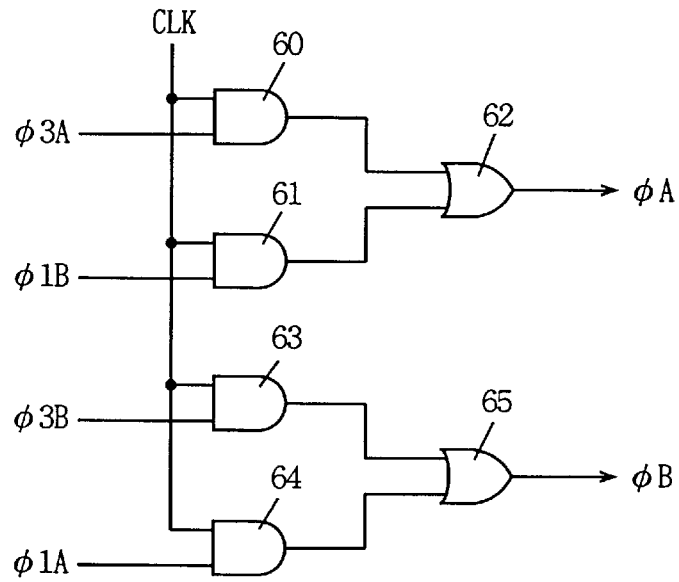
FIG. 30A illustrates the structure of a transfer operation control clock signal generation part of a register train shown in FIG. 27A.
Figure 30B:
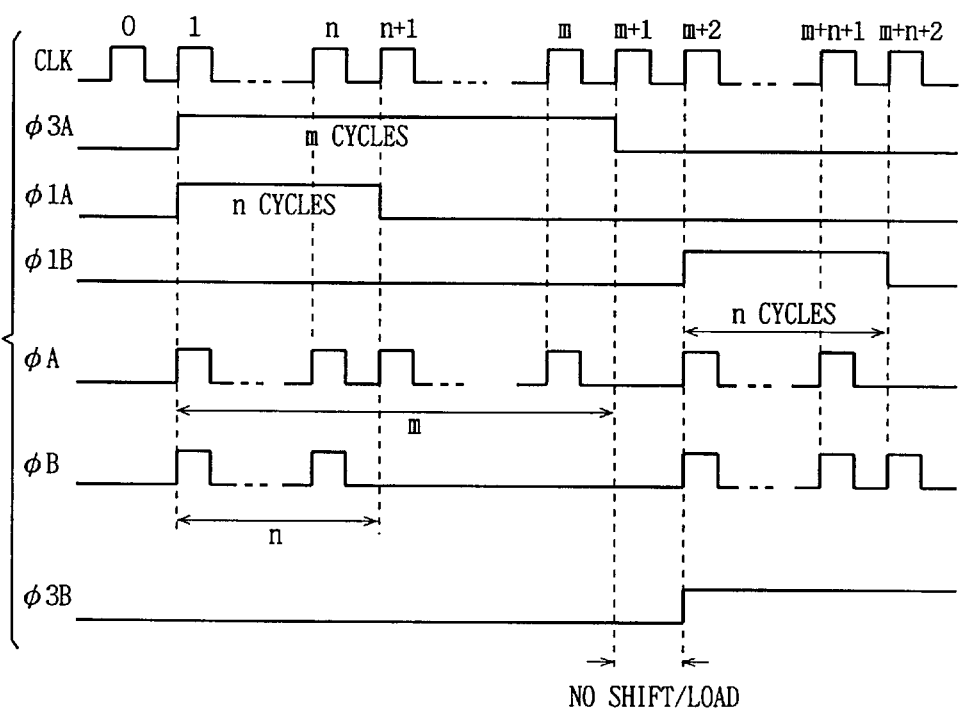
FIG. 30B is a timing chart representing its operation.

FIG. 30A illustrates the structure of a part for generating the clock signals φA and φB for controlling the transfer operation of the register trains. Referring to FIG. 30A, the clock signal generation part includes an AND circuit 60 receiving the clock signal CLK and the switching control signal φ3A, an AND circuit 61 receiving the clock signal CLK and the control signal φ1B, an OR circuit 62 receiving output signals of the AND circuits 60 and 61, an AND circuit 63 receiving the clock signal CLK and the switching control signal φ3B, an AND circuit 64 receiving the clock signal CLK and the control signal φ1A, and an OR circuit 65 for receiving output signals of the AND circuits 63 and 64. The OR circuits 62 and 65 output the clock signals φA and φB respectively. The operation of the clock signal generation part shown in FIG. 30A is now described with reference to FIG. 30B, which is a timing chart thereof.

In the clock cycle 0, an evaluation value calculation operation for the template block is started. In the clock cycle 1, the control signal φ3A goes high, the AND circuit 60 is enabled, and the clock signal φA is outputted for an m cycle period in accordance with the clock signal CLK. On the other hand, the control signal φ3B is at a low level, and the AND circuit 63 is in a disabled state. The control signal φ1A goes high for an n cycle period from the clock cycle 1, the AND circuit 64 is enabled, and the transfer clock signal φB is generated in accordance with the clock signal CLK in this n cycle period.

When the m-th cycle of the clock signal CLK is completed, the control signal φ3A goes low, the AND circuit 60 is disabled, and generation of the clock signal φA is stopped. In the (n+1)-th clock cycle, therefore, no transfer control signal is generated and pixel data are not shifted/loaded.

In the (m+2)-th cycle of the clock signal CLK, the control signal φ3B goes high (is activated) in accordance with the signal ZφSH, whereby the AND circuit 63 is enabled and the OR circuit 65 outputs the clock signal φB in accordance with the clock signal CLK for an n cycle period. On the other hand, the control signal φ1B is brought into a high level for the n cycle period from the (m+2)-th clock cycle, the AND circuit 61 is enabled, and the clock signal φA is generated through the OR circuit 62 for the n cycle period in synchronization with the clock signal CLK. Thus, n pixel data are transferred in the A register train.

While the control signals φ1A, φ1B, φ3A and φ3B are employed in the structure shown in FIG. 30A, any other appropriate control signals may alternatively be employed. In the structures shown in FIGS. 28A to 30B, the signals are changed at late timings in the timing chart shown in FIG. 27B. A control signal generation part can be similarly implemented also as to the case of activating the control signals φ1A, φ1B, φ2A, φ2B, φ3A and φ3B at faster timings respectively. In this case, however, it is necessary to stop generation of the transfer clock signals φA and φB for one clock cycle period through delay signals φSHD and ZφSHD respectively, in order to generate the clock signals φA and φB shown in FIG. 30A.

Figure 31:
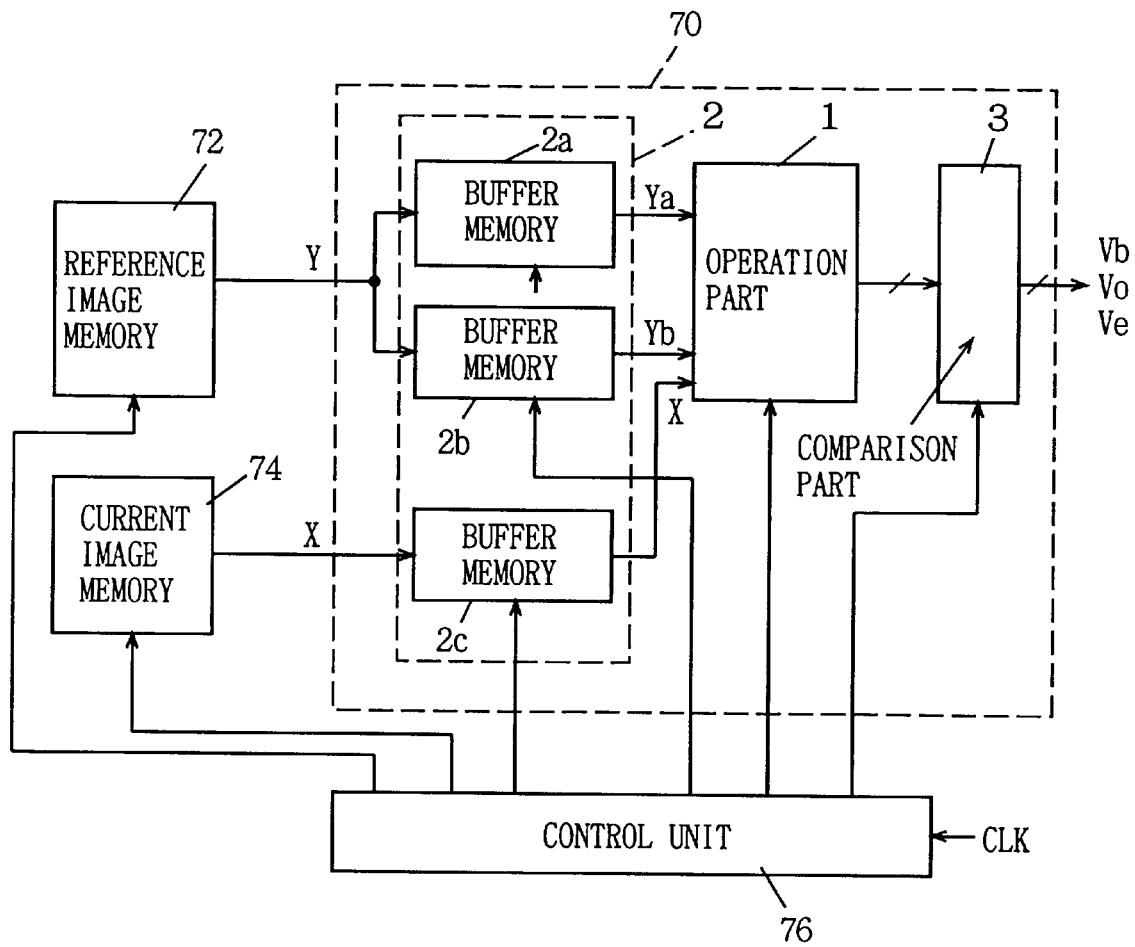
FIG. 31 schematically illustrates the overall structure of a coding system employing the motion vector detection unit according to the embodiment 1 of the present invention.

FIG. 31 illustrates the overall structure of a system employing the motion vector detection unit according to the embodiment 1 of the present invention. Referring to FIG. 31, this motion vector detection system includes a reference image memory 72 for storing reference image pixel data by one frame, for example, a current image memory 74 for storing current image pixel data by one frame, and a motion vector detection unit 70 for detecting motion vectors through the pixel data from the reference and current image memories 72 and 74.

Similarly to the structure shown in FIG. 1, the motion vector detection unit 70 includes an input part 2 for receiving search window pixel data Y and template block pixel data X from the reference and current image memories 72 and 74 respectively and outputting the same in prescribed order, an operation part 1 for generating evaluation values of a search window block in accordance with the pixel data supplied from the input part 2, and a comparison part 3 for generating motion vectors Vb, Vo and Ve in parallel with each other in accordance with the evaluation values from the operation part 1.

The input part 2 includes a buffer memory 2a for storing first search window block pixel data of a search window in the search window pixel data Y supplied from the reference image memory 72, a buffer memory 2b for storing pixel data of a first side window block of the search window, and a buffer memory 2c for storing the template block pixel data X supplied from the current image memory 74. The pixel data stored in the buffer memory 2a is supplied to an A or B register of each element processor included in the operation part 1. Pixel data Yb stored in the buffer memory 2b is supplied to each data buffer included in the operation part 1. The template block pixel data X stored in the buffer memory 2c is supplied to a T register of each element processor included in the operation part 1.

A control unit 76 generates necessary control signals in accordance with a clock signal CLK, and controls data writing/reading in/from the reference and current image memories 72 and 74 and data write/read operations of the buffer memories 2a, 2b and 2c included in the input part 2. This control unit 76 further informs the comparison part 3 of the fact that operation control (connection switching of selectors) in the operation part 1 and a comparing operation in the comparison part 3 as to evaluation value calculation timings and a motion vector detection cycle for a single template block is completed.

It is possible to supply pixel data Ya and Yb in parallel with each other in the operation part 1 by providing the buffer memories 2a and 2b for storing the head search window block pixel data of the search window and the first side window block pixel data respectively independently of each other, thereby performing first loading of the search window pixel data with respect to the operation part 1 at a high speed.

When the buffer memory 2a supplies the pixel data Ya stored therein to the operation part 1, the pixel data Y from the reference image memory 72 is written in the same address position. The pixel data is written in and read from the buffer memory 2a in a single operation cycle. In the buffer memory 2b, next pixel data is written in the address position from which the pixel data Yb is read in a motion vector detection operation as to a single template block. The buffer memory 2c stores pixel data of a single template block. The buffer memories 2a and 2b may have capacities for storing pixel data of a single search window as a whole.

The buffer memory 2b for storing the side window block pixel data may not be provided in particular. Alternatively, the side window block pixel data may be read from the reference image memory 72 and directly supplied to the operation part 1 through the input part 2 after necessary pixel data is stored in the buffer memory 2a, while buffer processing for timing adjustment is performed in the interior.

Figure 32:
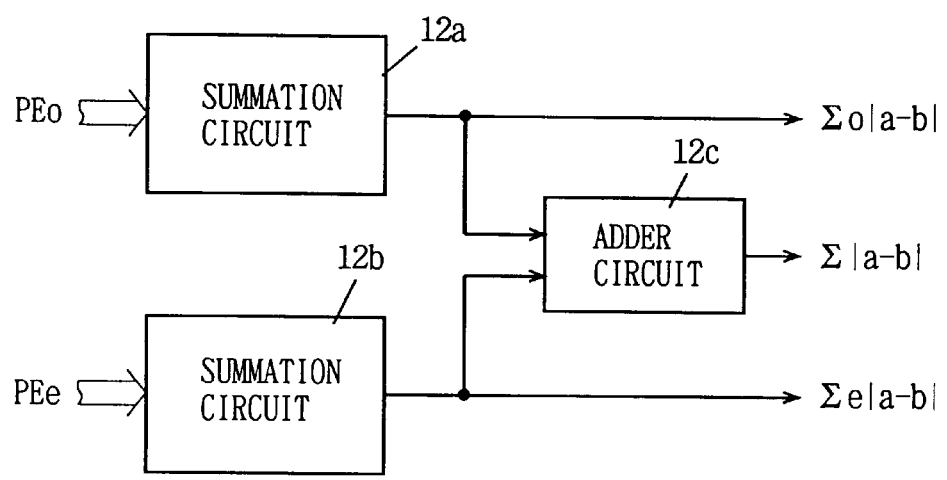
FIG. 32 schematically illustrates the structure of a summation part shown in FIG. 1.

FIG. 32 schematically illustrates the structure of the summation part 12 shown in FIG. 1. Referring to FIG. 32, the summation part 12 includes a summation circuit 12a for obtaining the sum of outputs (evaluation value components) PEo from the element processors which are arranged in correspondence to odd field pixels of the template block, a summation circuit 12b for obtaining the sum of outputs (evaluation value components) PEe from the element processors which are arranged in correspondence to even field pixels of the template block, and an adder circuit 12c for adding up outputs of the summation circuits 12a and 12b. The summation circuits 12a and 12b and the adder circuit 12c output evaluation values $\Sigma|a-b|$ and $\Sigma e|a-b|$ as to odd and even subtemplate blocks and an evaluation value $\Sigma|a-b|$ of the template block respectively.

The summation circuits 12a and 12b receive outputs of the element processors of the processor array included in the operation part 1 in parallel. The adder circuit 12c is a two-input adder circuit. Therefore, the scale of the summation part is reduced as compared with the structure of providing summation circuits for respective ones of the evaluation function values, whereby evaluation values in a plurality of predictive modes (template block, odd subtemplate block and even subtemplate block modes) can be simultaneously calculated at a high speed.

Structure of Comparison Part

Figure 33:
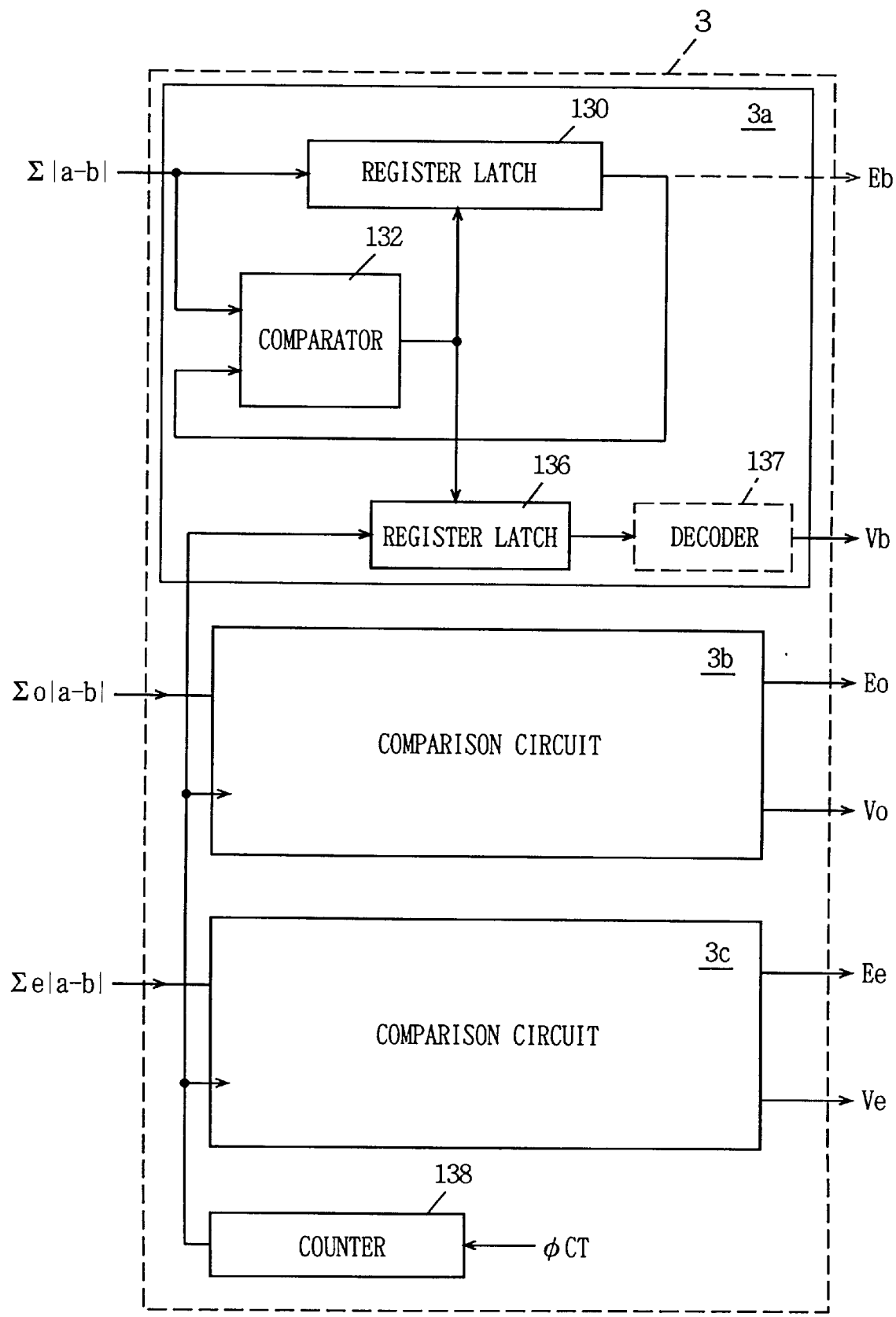
FIG. 33 schematically illustrates the structure of a comparison part shown in FIG. 1.

FIG. 33 schematically illustrates the structure of the comparison part 3 shown in FIG. 1. Referring to FIG. 33, the comparison part 3 includes a comparison circuit 3a for obtaining a motion vector as to the template block, i.e., the block motion vector Vb, a comparison circuit 3b for obtaining a motion vector as to the odd subtemplate block, i.e., the odd field block motion vector Vo, and a comparison circuit 3c for obtaining a motion vector as to the even subtemplate block, i.e., the even field block motion vector Ve. The comparison circuits 3a to 3c are identical in structure to each other, and hence FIG. 33 specifically shows only the structure of the comparison circuit 3a for obtaining the motion vector as to the template block, i.e., the block motion vector Vb.

The comparison circuit 3a includes a comparator 132 for comparing the evaluation value $\Sigma|a-b|$ as to the template block supplied from the summation part 12 included in the operation part 1 with an evaluation value stored in a register latch 130, and a register latch 136 for storing a count value supplied from a counter 138 in accordance with an output of the comparator 132. When the evaluation value $\Sigma|a-b|$ newly supplied from the summation part 12 is smaller than the evaluation value stored in the register latch 130, the comparator 132 generates a data update instruction signal to the register latches 130 and 136 and updates storage contents thereof.

The counter 138 counts a clock signal ACT, and generates a count value expressing a displacement vector, i.e., a candidate for the motion vector. When the evaluation value $\Sigma|a-b|$ newly supplied from the summation part 12 is smaller than the evaluation value previously stored in the register latch 130, therefore, the storage content of the register latch 130 is updated with the newly supplied evaluation value, while the register latch 136 stores the count value currently supplied from the counter 138. The count value of the counter 138 is also supplied to the comparison circuits 3b and 3c in common. Due to this structure, it is possible to detect a displacement vector providing the minimum evaluation value in the search area while holding the minimum evaluation value.

The displacement vector value stored in the register latch 136 may be decoded by a decoder 137 and transformed to a value expressing a specific motion vector Vb. Alternatively, data held in the register latch 136 may be directly outputted as the motion vector. Further, the evaluation value stored in the register latch 130 may be outputted as an evaluation value Eb with respect to this motion vector. Minimum values of evaluation values Eb, Eo and Ee of the three predictive modes are obtained so that the optimum motion vector can be obtained in accordance with a single predictive mode through the comparison of these evaluation values.

The operations of the comparison circuits 3b and 3c are identical to that of the comparison circuit 3a, except that the evaluation function values supplied from the summation part 12 are different from each other, and that as to the value of the displacement vector indicated by the count value supplied from the counter 138, the value of a vertical vector component is updated by one every two operation cycles.

In the motion vector detection unit according to the embodiment 1 of the present invention, as hereinabove described, the first search window block pixel data in search window update are previously stored in the registers in the processor array in the coding system of performing coding in units of frames and the registers are switched in search window updating for calculation of evaluation values, whereby the evaluation values can be continuously calculated in the respective operation cycles, so that the motion vector can be detected at a high speed. Further, motion detection operations with respect to the template block, the odd subtemplate block and the even subtemplate block can be simultaneously executed, whereby an image coding system of high performance having higher coding efficiency can be structured.

Embodiment 2

Figure 34:
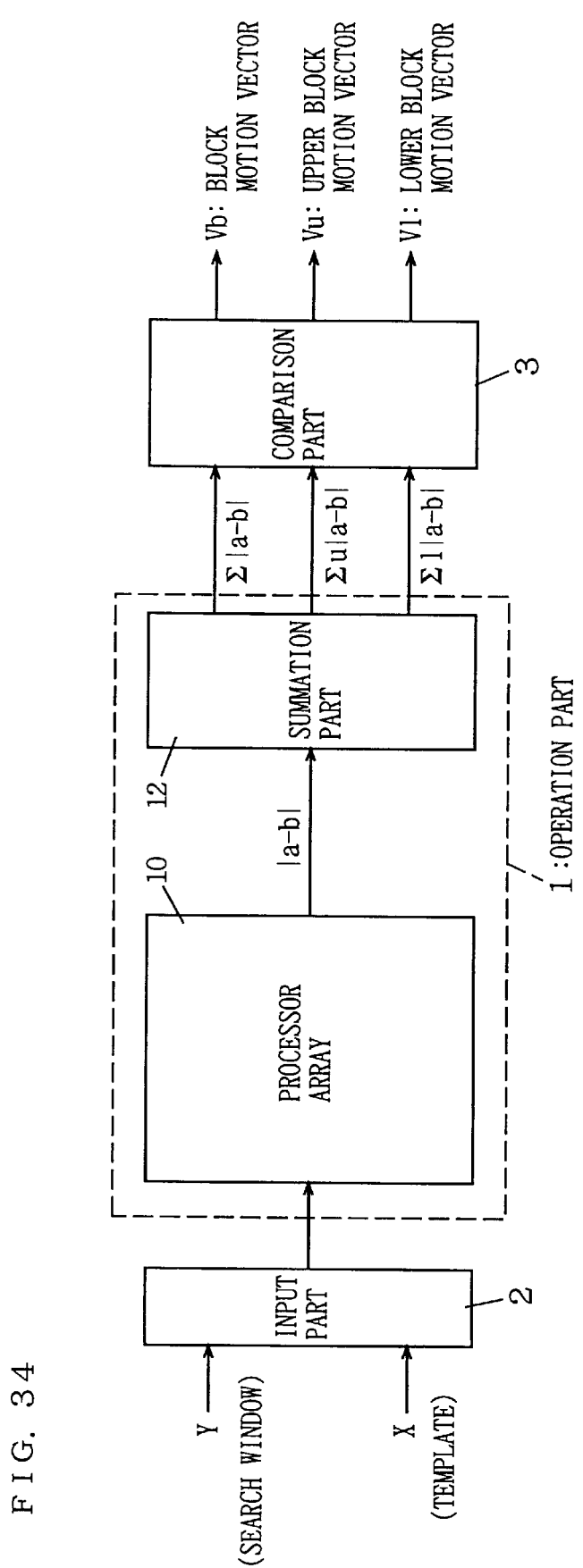
FIG. 34 schematically illustrates the overall structure of a motion vector detection unit according to an embodiment 2 of the present invention.

FIG. 34 schematically illustrates the overall structure of a motion vector detection unit according to an embodiment 2 of the present invention. The motion vector detection unit shown in FIG. 34 is adapted to encode pixels in units of fields. In the motion vector detection unit shown in FIG. 34, a summation part 12 included in an operation part 1 outputs evaluation values $\Sigma|a-b|$, $\Sigma u|a-b|$ and $\Sigma l|a-b|$ with respect to a template block, an upper half block of the template block, and a lower half block of the template block respectively in parallel with each other. The summation part 12 and a processor array 10 are substantially identical in structure to those shown in FIG. 1, except for connection between element processors included in the processor array 10 and summation circuits included in the summation part 12 depending on the change of division of the blocks.

Figure 35:
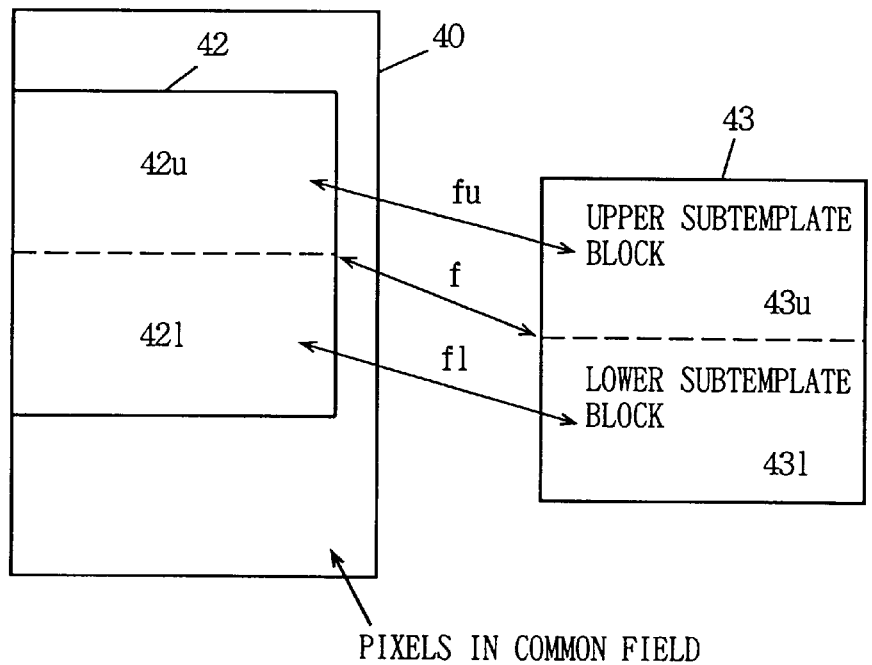
FIG. 35 schematically illustrates the structures of a template block and a search window block employed in the motion vector detection unit according to the embodiment 2 of the present invention.

In the structure of the motion vector detection unit shown in FIG. 34, a screen is formed by one field, as shown in FIG. 35. A template block 43 is divided into an upper subtemplate block 43u which is formed by pixels of the upper half block and a lower subtemplate block 43l which is formed by pixels included in the lower half block along a vertical direction.

Similarly, a search window block 42 in a search window 40 is also divided into an upper half block 42u which is formed by pixels included in the upper half and a lower half block 42l which is formed by pixels of the lower half. With respect to the upper subtemplate block 43u, an evaluation function value is calculated in accordance with a displacement vector fu for the upper half block 42u in the search window block 42. With respect to the lower subtemplate block 43l, an evaluation value as to a displacement vector fl for the lower half block 42l of the search window block 42 is calculated. An evaluation value of the search window block 42 having a displacement vector f from the template block 43 is calculated with the evaluation values of the respective ones of the upper and lower subtemplate blocks 43u and 43l, as described later.

In the processor array 10, the element processors are arranged in correspondence to the pixels in the template block 43 respectively, for obtaining evaluation values (absolute difference values in this embodiment) of the corresponding template block pixel data and corresponding pixel data in the search window block 42. In one operation cycle, therefore, displacement vectors of the upper and lower subtemplate blocks 43u and 43l and the template block 43 are identical to each other.

Outputs of the element processors included in the processor array 10 are classified into the upper and lower subtemplate blocks 43u and 43l, whereby the evaluation values with respect to the template block 43 and the upper and lower subtemplate blocks 43u and 43l can be simultaneously calculated in a single operation cycle. The structure of the processor array 10, transfer order of pixel data, and switching of connection of A and B registers in the processor array are identical to those in the embodiment 1. The embodiment 2 is different from the embodiment 1 in a classification mode for the element processors in the summation part 12 described below.

Figure 36:
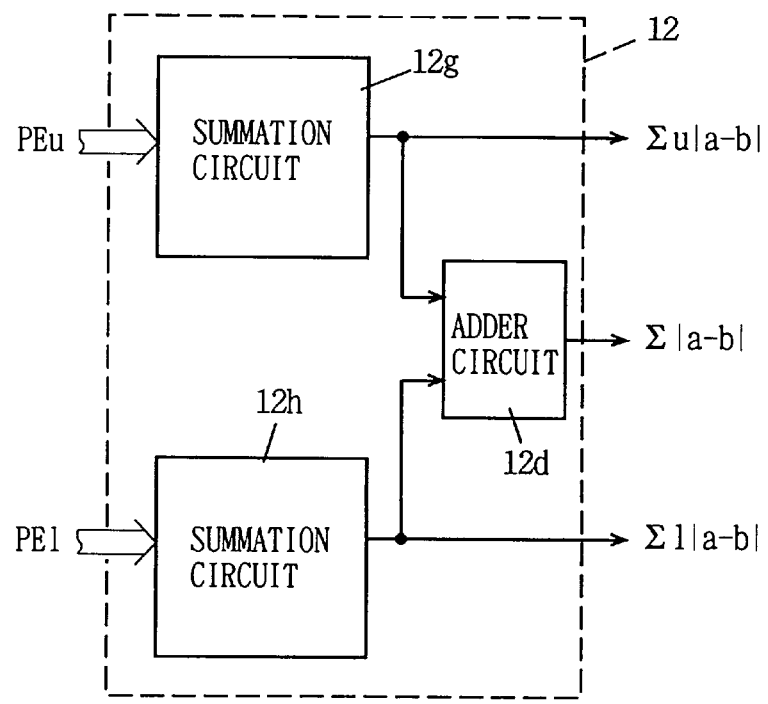
FIG. 36 schematically illustrates the structure of a summation part shown in FIG. 34.

FIG. 36 illustrates the structure of the summation part 12 in the embodiment 2 of the present invention. Referring to FIG. 36, the summation part 12 includes a summation circuit 12g for summing up outputs PEu of the element processors which are arranged in correspondence to the respective pixels of the upper subtemplate block 43u among the element processors PE included in the processor array 10, a summation circuit 12h for obtaining the sum of outputs PE1 of the element processors which are arranged in correspondence to the respective pixels of the subtemplate block 43l among those included in the processor array 10, and an adder circuit 12d for adding up outputs of the summation circuits 12g and 12h. The summation circuit 12g outputs the evaluation value $\Sigma u|a-b|$ for the upper subtemplate block 43u, while the summation circuit 12h outputs the evaluation value $\Sigma|a-b|$ for the lower subtemplate block 43l. The adder circuit 12d outputs the evaluation value $\Sigma|a-b|$ for the template block 43. The classification of the element processors PE in the processor array 10 into the upper and lower half blocks is implemented by connection through interconnection lines between the processor array 10 and the summation part 12.

A comparison part 3, which is identical in structure to that in the embodiment 1, decides motion vectors with respect to the upper subtemplate block, the lower subtemplate block and the template block, i.e., an upper block motion vector Vu, a lower block motion vector Vl and a block motion vector Vb in accordance with the evaluation values $\Sigma u|a-b|$, $\Sigma|a-b|$ and $\Sigma|a-b|$ respectively.

Also in the embodiment 2, therefore, the operation may not be stopped in search window updating in a search area and the motion vectors can be detected at a high speed. Further, the motion vectors for the template block, the upper subtemplate block and the lower subtemplate block can be simultaneously detected at a high speed in a coding system for performing coding in units of fields, whereby a coding system of high performance and higher coding efficiency can be constructed. In addition, a current image can be more correctly reproduced by detecting the optimum motion vector from those of a plurality of predictive modes, whereby a coding system of high performance can be constructed.

Embodiment 3

Figure 37:
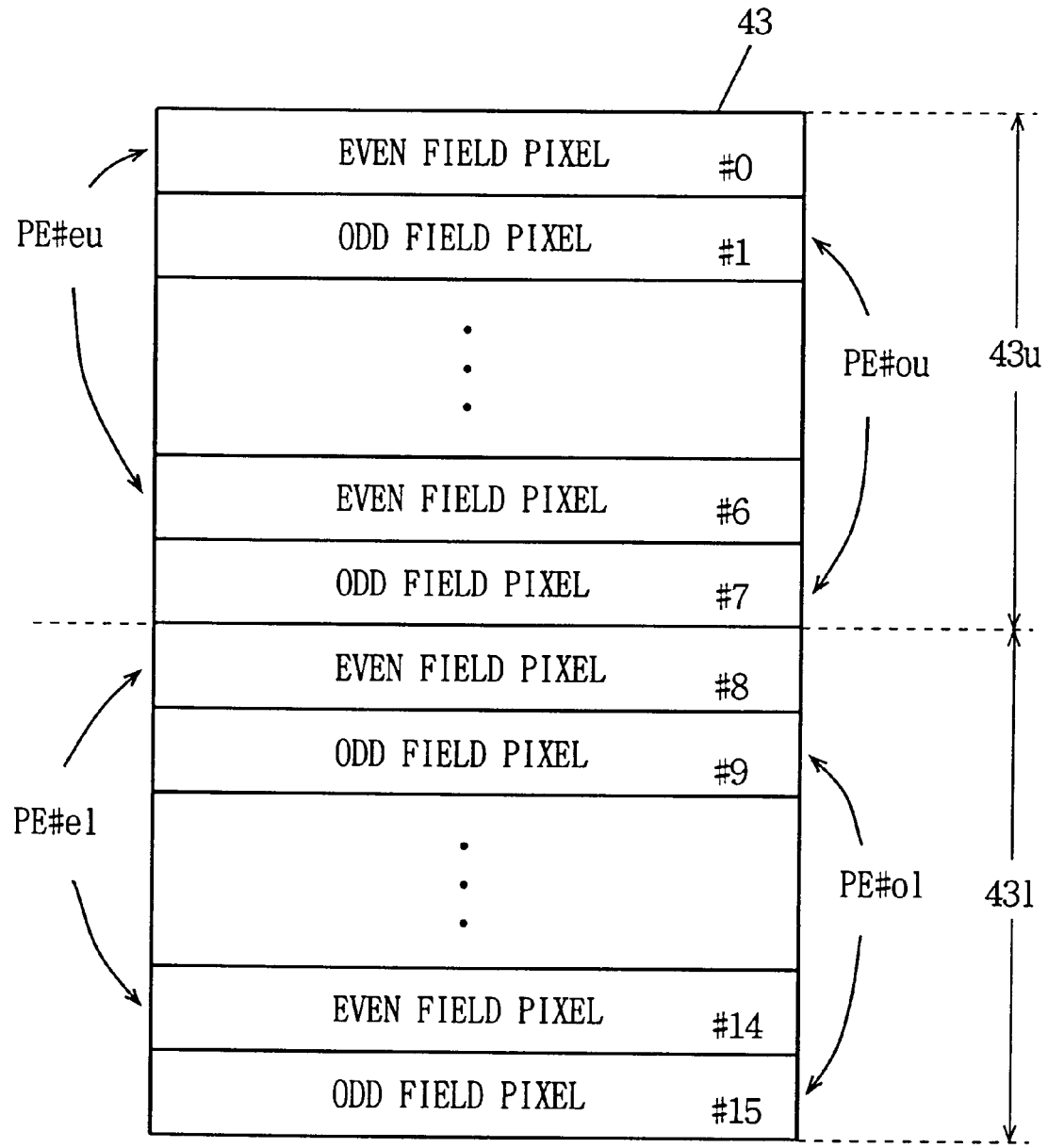
FIG. 37 schematically illustrates the structure of a template block employed in a motion vector detection unit according to an embodiment 3 of the present invention.

FIG. 37 illustrates the correspondence between element processor groups and template block pixels in a motion vector detection unit according to an embodiment 3 of the present invention. Referring to FIG. 37, a template block 43 comprises pixels which are arranged in 16 rows, for example. The template block 43 is divided on a screen along a vertical direction into an upper subtemplate block 43u which is formed by pixel data #0 to #7 of an upper half block and a lower subtemplate block 43l which is formed by pixel data #8 to #15 of the lower half block respectively. In correspondence to the subtemplate blocks 43u and 43l, the element processors are similarly divided into groups.

The template block 43 is further divided into odd pixels, i.e., odd field pixels #1, . . . , #7, #9, . . . , #15, and even field pixels, i.e., #0, #2, . . . , #6, #8, . . . , #14 respectively. According to such division of the odd and even fields, the element processors are also divided into groups corresponding to the odd and even field pixels respectively.

In a processor array, therefore, the element processors are divided into an element processor group PE#ou belonging to the upper subtemplate block 43u and being arranged in correspondence to the odd field pixels, an element processor group PE#eu belonging to the upper subtemplate block 43u and being arranged in correspondence to the even field pixels, an element processor group PE#ol belonging to the lower subtemplate block 43l and being arranged in correspondence to the odd field pixels, and an element processor group PE#el belonging to the lower subtemplate block 43l while being arranged in correspondence to the even field pixels.

When the screen is formed by one frame, an evaluation value for an odd field subtemplate block is calculated with the element processor groups PE#ou and PE#ol, and that for an even field subtemplate block is calculated with the element processor groups PE#eu and PE#el respectively. When the screen is formed by a field, on the other hand, an evaluation value for the upper subtemplate block 43u is calculated with the element processor groups PE#ou and PE#eu, and that for the lower subtemplate block 43l is calculated with the element processor groups PE#ol and PE#el.

Thus, it is possible to calculate the motion vector in accordance with predictive modes which are defined for a screen structure of interest by classifying the element processors into four groups PE#ou, PE#eu, PE#ol and PE#el as shown in FIG. 37 and varying the mode of combination of the element processors in the processor array with the screen structure.

Figure 38:
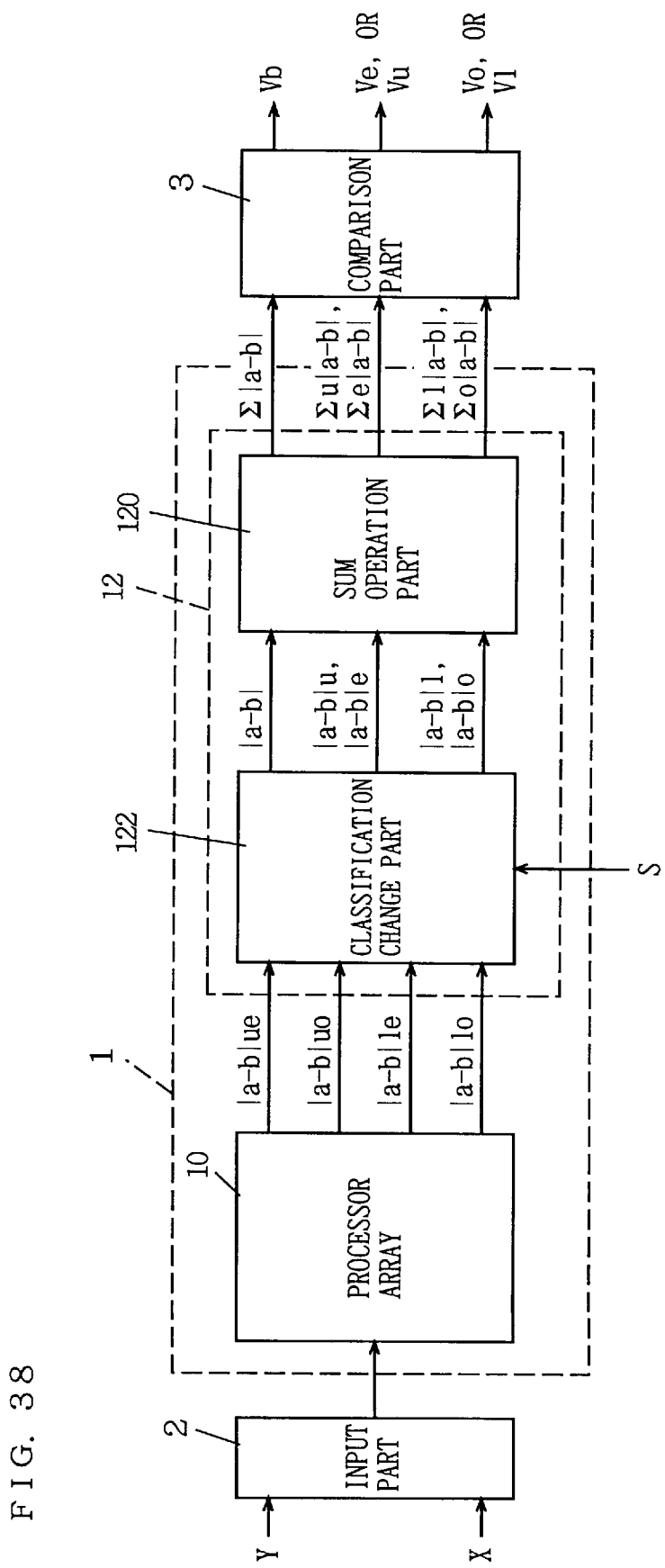
FIG. 38 schematically illustrates the overall structure of a motion vector detection unit according to an embodiment 3 of the present invention.

FIG. 38 schematically illustrates the overall structure of the motion vector detection unit according to the embodiment 3 of the present invention. Referring to FIG. 38, the element processors are divided into the four groups PE#ou, PE#eu, PE#ol and PE#el in the processor array 10 included in the operation part 1. In operation, therefore, the processor array 10 outputs absolute difference value groups |a-b|uo, |a-b|ue, |a-b|lo and |a-b|le from the odd field/upper half block element processors, the even field/upper half block element processors, the odd field/lower half block element processors and the even field/lower half block element processors respectively.

The summation part 12 includes a classification change part 122 for changing the combination of the four absolute difference value groups supplied from the processor array 10 and grouping the absolute difference values in units of template blocks and subtemplate blocks in accordance with a mode specifying signal S, and a sum operation part 120 for summing up the absolute difference values supplied from the classification change part 122 for each class. Respective evaluation values are derived from the sum operation part 120 in accordance with the classification of the absolute difference values set by the classification change part 12, and supplied to the comparison part 3.

The comparison part 3 outputs a motion vector Vb for the template block and motion vectors Vo and Ve or Vu and Vl for the subtemplate blocks respectively, in accordance with the evaluation values supplied from the sum operation part 120.

When the mode specifying signal S specifies coding in units of frames, the classification change part 122 generates absolute difference value groups |a-b|, |a-b|o and |a-b|e with respect to the template block, the odd subtemplate block and the even subtemplate block respectively from the four groups of difference absolute values. When the mode specifying signal S indicates coding in units of fields, on the other hand, the classification change part 122 generates absolute difference value groups |a-b|, |a-b|u and |a-b|l in units of the template blocks, from the upper subtemplate block employing the upper half block, and from the lower subtemplate block consisting of the lower half pixels respectively.

It is possible to readily obtain motion vectors which are employed for detection of predictive images in units of frames and fields respectively by changing the combination of the four absolute difference value groups outputted from the processor array 10 in the classification change part 122 by the mode specifying signal S. A single motion vector detection unit can deal with coding of different screen formats, whereby a motion vector detection unit having high versatility can be implemented.

The processor array 10, which is identical in structure to the processor array 10 in the embodiment 1, calculates evaluation values by alternately utilizing A and B registers in units of horizontal vector components. The classification change part 122 is formed by a selector for switching paths for propagating the respective groups of difference absolute values in accordance with the mode specifying signal S. The sum operation part 120 is constructed from the structure of either the embodiment 1 or the embodiment 2.

Modification of Total Sum Part

Figure 39:
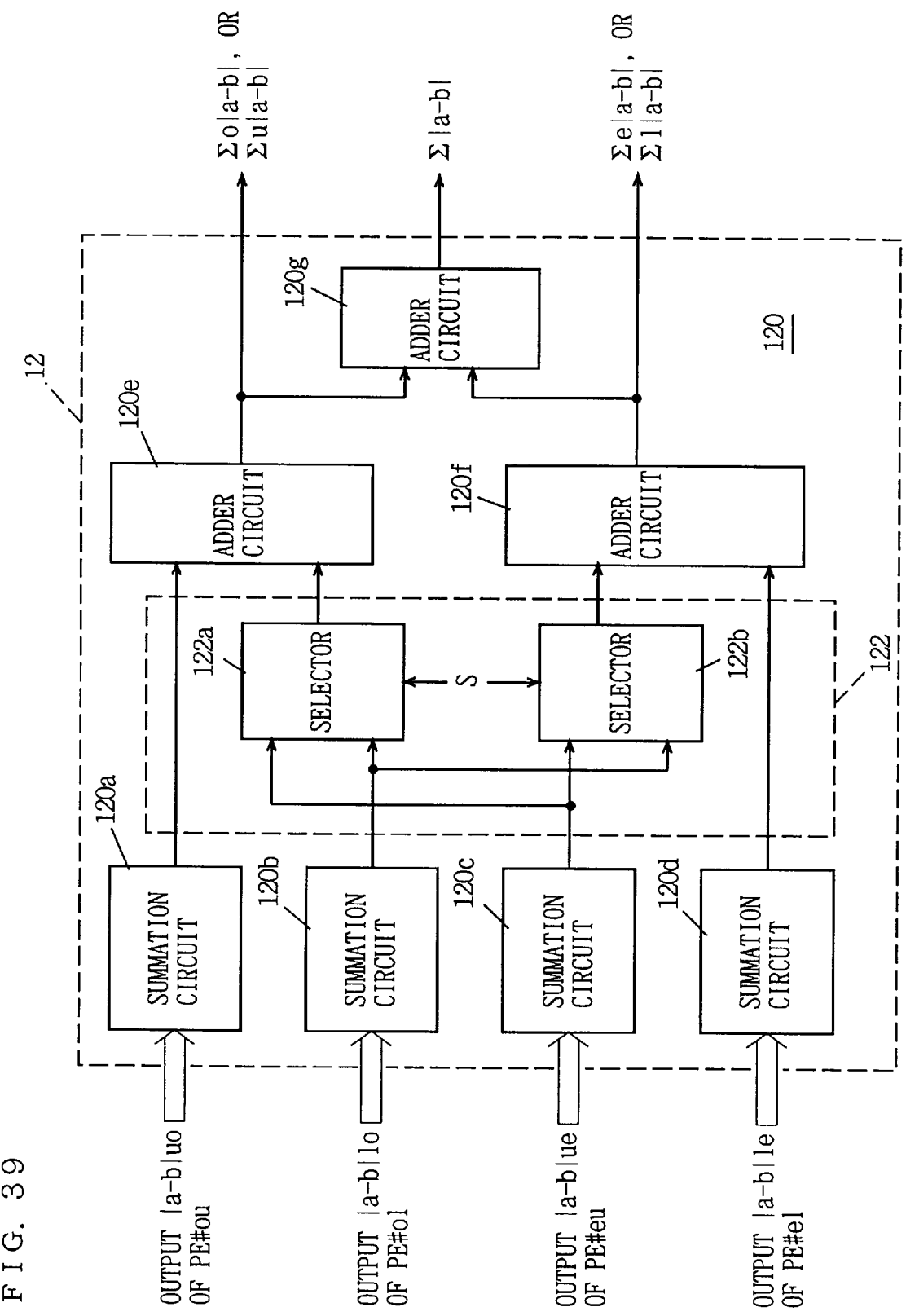
FIG. 39 schematically illustrates the structure of a summing operation part shown in FIG. 38.

FIG. 39 illustrates the structure of a modification of the summation part 12 shown in FIG. 38. This summation part 12 includes summation circuits 120a, 120b, 120c and 12d provided in correspondence to respective element processor groups PE#uo, PE#lo, PE#ue and PE#le of a processor array for obtaining the sums of outputs |a-b|uo, |a-b|o, |a-b|ue and |a-b|le of the corresponding groups respectively, and a classification change part 122 for switching propagation paths for output data of two of the four summation circuits 120a to 120d, i.e., the summation circuits 120b and 120c.

The classification change part 122 includes selectors 122a and 122b for switching the transmission paths for the summation circuits 120b and 120c. The selector 122a selects the output of the summation circuit 120b when a mode specifying signal S indicates coding in units of frames, while the selector 122b selects the output of the summation circuit 120c when the mode specifying signal S indicates coding in units of frames.

The summation part 12 further includes an adder circuit 120e for adding up the outputs of the summation circuit 120a and the selector 122a, an adder circuit 120f for adding up the outputs of the summation circuit 120d and the selector 122d, and an adder circuit 120g for adding up outputs of the adder circuits 120e and 120f. The adder circuit 120e outputs an evaluation value Σo|a-b| or Σu|a-b| for an odd or upper subtemplate block. The adder circuit 120g outputs an evaluation value Σ|a-b| for a template block. The adder circuit 120f outputs an evaluation value Σo|a-b| or Σl|a-b| as to or of an odd or lower subtemplate block.

The following advantage can be attained by providing the summation circuits 120a to 120d in correspondence to the respective element processor groups in an input part of the summation part 12 and switching the transmission paths of the outputs of the two summation circuits 120b and 120c by the mode specifying signal S:

In case of switching the transmission paths for the outputs of the element processors in the classification change part 122 in accordance with the mode specifying signal S as shown in FIG. 38, selectors for switching the transmission paths must be provided for the respective element processors. Consequently, the number of the selectors is increased to disadvantageously increase the scale of the unit.

On the other hand, the number of the element processors processed by each of the summation circuits 120a to 120d is half that in the embodiment 1 or 2, whereby the scale of the unit can be reduced. In the structure shown in FIG. 39, therefore, the occupying area of the summation circuits is not much increased although the number thereof is increased as compared with the structures of the embodiments 1 and 2. Only two selectors are necessary for switching the transmission paths of the summation circuits 120b and 120c, whereby the element number can be remarkably reduced and the scale of the unit is reduced.

The adder circuits 120e, 120f and 120g, which are two-input adder circuits, are smaller in scale as compared with the summation circuits. Thus, the occupying area of the unit is not much increased despite the provision of the adder circuits 120e and 120f. Thus, it is possible to remarkably reduce the occupying area of the unit by providing the summation circuits in the input part in correspondence to the respective element processor groups and switching the transmission paths for the outputs of the two summation circuits among the four summation circuits, as shown in FIG. 39.

In place of the structure shown in FIG. 39, selectors 122a and 122b may be provided to receive outputs of element processor groups PE#lo and PE#ue, and a summation circuit for taking the sum of the outputs of one of the selectors and the outputs of the element processor group PE#uo, and a summation circuit for taking the sum of the outputs of the other selector and the outputs of the element processor group PE#le may be provided.

According to the embodiment 3 of the present invention, as hereinabove described, motion vectors for a template block and (odd/even field or upper/lower) subtemplate blocks can be simultaneously detected at a high speed in a coding system for performing coding in units of frames or fields, whereby an image coding system of high performance and high coding efficiency can be constructed.

Embodiment 4

Figure 40:
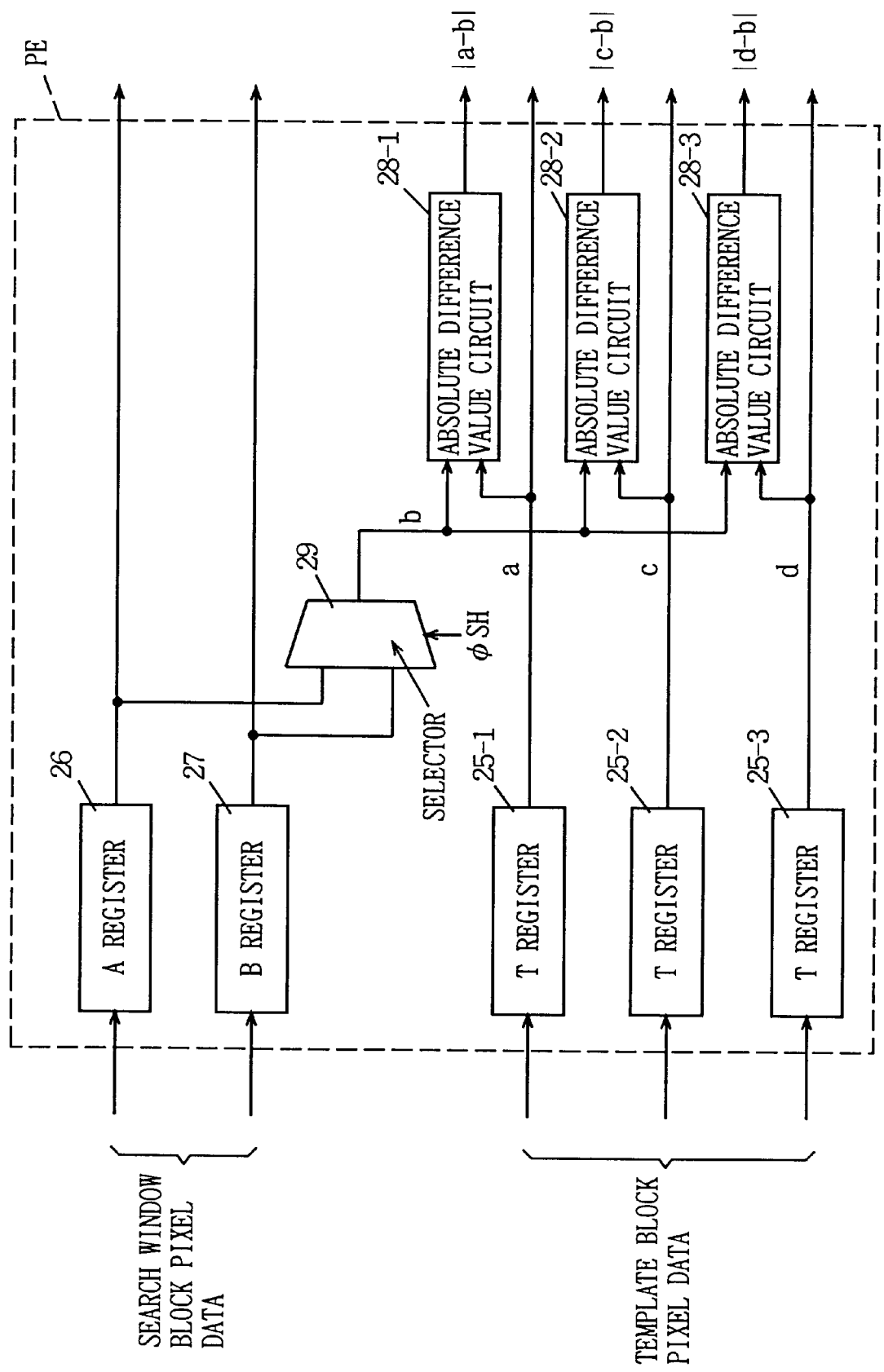
FIG. 40 schematically illustrates the structure of each element processor employed in a motion vector detection unit according to an embodiment 4 of the present invention.

FIG. 40 schematically illustrates the structure of each element processor PE of a motion vector detection unit according to an embodiment 4 of the present invention. Referring to FIG. 40, the element processor PE includes A and B registers 26 and 27 for storing search window block pixel data respectively, a selector 29 for selecting the pixel data stored in either the A or B register 26 or 27 in accordance with a switching control signal φSH, and T registers 25-1 to 25-3 storing pixel data of different template blocks respectively. The A and B registers 26 and 27, which are identical to those employed in the embodiments 1 to 3, are alternately switched every horizontal vector component updating. The T registers 25-1 to 25-3 store pixel data of different template blocks respectively, whereby a processor array including this element processor PE simultaneously calculates evaluation values as to motion vectors of three template blocks. The T registers 25-1 to 25-3 are identical in structure to those in the embodiments 1 to 3.

The element processor PE further includes an absolute difference value circuit (computing element) 28-1 for obtaining the absolute difference value of pixel data b outputted from the selector 29 and pixel data a stored in the T register 25-1, an absolute difference value circuit 28-2 for obtaining the absolute difference value of the output pixel data b from the selector 29 and pixel data c stored in the T register 25-2, and an absolute difference value circuit 28-3 for obtaining the absolute difference value of the output pixel data b from the selector 29 and pixel data d stored in the T register 25-3. These absolute difference value circuits 28-1 to 28-3 generate components |a-b|, |c-b| and |d-b| of evaluation values of motion vectors of the template blocks respectively.

Figure 41:
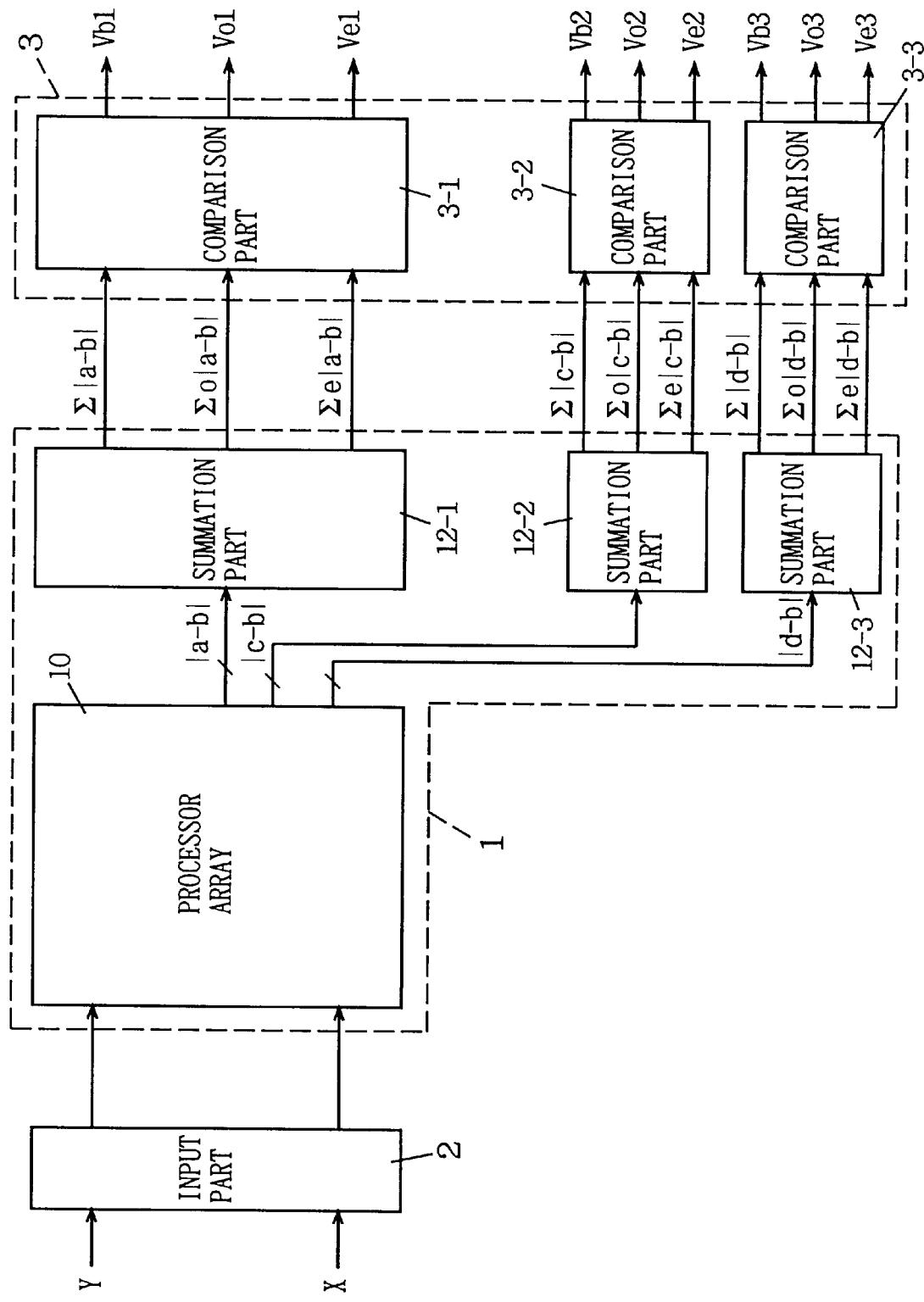
FIG. 41 schematically illustrates the overall structure of the motion vector detection unit according to the embodiment 4 of the present invention.

FIG. 41 schematically illustrates the overall structure of a motion vector detection unit employing the element processor PE shown in FIG. 40. Referring to FIG. 41, an operation part 1 includes a processor array 10 in which such element processors PE shown in FIG. 40 are arranged in the form of an array, and summation parts 12-1, 12-2 and 12-3 for obtaining the total sums of the difference absolute value groups |a-b|, |c-b| and |d-b| outputted in parallel from the processor array 10 in parallel with each other. The absolute difference value groups |a-b|, |c-b| and |d-b| are outputted from the T registers 25-1 to 25-3 included in the element processors PE respectively in parallel with each other.

This motion vector detection unit is adapted to detect the motion vector of an image having a frame structure. The summation part 12-1 generates three sums, i.e., evaluation values Σ|a-b|, Σo|a-b| and Σe|a-b| for a template block, an odd field subtemplate block and an even field subtemplate block respectively from the absolute difference value group |a-b|. The summation part 12-2 generates evaluation values Σ|c-b|, Σo|a-b| and Σe|c-b| for a template block, an odd field subtemplate block and an even field subtemplate block respectively from the absolute difference value group |c-b|.

The summation part 12-3 generates evaluation values Σ|d-b|, Σo|d-b| and Σe|d-b| for a template block, an odd field subtemplate block and an even field subtemplate block respectively from the absolute difference value group |d-b|. The summation parts 12-1 to 12-3 are identical in structure to that shown in FIG. 32.

A comparison part 3 includes a comparison part 3-1 for receiving the evaluation values from the summation part 12-1 in parallel with each other, detecting the minimum evaluation values in the respective modes, obtaining corresponding displacement vectors and detecting motion vectors, a comparison part 3-2 for obtaining displacement vectors corresponding to the minimum evaluation values on the basis of the evaluation values from the summation part 12-2 and obtaining a block motion vector Vb2, an odd field motion vector Vo2 and an even field motion vector Ve2, and a comparison part 3-3 for obtaining displacement vectors corresponding to the minimum values of the evaluation values from the summation part 12-3 and obtaining a block motion vector Vb3, a motion vector Vo3 of an odd field subtemplate block and a motion vector Ve3 with respect to an even subtemplate block respectively. The comparison parts 3-1 to 3-3 are identical in structure to that shown in FIG. 33.

Transfer and load operations for search window pixel data are identical to those in the embodiment 1, and A and B registers are switched every horizontal vector component updating and employed for calculating the evaluation values. The summation parts 12-1, 12-2 and 12-3 operate in parallel with each other. The comparison parts 3-1, 3-2 and 3-3 also operate in parallel with each other. Therefore, motion vectors as to three template blocks can be obtained in a pipeline mode as described below, whereby the motion vectors can be detected at a high speed.

Figures 42, 43A, 43B:
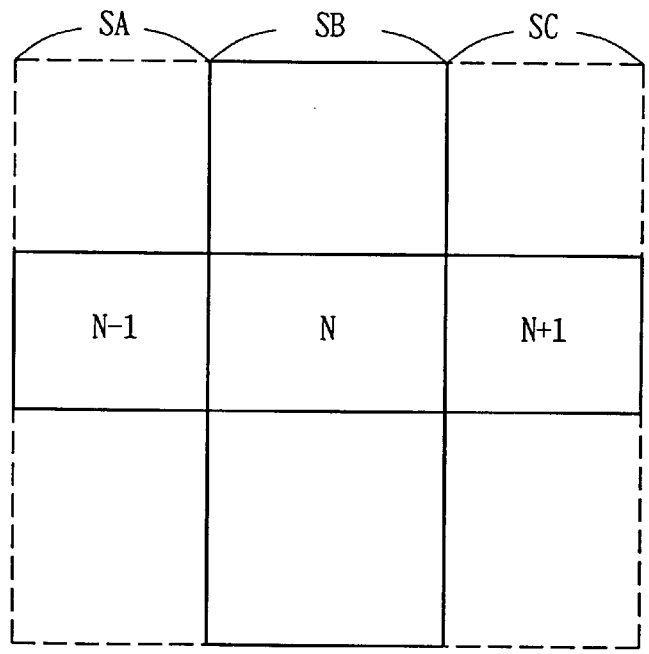
FIG. 42 illustrates the operation of the motion vector detection unit according to the embodiment 4 of the present invention.
FIGS. 43A and 43B illustrate a template block processing sequence in the motion vector detection unit according to the embodiment 4 of the present invention.

Consider that the horizontal size of a search area is three times that of each template block, as shown in FIG. 42. When the search area is divided into three subsearch areas SA, SB and SC, template blocks N-1, N and N+1 can be arranged for the subsearch areas SA, SB and SC respectively. Evaluation values of respective search window blocks of the three subsearch areas SA, SB and SC are obtained as to one template block N, thereby detecting a motion vector.

Consider that subsearch areas S1 to SN and template blocks N1 to NN are horizontally arranged on a screen, as shown in FIG. 43B. In this case, pixel data of the template blocks N1 and N2 are first loaded in two T registers, i.e., T1 and T2 registers respectively. The corresponding subsearch area is S1. While displacement vectors of the template blocks N1 and N2 stored in the T1 and T2 registers respectively are different from each other, evaluation values can be calculated in parallel with each other. In this cycle #1, pixel data of the template block N3 is loaded in the remaining T register, i.e., a T3 register.

In a cycle #2, the pixel data of the template blocks N1, N2 and N3 are loaded in the T1, T2 and T3 registers respectively, and the subsearch area is S2. Respective evaluation values as to these template blocks N1, N2 and N3 are calculated. In completion of the cycle #2, a motion vector detection operation of the Ti register as to the template block N1 is completed, since this is the leftmost template block in the horizontal direction and no subsearch area jutting out from the screen is searched.

In a cycle #3, pixel data of the template block N4 is loaded in the T1 register. In this cycle #3, the T2 and T3 registers store the pixel data of the template blocks N2 and N3 respectively, and evaluation values are calculated through the search window block of the subsearch area S3. When this cycle #3 is completed, a motion vector of the template block N2 stored in the T2 register is detected.

In a next cycle #4, therefore, pixel data of the next template block N5 is loaded in the T2 register. In the cycle #4, evaluation values are calculated as to the template blocks N4 and N3 stored in the T1 and T3 registers respectively. When the cycle #4 is completed, the motion vector of the template block N3 stored in the T3 register is detected, and pixel data of the template block N6 is stored in the T3 register in a cycle #5. This operation is thereafter repeated. Namely, pixel data of new template blocks are loaded in the T1, T2 and T3 registers every three processing cycles respectively. In a cycle #N-2, pixel data of the template block NN is loaded in the T3 register. In a cycle #N-1, a subsearch area SN-1 is searched. In completion of the cycle #N-1, the motion vector of the template block NN-2 stored in the T1 register is detected.

In a cycle #N, pixel data of the first template block of the next row is loaded in the Ti register. In completion of the cycle #N, the motion vectors of the template blocks NN-1 and NN stored in the T2 and T3 registers respectively are detected.

Except the time for updating the template block row, therefore, the motion vectors can be detected in a pipeline mode as to the respective template blocks, motion vector detection as to a single template block can be equivalently executed in a single processing cycle (subsearch area searching period), and high-speed motion vector detection can be implemented.

Transfer of search window pixel data is identical to that described in relation to the embodiment 1. Transfer (load) of template block pixel data can be readily implemented by providing a multiplexer on a template block pixel data input part of an input initial stage element processor of the processor array and transferring pixel data of template blocks while successively switching the connection path of the multiplexer every three processing cycles. The T1, T2 and T3 registers each form a single pixel data propagation path in the processor array, and these propagation paths may not be switched.

According to the embodiment 4 of the present invention, as hereinabove described, a plurality of template registers as well as a plurality of computing elements are provided, whereby motion vectors with respect to a plurality of template blocks, odd subtemplate blocks and even subtemplate blocks can be simultaneously detected at a high speed in a coding system for performing coding in units of frames, and an image coding system of high performance and having excellent coding efficiency can be constructed.

Embodiment 5

Figure 44:
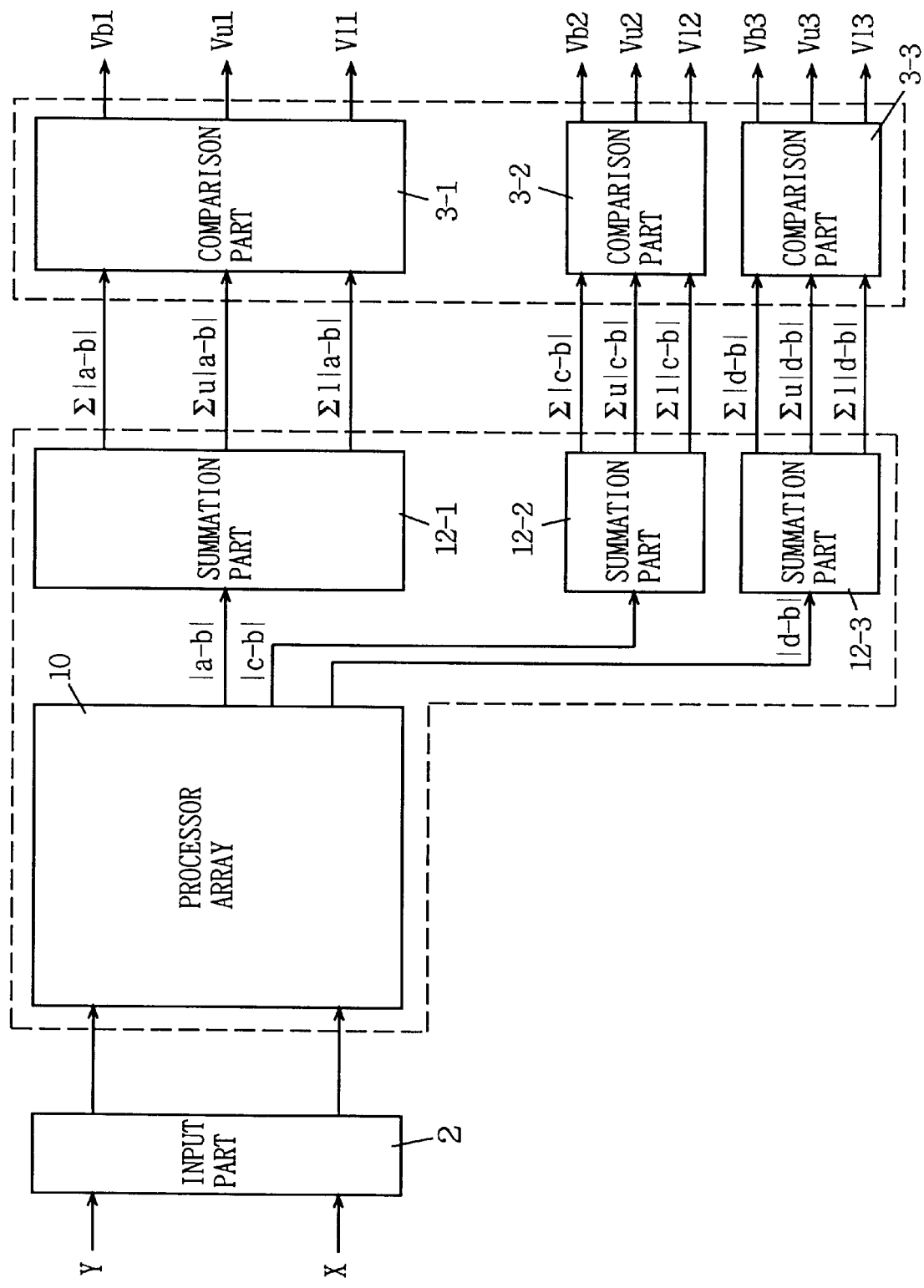
FIG. 44 schematically illustrates the overall structure of a motion vector detection unit according to an embodiment 5 of the present invention.

FIG. 44 schematically illustrates the overall structure of a motion vector detection unit according to an embodiment 5 of the present invention. The motion vector detection unit shown in FIG. 44 is adapted to detect motion vectors employed in a coding system for coding pixels in units of fields. The remaining structure is identical to that of the motion vector detection unit according to the embodiment 4, and corresponding parts are denoted by the same reference numerals. In the structure shown in FIG. 44, each element processor PE included in a processor array 10 can store pixel data of three template blocks, whereby summation parts 12-1, 12-2 and 12-3 are provided in correspondence to the respective template blocks. The respective ones of the summation parts 12-1 to 12-3 calculate evaluation values as to the template blocks, evaluation values as to upper subtemplate blocks corresponding to pixels of the upper halves of the template blocks, and evaluation values of lower subtemplate blocks formed by pixels of lower halves of the template blocks respectively in parallel with each other. The summation parts 12-1 to 12-3 are identical in structure to that shown in FIG. 36.

A comparison part 3 includes comparison parts 3-1, 3-2 and 3-3 which are provided in correspondence to the summation parts 12-1 to 12-3 respectively. The comparison part 3-1 outputs a block motion vector Vb1 for the first template block, a motion vector Vu1 for an upper subtemplate block and a motion vector Vl1 for a lower subtemplate block respectively in parallel with each other. The comparison part 3-2 outputs a block motion vector Vb2 for the second template block, a motion vector Vu2 for an upper subtemplate block and a motion vector Vl2 for a lower subtemplate block respectively. The comparison part 3-3 outputs a block motion vector Vb3 for the third template block, a motion vector Vu3 for an upper subtemplate block and a motion vector Vl3 for a lower subtemplate block respectively.

In the structure of the motion vector detection unit shown in FIG. 44, the screen is formed in units of fields, and hence each subtemplate block is merely divided into upper and lower subblocks. Thus, this motion vector detection unit is substantially identical in structure and operation to the motion vector detection unit shown in FIG. 41.

Also in the structure shown in FIG. 44, therefore, motion vectors for a plurality template blocks are simultaneously detected through common search window pixel data. Thus, motion vectors for template blocks, upper subtemplate blocks and lower subtemplate blocks can be simultaneously detected at a high speed in a coding system for performing coding in units of fields, whereby an image coding system of high performance and having excellent coding efficiency can be constructed.

Embodiment 6

Figure 45:
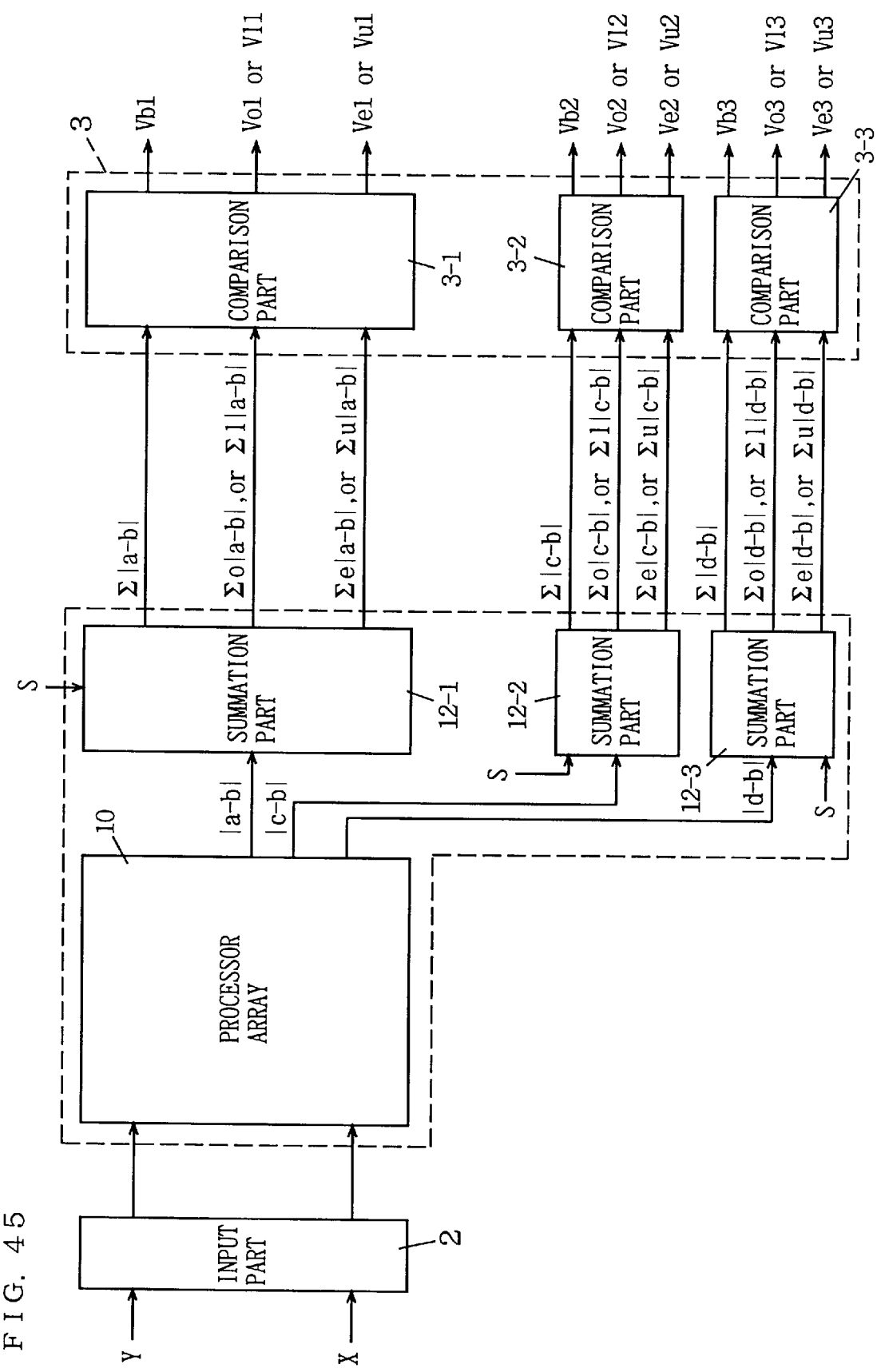
FIG. 45 schematically illustrates the overall structure of a motion vector detection unit according to an embodiment 6 of the present invention.

FIG. 45 illustrates the structure of a motion vector detection unit according to an embodiment 6 of the present invention.

The motion vector detection unit shown in FIG. 45 is different from those shown in FIGS. 41 and 44 in structure of summation parts 12-1, 12-2 and 12-3. Each of the summation parts 12-1, 12-2 and 12-3 calculates evaluation values in a frame or field type image in accordance with a mode selection signal S. When the mode specifying signal S indicates a frame type image, each of the summation parts 12-1, 12-2 and 12-3 calculates evaluation values for a motion vector as to a template block, with respect to an odd subtemplate block formed by pixels of an odd field, and with respect to an even subtemplate block formed by pixels of an even field respectively.

When the mode specifying signal S indicates a field type image, on the other hand, each of the summation parts 12-1 to 12-3 calculates evaluation values for detecting a motion vector as to a template block, with respect to an upper subtemplate block formed by upper half pixels of the template block, and with respect to a lower subtemplate block formed by lower half pixels of the template block respectively.

The summation parts 12-1 to 12-3 are identical in structure to that shown in FIG. 39. The summation parts 12-1, 12-2 and 12-3 calculate necessary evaluation values in accordance with outputs |a-b|, |c-b| and |d-b| of corresponding computing elements (absolute difference circuits) respectively.

Respective comparison parts 3-1 to 3-3 detect motion vectors in accordance with the evaluation values supplied from the corresponding summation parts 12-1 to 12-3 respectively. The structures of element processors in a processor array 10 and transfer of search window pixel data and template block pixel data are identical to those of the motion vector detection unit shown in FIGS. 40 and 41. The types of the calculated motion vectors can be varied with the mode specifying signal S. In addition to the effect of allowing detection of the motion vectors at a high speed, therefore, the types of the motion vectors to be detected can be varied with the application, whereby a motion vector detection unit having high versatility can be implemented. Thus, it is possible to construct an image coding system of high performance and having excellent coding efficiency by employing this motion vector detection unit.

Embodiment 7

Figure 46:
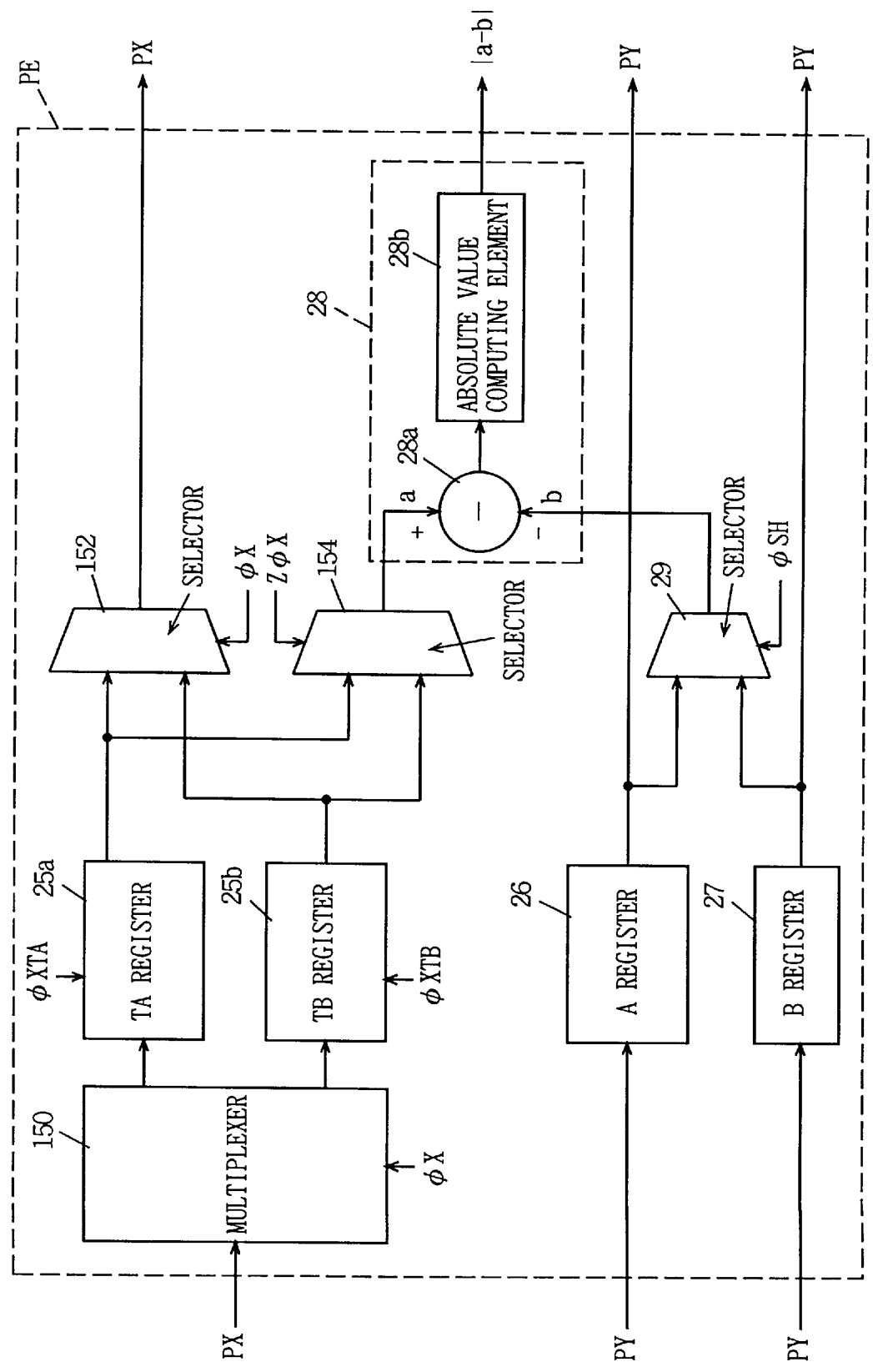
FIG. 46 schematically illustrates the structure of each element processor employed for a motion vector detection unit according to an embodiment 7 of the present invention.

FIG. 46 illustrates the structure of each element processor PE according to an embodiment 7 of the present invention. Referring to FIG. 46, the element processor PE includes TA and TB registers 25a and 25b for storing different template block pixel data respectively, a multiplexer 150 for transferring template block pixel data PX supplied from an adjacent element processor or an input part to either the TA or TB register 25a or 25b in accordance with a switching control signal φX, a selector 152 for transmitting pixel data stored in the TA or TB register 25a or 25b to the adjacent element processor in accordance with the switching control signal 4x, and a selector 154 for selecting the pixel data stored in either the TA or TB register 25a or 25b in accordance with a switching control signal Z+X. The switching control signals φX and ZφX are complementary to each other.

The element processor PE further includes A and B registers 26 and 27 for storing search window block pixel data, and a selector 29 for selecting the pixel data stored in either the A or B register 26 or 27 in accordance with a switching control signal φSH. The A and B registers 26 and 27 and the selector 29 are identical in structure to those of the embodiment 1.

Pixel data a and b selected by the selectors 154 and 29 respectively are supplied to a computing element 28. The computing element 28 includes a subtracter 28a for subtracting the pixel data a and b supplied from the selectors 154 and 29 respectively, and an absolute value computing element 28b for obtaining the absolute value of output data from the subtracter 28a, similarly to the embodiment 1.

The TA and TB registers 25a and 25b store pixel data of different template blocks respectively. The selectors 152 and 154 select the pixel data stored in the TA and TB registers 25a and 25b in a complementary mode. The multiplexer 150 selects the TA or TB register 25a or 25b in the same manner as the selector 152. Thus, while evaluation values are calculated with the pixel data stored in one of the TA and TB registers 25a and 25b, template block pixel data is loaded in the remaining register. The A and B registers 26 and 27 and the selector 29, which are identical in structure to those of the embodiment 1, store search window pixel data in the same search area, so that search window block pixel data for search window change is prepared through a register not employed for the arithmetic operation. A transfer operation for the search window block pixel data is identical to that described in detail in relation to the embodiment 1, and hence only a transfer operation for template block pixel data is described here.

Figure 47:
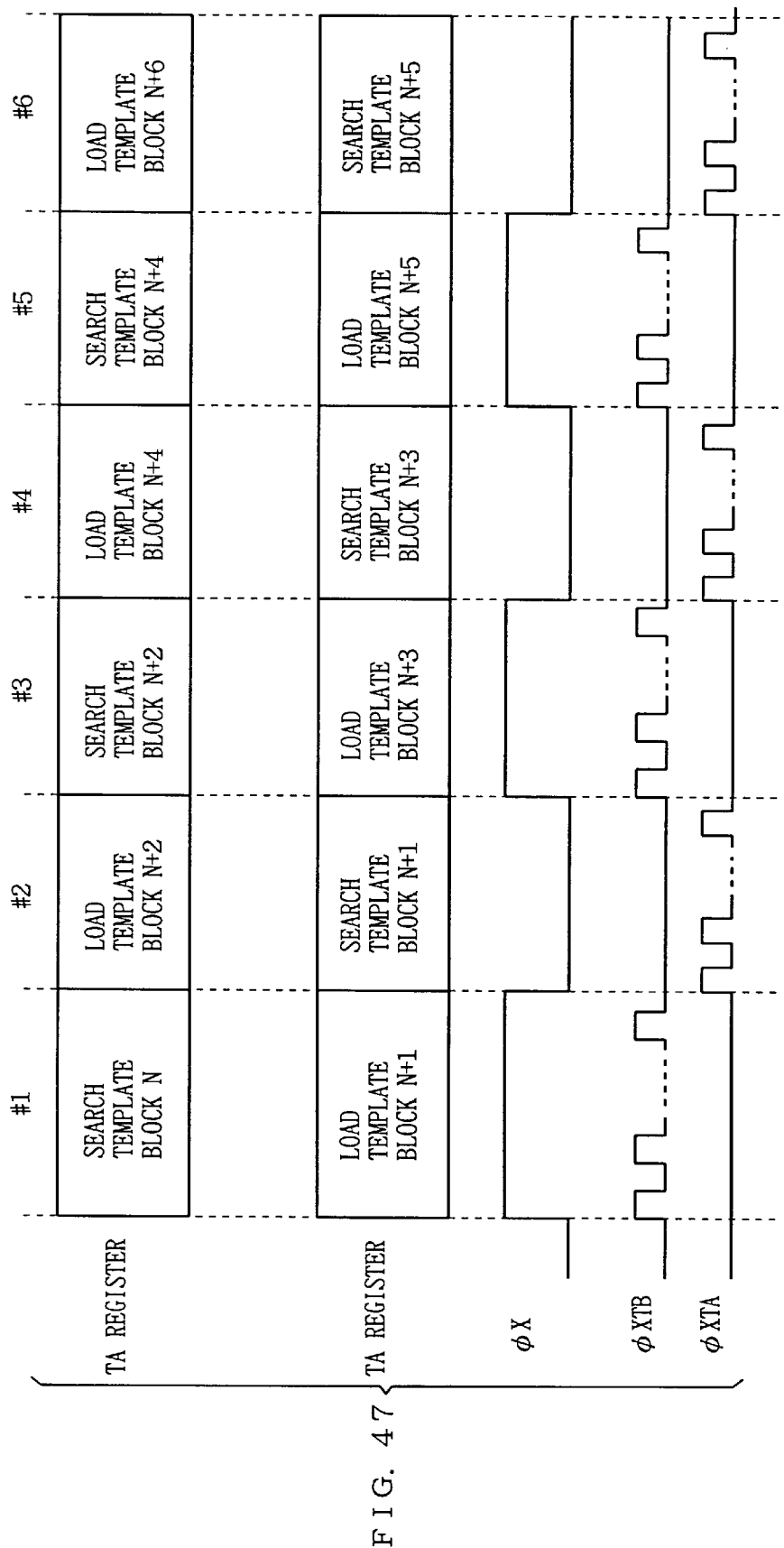
FIG. 47 illustrates a template block processing sequence in the motion vector detection unit according to the embodiment 7 of the present invention.

FIG. 47 is a timing chart showing the operation of a motion vector detection unit employing the element processor PE shown in FIG. 46. Referring to FIG. 47, clock signals φXTB and φXTA control the transfer of template block pixel data of the TB register 25b and transfer of template block pixel data with respect to the TA register 25a respectively. When the switching control signal control φX is at a high level, the TB register 25b is selected.

In a processing cycle #1, the switching control signal φX is brought into a high level so that the multiplexer 150 transfers supplied template block pixel data to the TB register 25b while the selector 152 transfers the pixel data stored in the TB register 25b to the adjacent element processor. The selector 154 selects the pixel data stored in the TA register 25a and supplies the same to the computing element 28 in accordance with the switching control signal ZφX. The TA register 25a stores pixel data of a template block N, whereby a motion vector detection (search) operation as to the template block N is performed. On the other hand, pixel data of an adjacent template block N+1 is loaded in the TB register 25b.

In a next processing cycle #2, the connection control signal φX is brought into a low level, the multiplexer 150 and the selector 152 are set in states of selecting the TA register 25a, and pixel data of a template block N+2 is loaded in the TA register 25a in accordance with the clock signal φXTA. No transfer clock signal is generated for the TB register 25b, whereby pixel data of the template block N+1 is resident in the element processor PE. The selector 154 selects the pixel data of the TB register 25b and supplies the same to the computing element 28. Therefore, motion vector detection (search) for the template block N+1 is performed in this state.

Thereafter the state of the connection control signal φX is alternately switched in processing cycles #3, #4, #5 and #6 for alternately generating the transfer clock signals φXTA and φXTB, thereby loading and searching the template blocks N+2 to N+5 in a pipeline manner. When pixel data of an adjacent template block is loaded in one of the TA registers 25a and 25b in parallel with a motion vector search operation through the other of these registers, a processing time for loading the pixel data of the template block is made invisible from the exterior, and the motion vectors can be detected at a high speed. The search window block pixel data are successively shifted in the horizontal direction.

When the search area shown in FIG. 42 is employed, for example, it is possible to continuously shift the search window block pixel data in the A and B registers 26 and 27 in the element processor in correspondence to the template block to be processed by newly shifting the search window block pixel data of the subsearch area SB again in place of the operation of shifting the search window block pixel data of the subsearch area SC in the A and B registers 26 and 27, whereby the motion vectors can be detected at a high speed.

In this processing, a head address for reading second pixel data may be horizontally displaced by one subsearch area after completion of reading of pixel data of one search area as to an address for reading pixel data from a reference image memory. Alternatively, a read address for a head pixel of search window block pixel data may be simply set in accordance with an address position of each template block, or the head address of a next search area of the reference image memory is set in accordance with the address of a next template block after completion of reading of pixel data of a single search area.

After completion of a motion vector detection operation as to a single template block, pixel data of a head subsearch area of a search area for the next template block is stored in the processor array, and motion vector search as to the next template block can be continuously performed. When the pixel data of the subsearch area SC is shifted in, then the pixel data of the subsearch area SB is shifted in again in FIG. 42, for example, and the image data of the subsearch area SB is stored in the processor array after completion of an evaluation value calculation operation in the subsearch area SC.

Thus, it is possible to apparently eliminate the time for loading the search window pixel data, continuously search motion vectors, and implement high-speed motion vector detection.

Overall Structure

Figure 48:
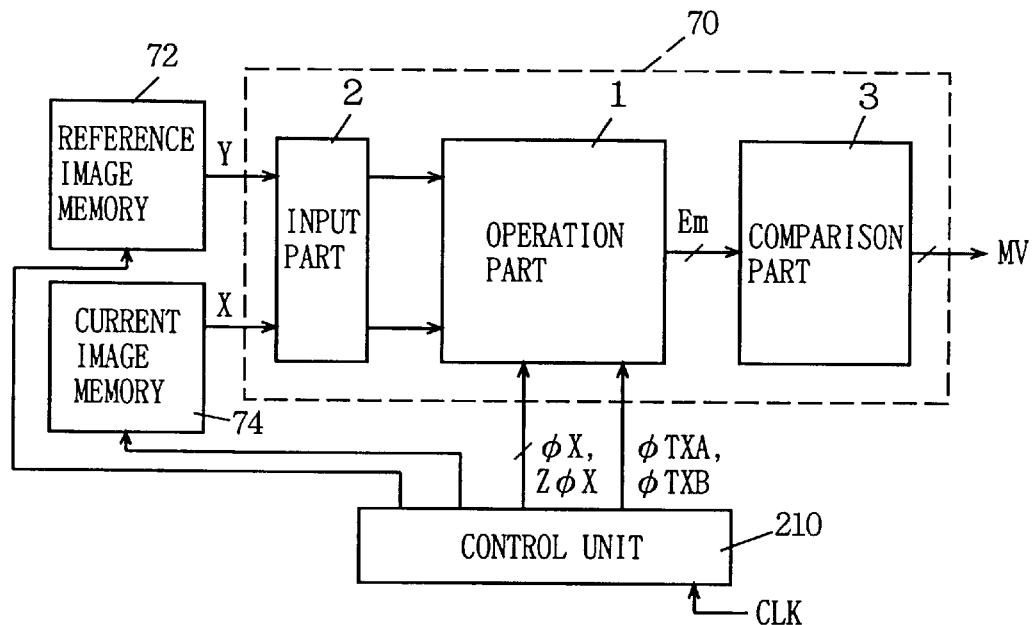
FIG. 48 schematically illustrates the overall structure of a coding system employing the motion vector detection unit according to the embodiment 7 of the present invention.

FIG. 48 schematically illustrates the overall structure of the motion vector detection unit 70 according to the embodiment 7 of the present invention. This figure shows a structure for controlling the transfer of template block pixel data. A control unit 210 also controls a transfer operation for search window block pixel data (refer to the embodiment 1).

The motion vector detection unit 70 includes an input part 2 for inputting search window pixel data Y and template block pixel data X, an operation part 1 for performing prescribed operation on the template block pixel data X and the search window block pixel data Y supplied from the input part 2 and generating an evaluation value Em, and a comparison part 3 for deciding a motion vector MV in accordance with the evaluation value Em from the operation part 1, similarly to the structure shown in FIG. 31.

FIG. 48 representatively shows the evaluation value Em and the motion vector MV decided in accordance with one of a plurality of predictive modes. Similarly to the above embodiment, the operation part 1 and the comparison part 3 detect evaluation values and motion vectors in accordance with a plurality of predictive modes respectively.

In addition to the control of the transfer operation for the search window block pixel data, the control unit 210 alternately activates switching the switching control signals for setting OX and Z+X every processing cycle for each template block, for switching the register receiving the template block pixel data in the operation part 1.

The control unit 210 also controls data read operations with respect to a reference image memory 72 storing the search window pixel data and a current image memory 74 storing the template block pixel data. While pixel data in a search area is supplied to the input part 2 and inputted in the operation part 1 as to a single template block under control by the control unit 210, pixel data of a template block to be subsequently processed is read from the current image memory 74 in parallel therewith, supplied to the operation part 1 through the input part 2 and stored in the TA or TB register of the element processor included therein.

Modification 1

Figure 49:
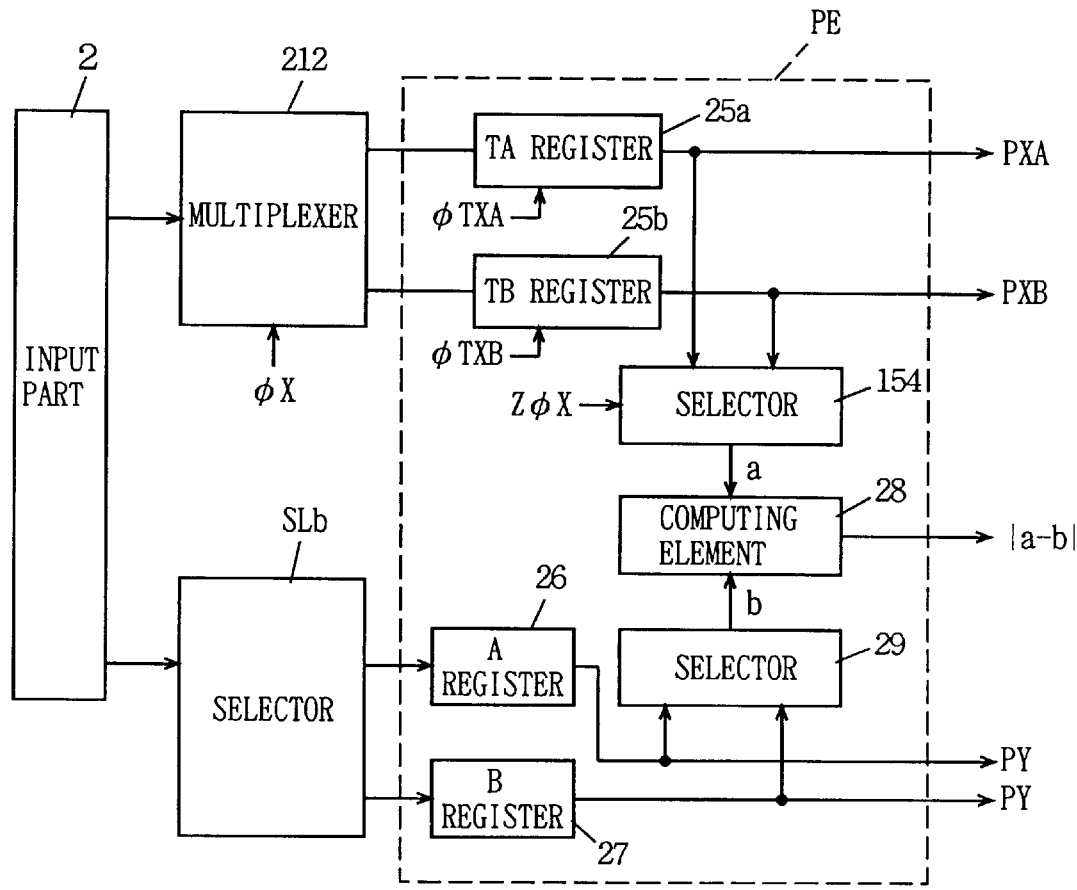
FIG. 49 illustrates the structure of each element processor in a first modification of the motion vector detection unit according to the embodiment 7 of the present invention.

FIG. 49 illustrates the structure of a first modification of the embodiment 7 of the present invention. This figure shows the structure of only an initial stage element processor PE for receiving template block pixel data from an input part 2. The remaining element processors included in a processor array are identical in structure to the element processor PE shown in FIG. 49.

The element processor PE shown in FIG. 49 does not contain multiplexer and selector for sorting the template block pixel data. TA and TB registers 25a and 25b transfer data stored therein through signal propagation paths which are independently of each other in accordance with transfer clock signals φTXA and φTXB respectively. The remaining structure is identical to that shown in FIG. 46, and corresponding parts are denoted by the same reference numerals.

A multiplexer 212 for transferring the template block pixel data to either one of the TA and TB registers 25a and 25b in accordance with a signal φX and a selector SLb for transferring search window block pixel data to one of A and B registers 26 and 27 are provided between the input part 2 and the initial stage element processor PE. The selector SLb corresponds to the transfer gates 31a and 32b shown in FIG. 27A.

The TA and TB registers 25a and 25b transfer the pixel data stored therein in accordance with the transfer clock signals φTXA and φTXB respectively. The template block pixel transfer paths are equivalently switched in accordance with the multiplexer 212 and the transfer clock signals φTXA and φTXB.

Between each pair of element processors, the TA and TB registers 25a and 25b are connected to corresponding registers of the adjacent element processor respectively.

It is not necessary to provide a multiplexer and a selector for switching the transfer paths for the template block pixel data in the element processor PE, whereby the scale of this element processor PE can be reduced.

While the TA and TB registers 25a and 25b have functions for shifting stored pixel data, these registers 25a and 25b may alternatively be simply formed by latch circuits, and transfer gates may be arranged between element processors.

Modification 2

Figure 50:
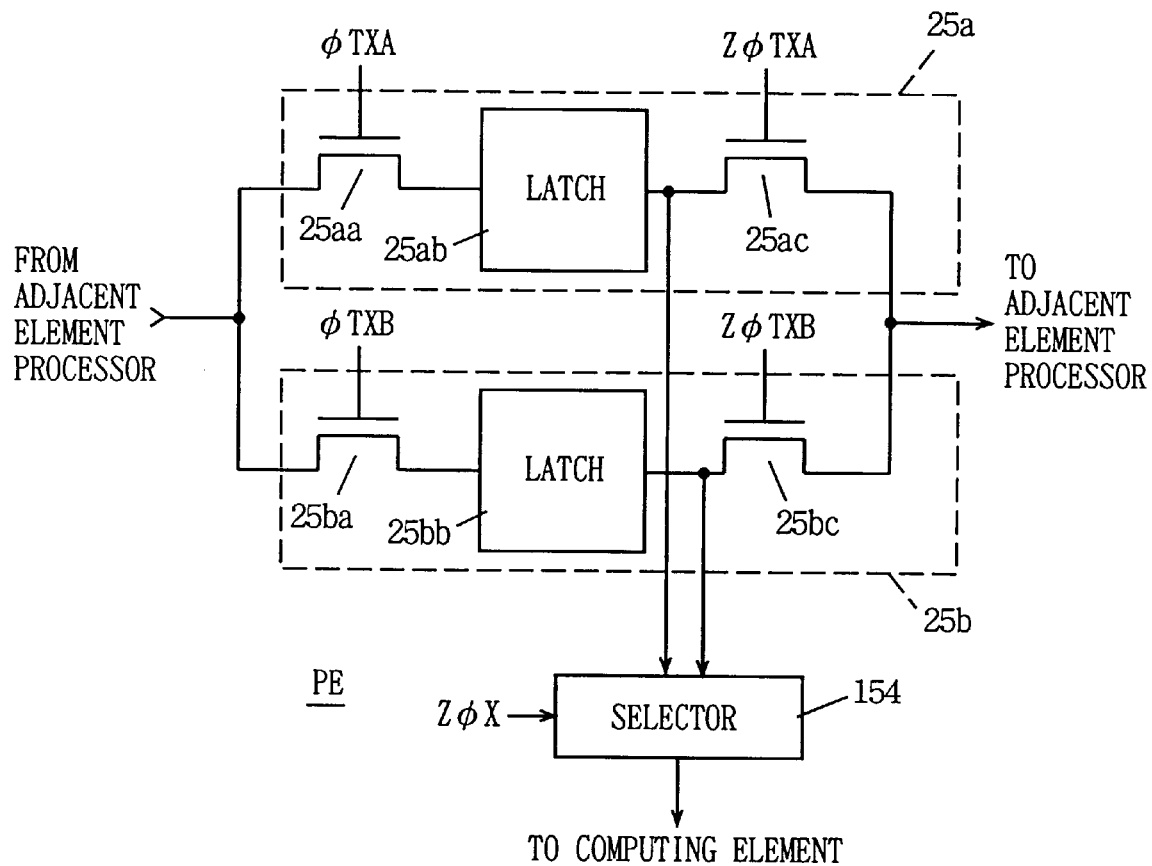
FIG. 50 illustrates the structure of each element processor in a second modification of the motion vector detection unit according to the embodiment 7 of the present invention.

FIG. 50 illustrates the structure of a second modification of the embodiment 7 of the present invention. This figure shows the structures of TA and TB registers 25a and 25b for storing template block pixel data in a single element processor PE. The remaining structure is identical to that shown in FIG. 46 or 49, and corresponding parts are denoted by the same reference numerals.

Referring to FIG. 50, the TA register 25a includes a transfer gate 25aa which conducts in response to a transfer clock signal φTXA for transmitting template block pixel data supplied from a downstream adjacent element processor or an input part, a latch 25ab for latching the template block pixel data supplied through the transfer gate 25aa, and a transfer gate 25ac which conducts in response to a transfer clock signal ZφTXA for transmitting the pixel data stored in the latch 25ab to an upstream adjacent element processor or an output part.

The TB register 25b includes a transfer gate 25ba for transmitting template block pixel data supplied from the downstream adjacent element processor or the input part in response to a transfer clock signal φTXB, a latch 25bb for latching the pixel data supplied from the transfer gate 25ba, and a transfer gate 25bc for transmitting the pixel data latched by the latch 25bb to the upstream adjacent element processor or the output part in response to a transfer clock signal ZφTXB.

The transfer gates 25aa and 25ba are connected to receive the pixel data from the adjacent element processor or the input part in common, while the transfer gates 25ac and 25bc are coupled to an output node in common. Thus, a template block pixel data transfer path between the element processors is singularized, whereby a wiring occupying area can be reduced.

A selector 154 selects the pixel data latched by the latch 25*ab* or 25*bb* in accordance with a selection control signal ZφX and supplies the selected one to a computing element (a subtracter and an absolute circuit). The selector 154 selects the latch data of the latch 25*ab* when the selection control signal ZφX is at a low level, while selecting the pixel data latched by the latch 25*bb* when the selection control signal ZφX is at a high level.

The TA and TB registers 25*a* and 25*b* shown in FIG. 50 are essentially shift registers. Input parts of these registers 25*a* and 25*b* are interconnected with each other, while output parts thereof are also interconnected with each other. The transfer clock signals φTXA and ZφTXB or φTXB and ZφTXB are supplied only to the register for loading the template block pixel data. When latched pixel data is operated, both of the transfer clock signals φTXB and ZφTXB or φTXA and ZφTXA are brought into low levels of inactive states, and the internal latch is isolated from the exterior of the register. Thus, it is possible to prevent a template block pixel data transfer operation of one register from influencing the pixel data stored in the other register.

In the structure shown in FIG. 50, one of the TA and TB registers 25*a* and 25*b* transfers pixel data in accordance with the transfer clock signal φTXA or φTXB (see FIG. 47). Thus, merely registers having shift register structures are employed and it is not necessary to provide a multiplexer and a selector for switching the transfer paths for the template block pixel data in the element processor, whereby the scale of the element processor can be further reduced.

Figure 51:
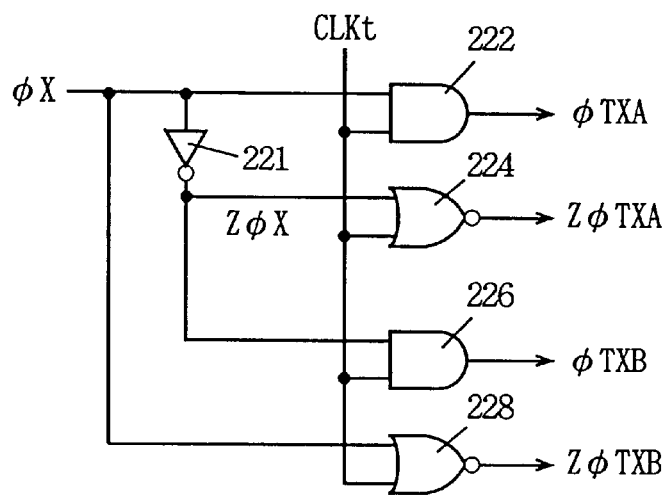
FIG. 51 schematically illustrates the structure of a template block pixel data transferring clock signal generation part employed in the embodiment 7 of the present invention.

FIG. 51 illustrates the structure of a transfer clock generation part included in the control unit 210 shown in FIG. 48. Referring to FIG. 51, the transfer clock generation part includes an invertor 221 receiving the connection switching signal φX, an AND circuit 222 receiving the connection control signal φX and a clock signal CLKt, a NOR circuit 224 receiving an output signal ZφX from the invertor 221 and the clock signal CLKt, and a NOR circuit 228 receiving the switching control signal φX and the clock signal CLKt. The AND circuit 222 outputs the transfer clock signal φTXA, and the NOR circuit 224 outputs the complementary transfer clock signal ZφTXA respectively. The AND circuit 226 outputs the transfer clock signal φTXB, and the NOR circuit 228 outputs the complementary transfer clock signal ZφTXB respectively.

Figure 52:
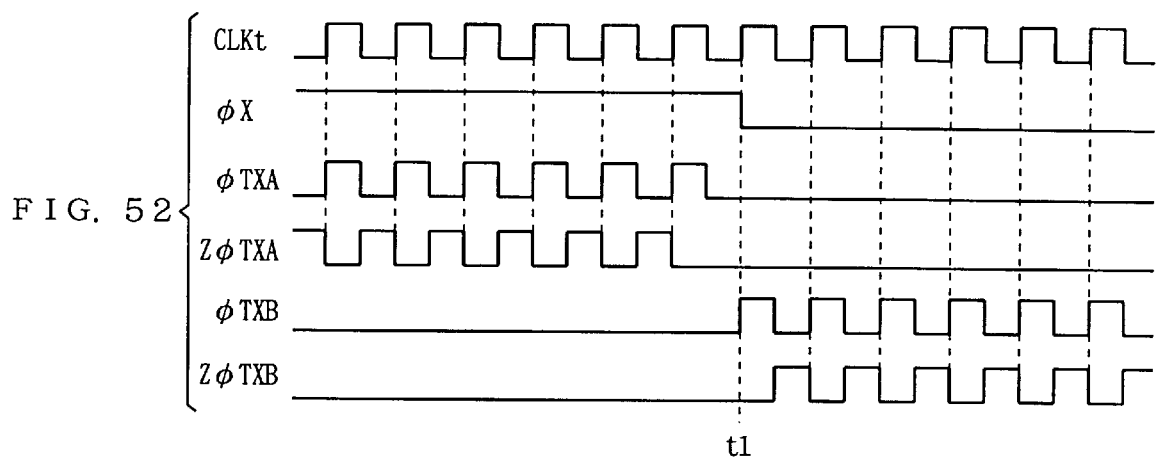
FIG. 52 is a timing chart representing the operation of the transfer clock signal generation part shown in FIG. 51.

The operation of the transfer clock generation part shown in FIG. 51 is now described with reference to a timing chart shown in FIG. 52.

Before a time t1, the connection control signal φX is at a high level, and the complementary connection control signal ZφX is at a low level. The AND circuit 222 is enabled, and outputs the transfer clock signal φTXA in accordance with the clock signal CLKt. On the other hand, the NOR circuit 224 serves as an invertor since the output signal ZφX of the invertor 221 is at a low level, and inverts the clock signal CLKt for outputting the complementary transfer clock signal ZφTXA. As to the AND circuit 226, the output signal ZφX of the invertor 221 is at a low level and the transfer clock signal φTXB for the TB register 25*b* is maintained at a low level. Similarly, the connection control signal φX is at a high level and the NOR circuit 228 maintains the complementary transfer clock signal ZφTXB at a low level. In this state, therefore a motion vector search operation is performed in accordance with the pixel data stored in the TB register 25*b*. In the TA register 25*a*, the transfer gates 25*aa* and 25*ac* alternately conduct to successively shift the template block pixel data.

The connection control signal φX falls to a low level at a time t1, whereby the AND circuit 222 and the NOR circuit 224 are disabled and both of the transfer clock signals φTXA and ZφTXA for the TA register 25*a* are brought into low levels. Thus, the transfer operation for the template block pixel data through the TA register 25*a* is stopped.

On the other hand, the AND circuit 226 is enabled since the signal ZφX from the invertor 221 goes high, and generates the transfer clock signal φTXB for the B register 25*b* in accordance with the clock signal CLKt. The NOR circuit 228 serves as an invertor in accordance with the low-level connection control signal φX, inverts the clock signal CLKt and outputs the transfer clock signal ZφTXB. Thus, the template block pixel data is transferred through the TB register 25*b*.

The connection control signal φX, which is switched every motion vector detecting cycle as to a single template block, is formed by a counter, for example. Generation of the clock signal CLKt, which is employed for transferring the template block pixel data, is stopped when the template block pixel data is stored in one of the TA and TB registers 25*a* and 25*b* in a single processing time. As to the structure for generating the clock signal CLKt, clock cycles may be counted by the number of pixels included in the template block from one processing period start period for stopping generation of the clock signal CLK employed for transferring the search window block pixel data, for stopping the generation in accordance with count-up.

According to the embodiment 7 of the present invention, as hereinabove described, two registers for storing the template block pixel data are provided in parallel with each other so that next template block pixel data is loaded in the first register during a motion vector search operation employing the second register, whereby a template block pixel data load time can be apparently eliminated and motion vector detection can be performed at a higher speed, in addition to the effect provided by the embodiment 1.

Embodiment 8

Figure 53:
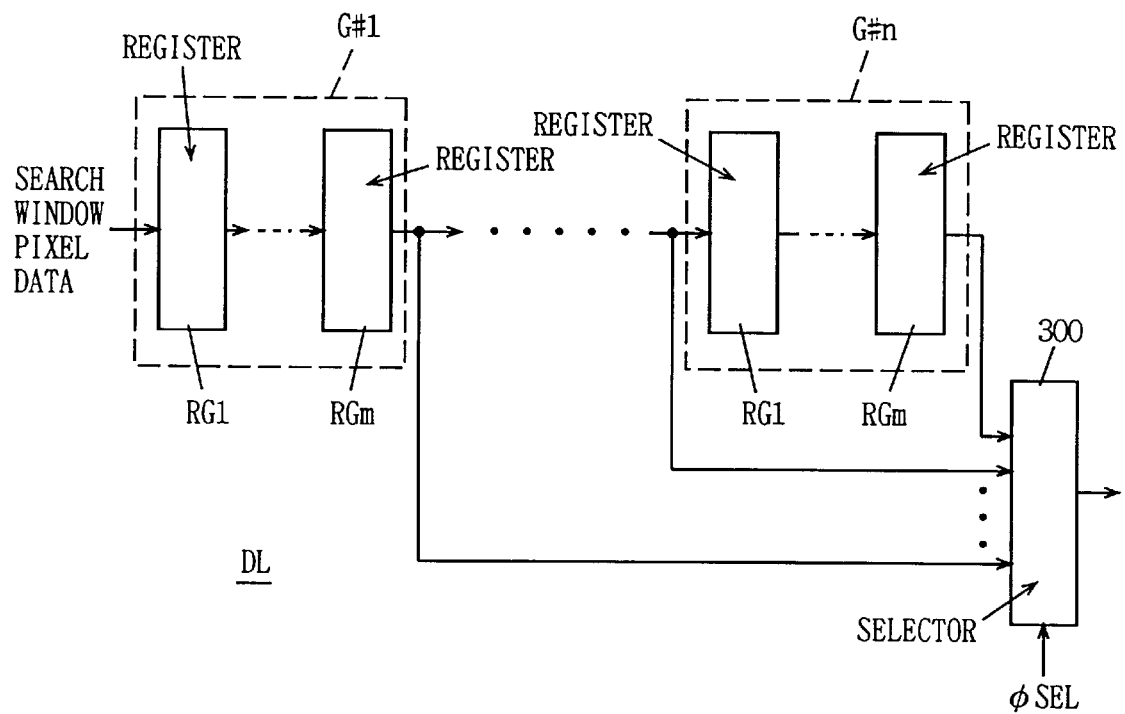
FIG. 53 schematically illustrates the structure of a data buffer employed for a motion vector detection unit according to an embodiment 8 of the present invention.

FIG. 53 illustrates the structure of a main part of a motion vector detection unit according to an embodiment 8 of the present invention. This figure shows only the structure of each data buffer DL included in a processor array. As to the remaining structure, the structure of any of the embodiments 1 to 7 is employed.

Referring to FIG. 53, the data buffer DL includes a plurality of (m by n) cascaded registers RG each having a data transfer function. The registers are divided into groups each of m registers RG1-RGm, so that the data buffer DL includes n register groups G#1 to G#n. Each of the register groups G#1 to G#n includes cascaded registers RG1 to RGm. These register groups G#1 to G#n transmit search window pixel data along one direction, in accordance with a clock signal (not shown).

The data buffer DL further includes a selector 300 for selecting any one of outputs of the register groups G#1 to G#n in accordance with a selection signal φSEL. Output pixel data of the data buffer DL is outputted from this selector 300, and transferred to a selector SLb in this linear processor array and an input part of a data buffer in an upstream adjacent linear processor array. The selection signal φSEL is supplied from the exterior.

The stage number of the registers in the data buffer DL, i.e., the number of stored pixel data, can be changed by selecting the output of any of the register groups G#1 to G#n through the selector 300. When the output of the register group G#1 is selected, for example, the register stage number of the data buffer DL is m, so that search window pixel data can be stored by m pixels. The number of pixel data stored in the data buffer DL determines the vertical size of a side window block. Therefore, the size of the side window block can be changed by changing the register stage number of the data buffer DL, and the vertical range of a search area can be changed accordingly. Thus, it is possible to readily cope with change of the search area size depending on the specification. The number of the registers included in each register group and that of the register groups can be arbitrarily selected.

(Modification 1)

Figure 54:
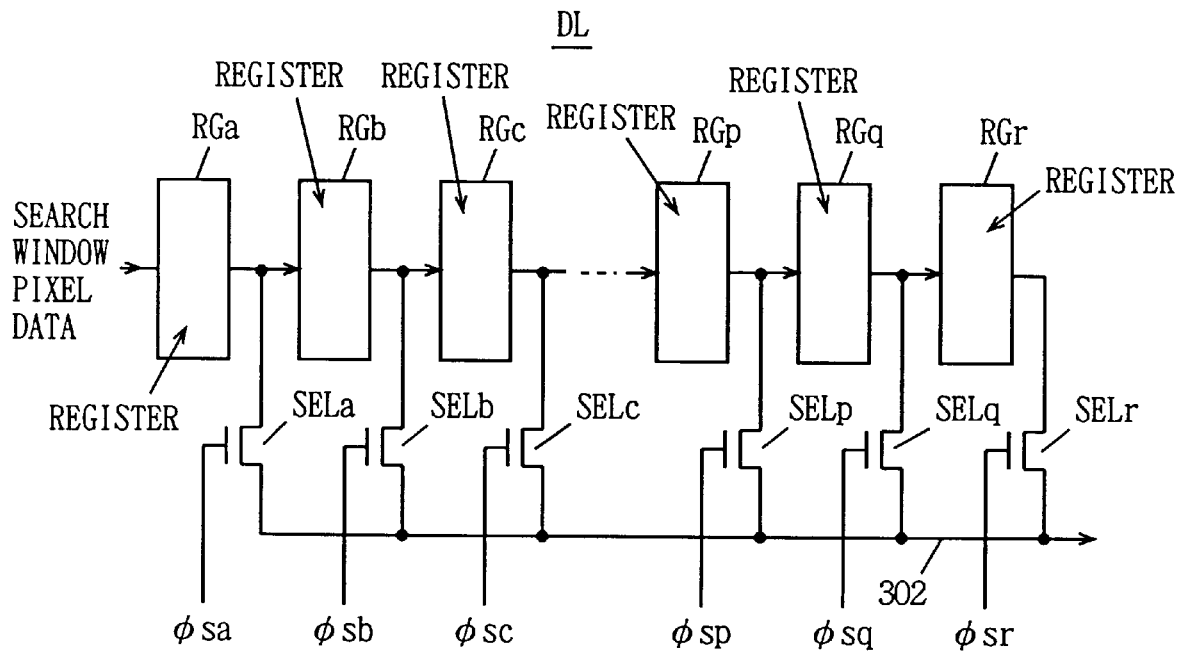
FIG. 54 illustrates the structure of a modification of the data buffer in the motion vector detection unit according to the embodiment 8 of the present invention.

FIG. 54 illustrates the structure of a first modification of the data buffer DL. Referring to FIG. 54, the data buffer DL includes a plurality of cascaded registers RGa to RGr. It is possible to transfer search window pixel data through these registers RGa to RGr, in response to a transfer clock signal (not shown). The registers RGa to RGr are provided at output parts thereof with selector gates SELa to SELr, which conduct in response to selection signals $\phi$sa to $\phi$sr respectively. These selection signals $\phi$sa to $\phi$sr are supplied from the exterior of the unit, so that any one is activated. The corresponding selector gate is brought into a conducting state in response to the activated selection signal, so that search window pixel data outputted from the corresponding register is transmitted to a data line 302. This data line 302 is supplied to the lowermost element processor of this linear processor array through a selector SLb, and connected to an initial register (RGa) of an adjacent upstream data buffer.

According to the structure shown in FIG. 54, the register stage number of the data buffer DL can be set in units of registers in accordance with the selection signals $\phi$sa to $\phi$sr, whereby it is possible to more flexibly accommodate the change of a search area.

According to the embodiment 8 of the present invention, as hereinabove described, the register stage number of the data buffer is changeable, whereby the vertical size of a side window block can be changed and a vertical search range for a motion vector can be changed accordingly, the degree of freedom with respect to the size of a search area in structuring of a coding system is remarkably improved, and the motion vector can be efficiently detected by deciding the optimum search area.

Embodiment 9

Figure 55:
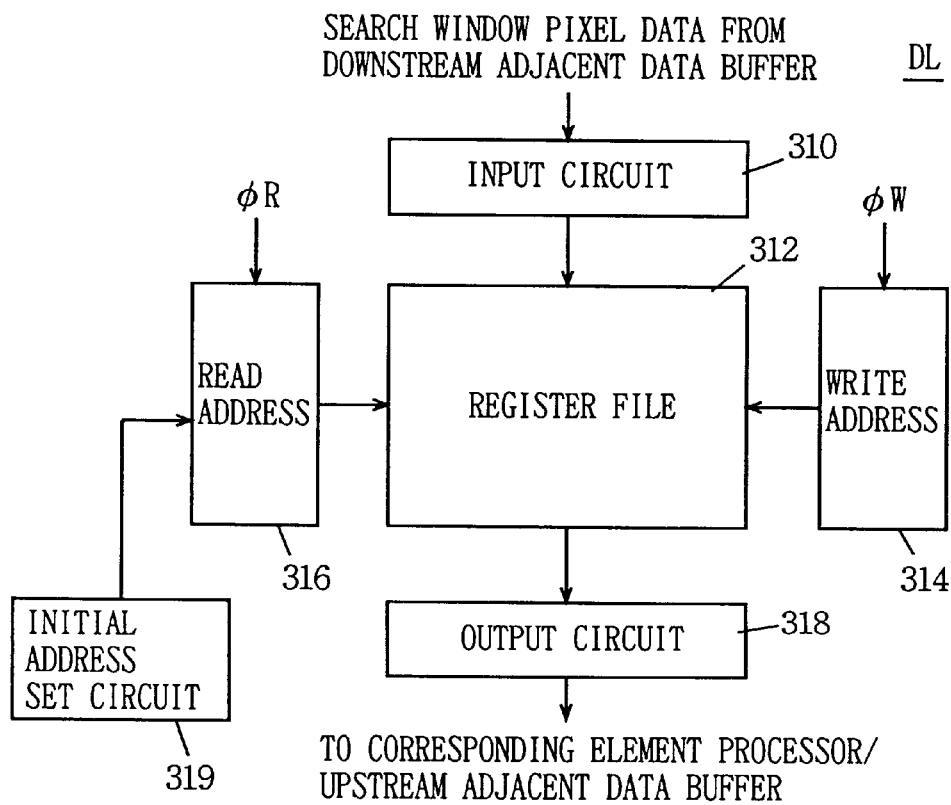
FIG. 55 schematically illustrates the structure of a data buffer in a motion vector detection unit according to an embodiment 9 of the present invention.

FIG. 55 illustrates the structure of a main part of a motion vector detection unit according to an embodiment 9 of the present invention. This figure shows the structure of a single data buffer DL included in a processor array.

Referring to FIG. 55, the data buffer DL includes an input circuit 310 for inputting search window pixel data supplied from a downstream adjacent data buffer or an input part, a register file 312 having a plurality of files for storing the search window pixel data supplied from the input circuit 310 respectively, a write address generation circuit 314 for generating a write address pointer in data writing in the register file 312, a read address generation circuit 316 for generating a read address pointer employed in data reading from the register file 312, an output circuit 318 for reading the content of a file of the register file 312 specified by the read address generation circuit 316, and an initial address set circuit 319 for setting the initial address of the read address generation circuit 316.

The register file 312 stores one pixel data in one file formed by an SRAM (static random access memory) cell, for example. The write and read address generation circuits 314 and 316 successively increment or decrement addresses one by one in accordance with write and read clock signals $\phi$W and $\phi$R respectively.

In the structure of the data buffer DL, data writing is executed after data reading is performed (in one operation cycle), in order to prevent pixel data to be read from being changed by newly supplied pixel data, when read and write addresses are set to specify the same address). The operation of the data buffer DL shown in FIG. 55 is now described with reference to FIG. 56.

Referring to FIG. 56, the file number of the register file 312 is eight and addresses 0 to 7 are allocated to the eight files respectively, as an example. The initial address set circuit 319 specifies the address 4 as the initial address of the read address generation circuit 316.

The write address generation circuit 314 successively specifies write addresses (write address pointers) starting from the address 0, in accordance with the write clock signal $\phi$W. In accordance with the write address pointers from the write address generation circuit 314, the input circuit 310 writes supplied search window pixel data in the corresponding files in the register file 312. Thus, inputted search window pixel data SY1, SY2, . . . are successively written in the addresses 0, 1, . . . in the register file 312.

On the other hand, the read address generation circuit 316 successively specifies addresses starting from the initial address 4 set by the initial address set circuit 319 in accordance with the read clock signal $\phi$R. When the read address pointer generated by the read address generation circuit 316 becomes zero, pixel data SY1 stored in the address 0 of the register file 312 is read by the output circuit 318. While the read address pointers are 4, 5, 6 and 7, the output circuit 318 outputs invalid data, since this address area stores no valid pixel data. Thereafter pixel data SY2, SY3, . . . stored in the register file 312 are successively read in accordance with the read clock signal $\phi$R.

In this structure, input search window pixel data is outputted in a delay by five clock cycles. Thus, it is possible to change the delay time of the data buffer DL, the number of valid search window pixel data stored in the data buffer DL and the vertical size of a search area (search window) by changing the initial read address by the initial address set circuit 319. Description is now specifically made on the point that the vertical size of the search area is changed by changing the delay time of the data buffer DL.

Figure 57A:
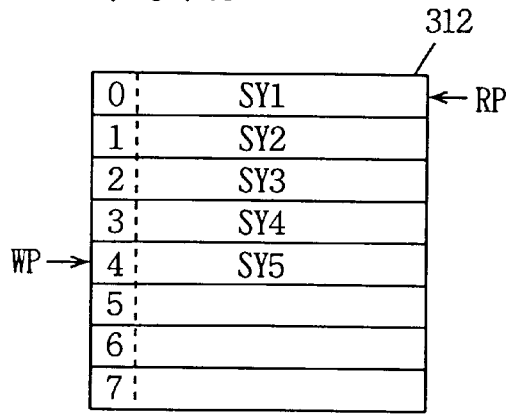
FIGS. 57A to 57E illustrate the operation of the data buffer shown in FIG. 55.

Consider that a read address pointer RP indicates the address 0 when a write address pointer WP indicates the address 4, as shown in FIG. 57A. In this state, the search window pixel data SY1 to SY5 are stored in the addresses 0 to 4 in the register file 312 respectively.

Figure 57B:
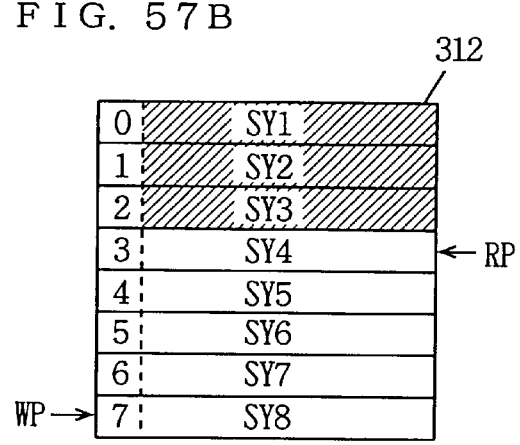

As shown in FIG. 57B, the read address pointer RP indicates the address 3 when the write address pointer WP indicates the address 7. In this state, the pixel data SY1 to SY3 stored in the files of the addresses 0, 1 and 2 have already been read. In case of reading the pixel data SY4, therefore, the pixel data SY4 to SY8 are stored in the register file 312 as valid pixel data to be read subsequently.

Figure 57C:
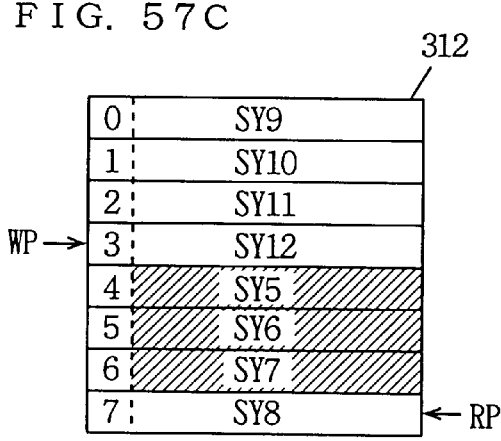

As shown in FIG. 57C, the read address pointer RP indicates the address 7 when the clock cycle further advances and the write address pointer WP indicates the address 3. In this state, the pixel data SY5 to SY7 stored in the addresses 4 to 6 have already been read and are consumed pixel data. Also in this state, the pixel data SY8 to SY12 stored in the register file 312 are valid pixel data.

Figure 57D:
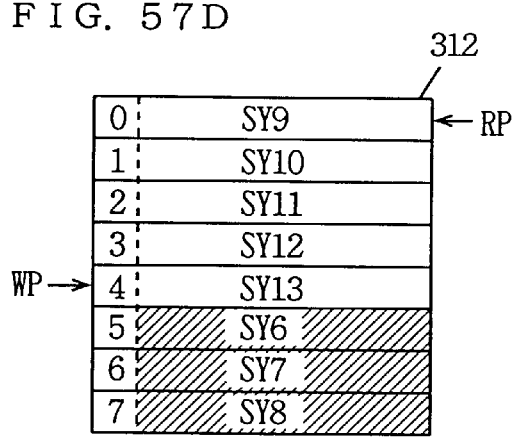

In a next cycle, the write address pointer WP specifies the address 4, and the read address pointer RP specifies the address 0, as shown in FIG. 57D. In this state, the pixel data SY8 is read and the pixel data SY3 is stored in the file of the address 4, whereby the pixel data SY9 to SY13 are valid pixel data.

Namely, while the input search window pixel data are stored in all files (eight files in this embodiment) in the register file 312, the number (five in this embodiment) of valid search window pixel data is smaller than that of all files. The number of valid search window pixel data stored in the register file 312 is (maximum address—initial read address pointer) +2, because it is equal to the number of the pixel data before reading of the pixel data by the read address pointer RP.

Figure 57E:
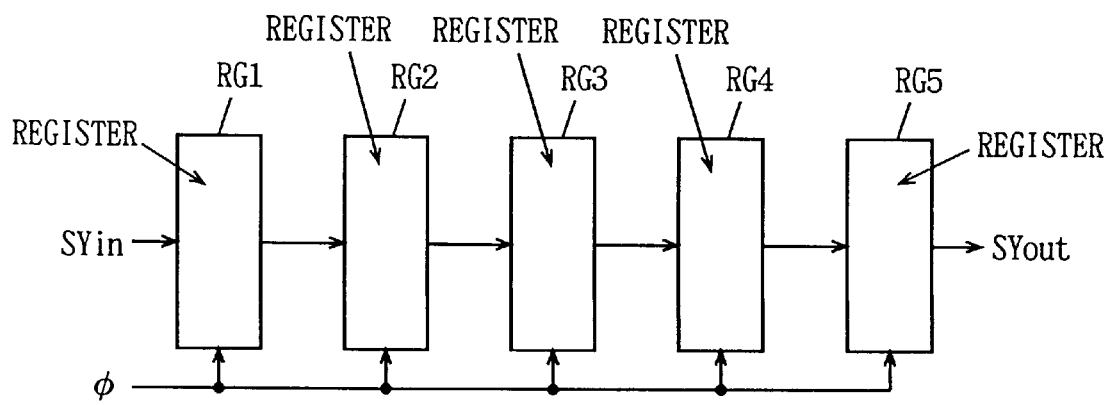
Figure 58:
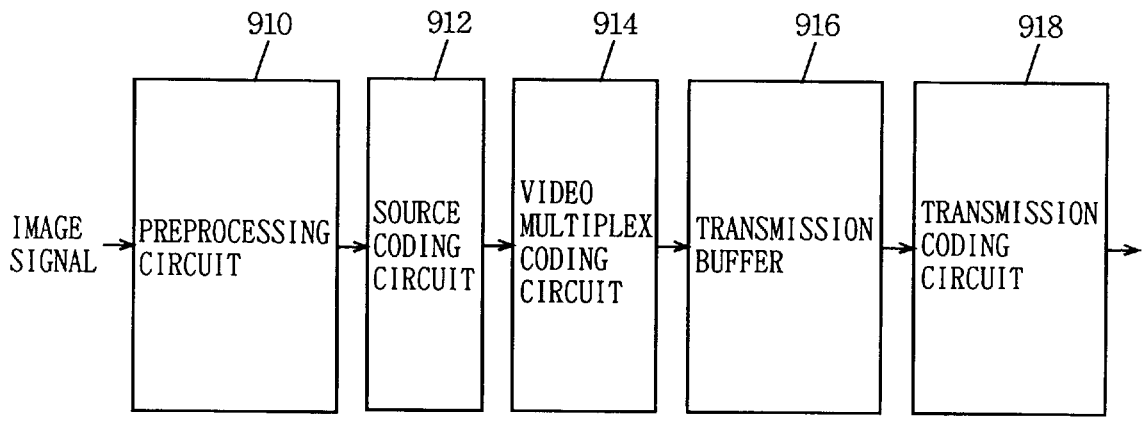
FIG. 58 schematically illustrates the overall structure of a conventional image coding circuit.
Figure 59:
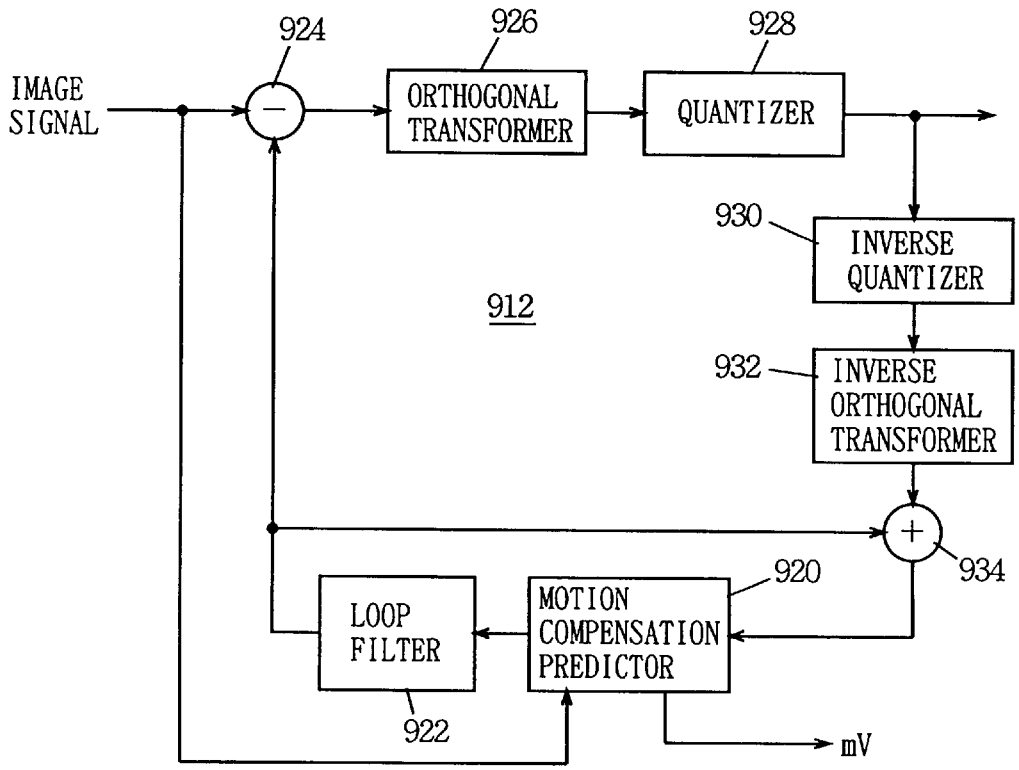
FIG. 59 schematically illustrates the structure of a source coding circuit shown in FIG. 58.
Figure 60A:
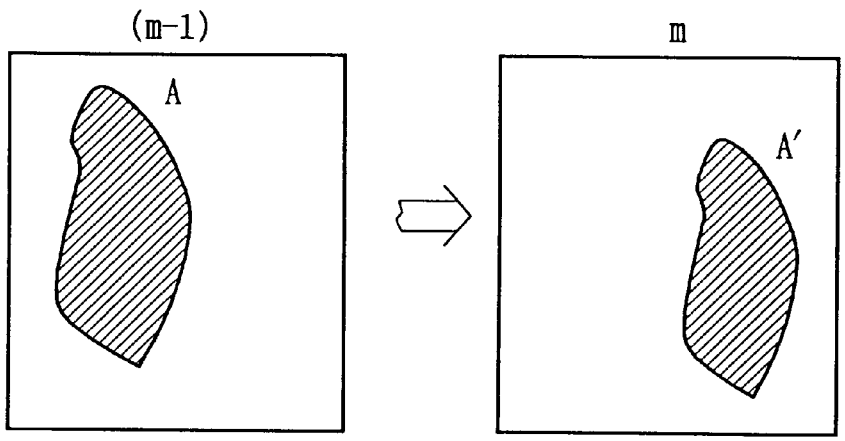
FIGS. 60A and 60B illustrate an image motion compensation operation.
Figure 60B:
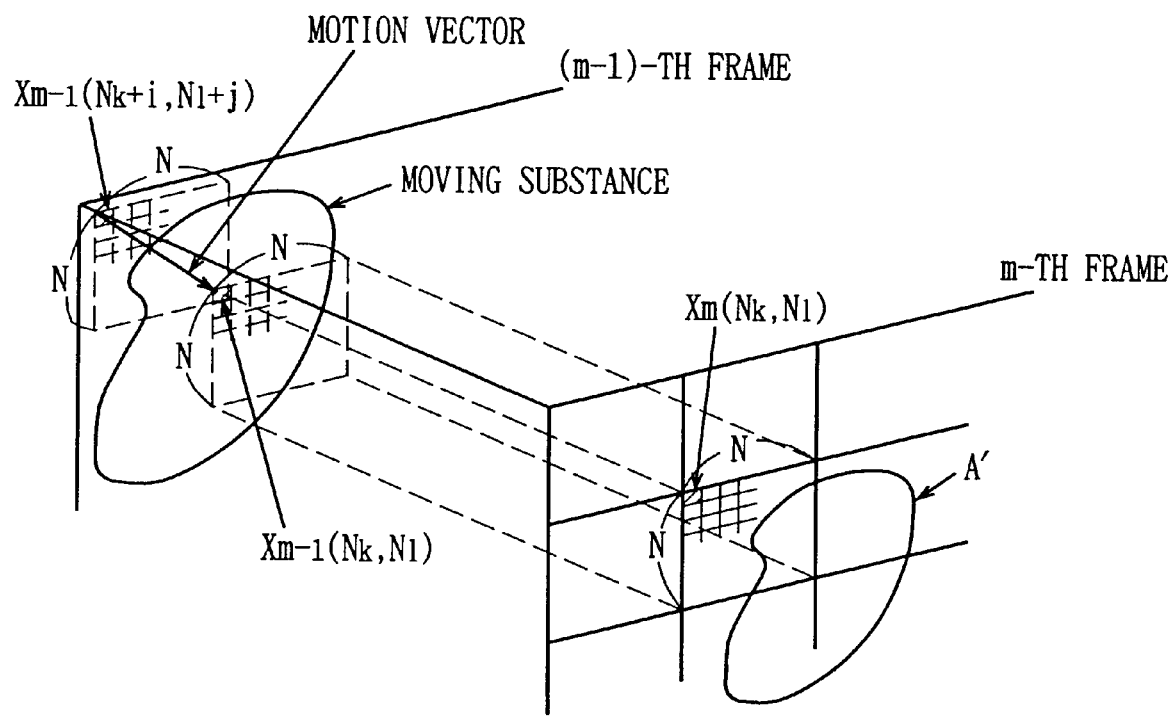
Figure 61:
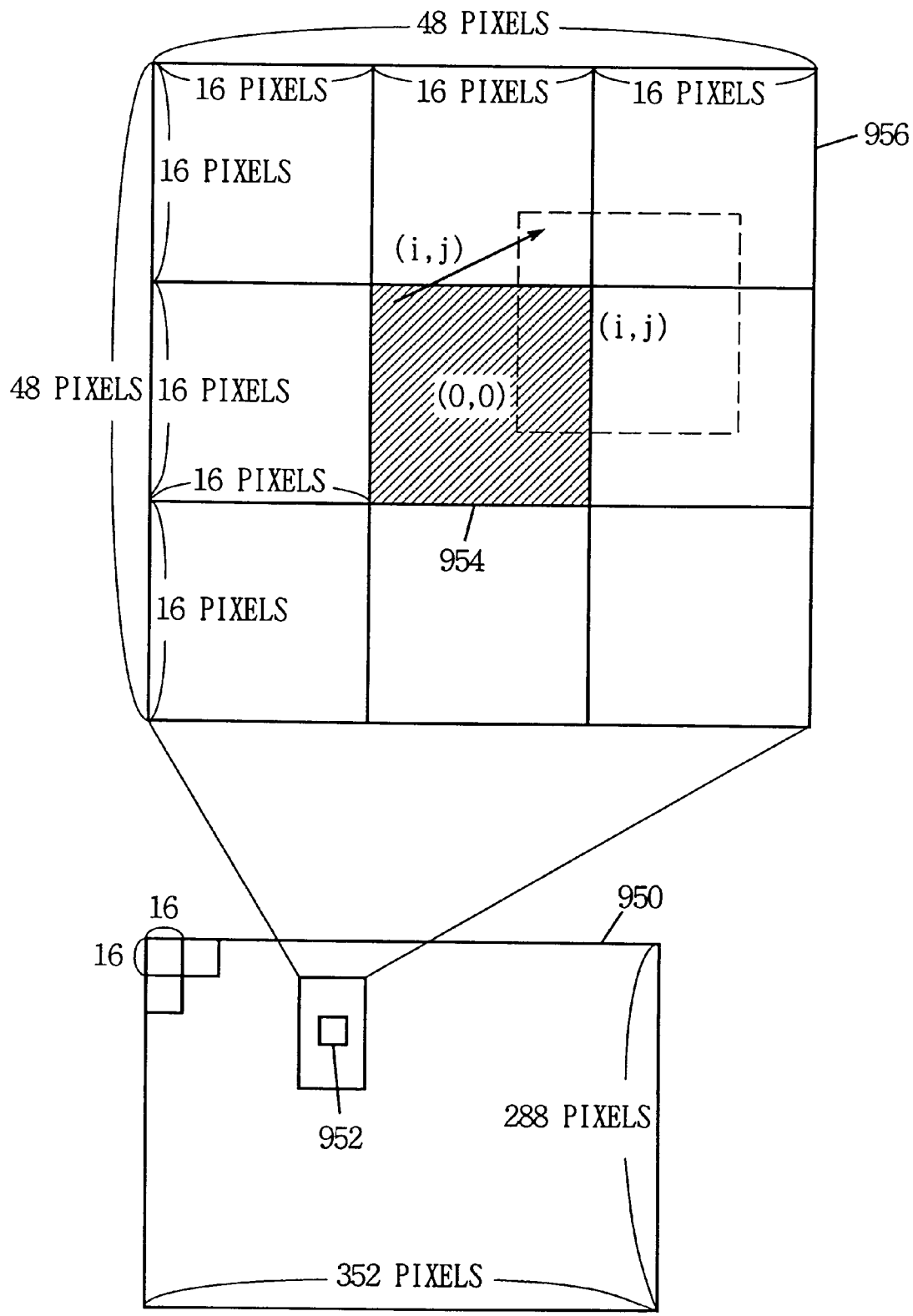
FIG. 61 illustrates arrangement of a search area and a template block and the relation of a motion vector in case of performing motion compensation in accordance with block matching.
Figure 62:
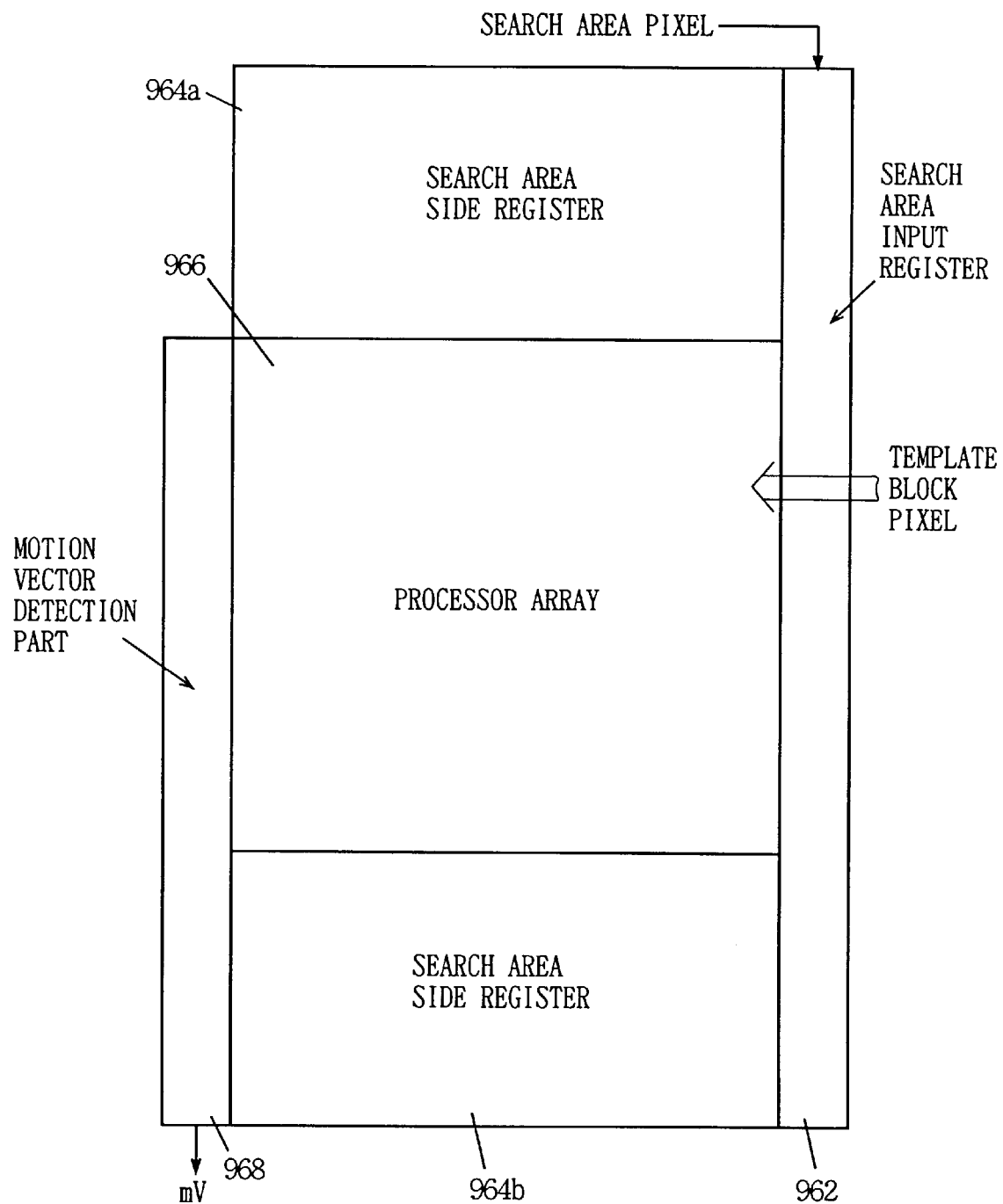
FIG. 62 schematically illustrates the overall structure of a conventional motion vector detection unit.
Figure 63:
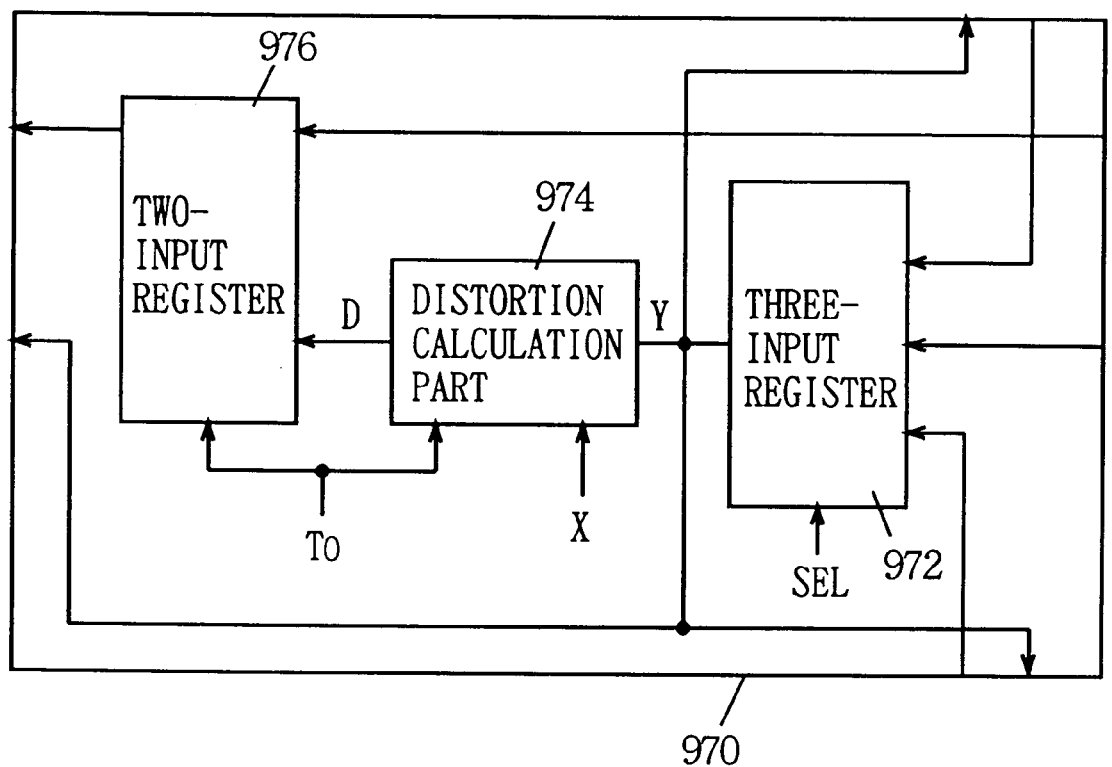
FIG. 63 schematically illustrates the structure of each element processor included in a processor array shown in FIG. 62.
Figure 64:
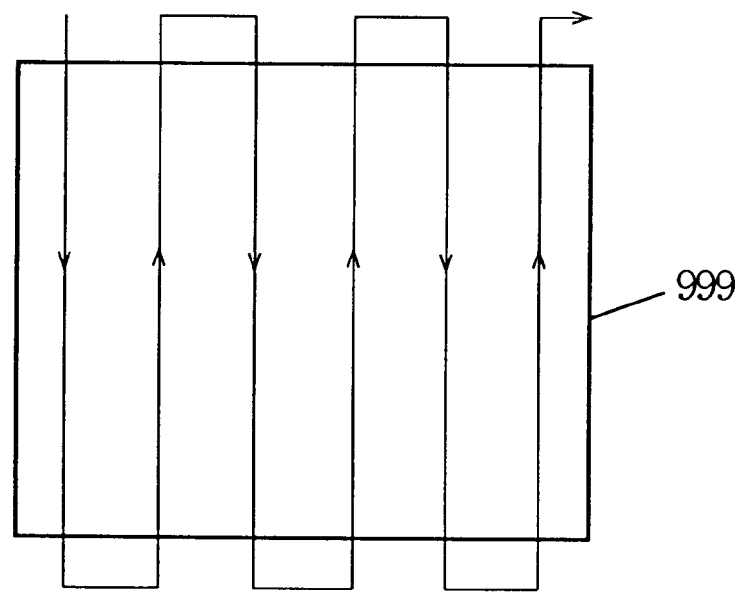
FIG. 64 illustrates scanning of a template block and a search window in the motion vector detection unit shown in FIG. 62.
Figure 65:
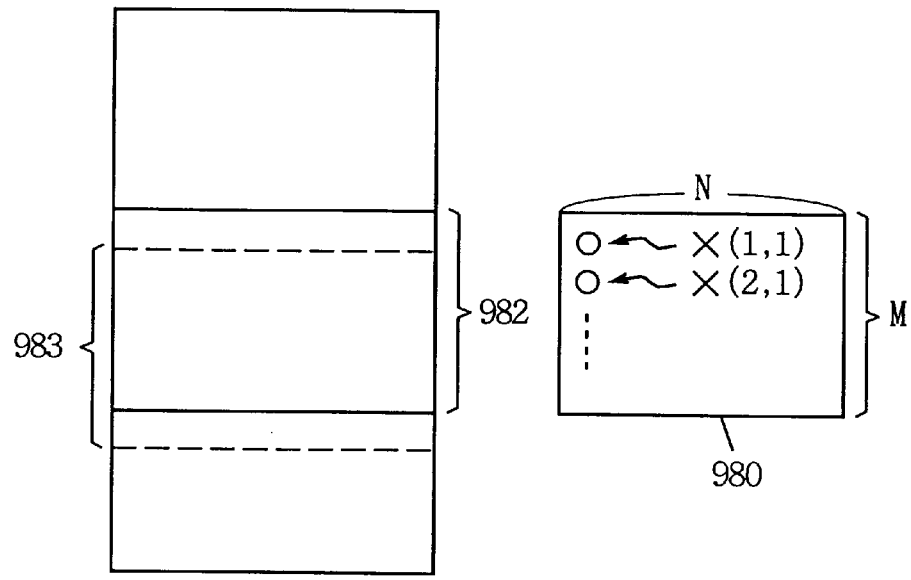
FIG. 65 illustrates the operation of the motion vector detection unit shown in FIG. 62.
Figure 66:
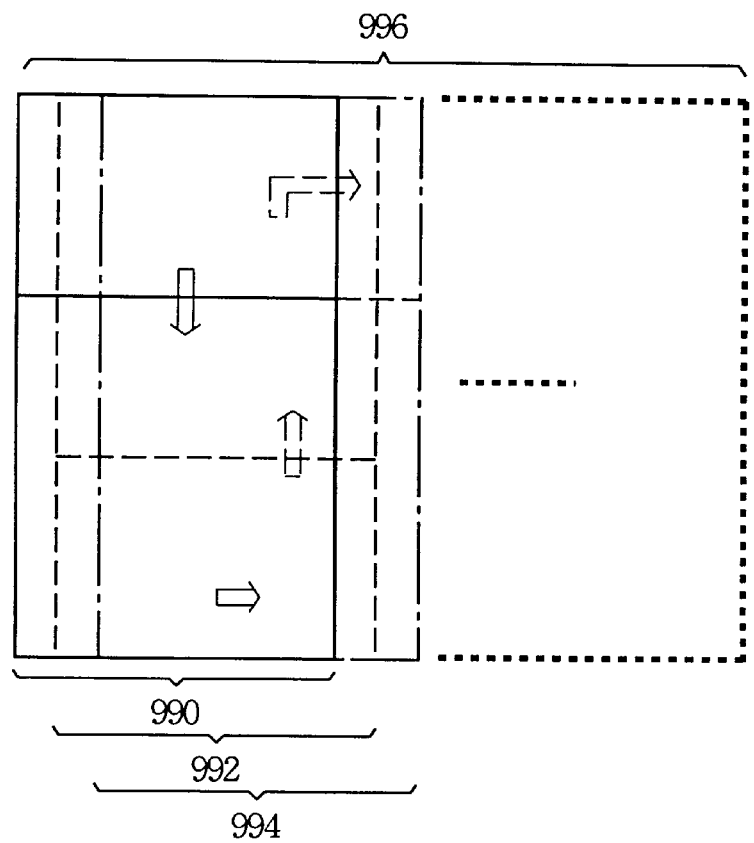
FIG. 66 illustrates the operation of the motion vector detection unit shown in FIG. 62.

Therefore, this register file 312 is equivalent in structure to a shift register cascade-connecting five stages of registers RG1 to RG5 with each other, as shown in FIG. 57E. When the initial register RG1 stores pixel data SY5 in the register structure shown in FIG. 57E, the registers RG2 to RG5 store pixel data SY4 to SY1 respectively. The registers RG1 to RG5 output the data stored therein in the same cycle as this write cycle, while these registers incorporate no supplied pixel data. When the five stages of registers RG1 to RG5 transfer pixel data in accordance with a clock signal φ, therefore, input pixel data SYin is outputted as pixel data SYout after a lapse of four clock cycles. When the registers RG1 to RG5 are formed to incorporate supplied pixel data after transferring stored data, the number of these registers becomes four, to similarly provide a delay by four clock cycles. The data buffer DL stores pixel data of the side window block of the search window. The vertical size of the side window block is equal to that obtained by dividing the delay time provided by the data buffer DL by the clock cycle number. Thus, the pixel data is written and read in the same cycle, and therefore the vertical size of the side window block is four pixels. The number becomes smaller by one than the stage number of the registers shown in FIG. 57E to be four stages, and in case of shift registers performing transfer/incorporation, the number of valid pixel data is equal to the number of the register stages. Thus, it is possible to change the vertical size of the side window block by changing the initial read address pointer of the register file 312 set by the initial address set circuit 319, thereby adjusting the vertical length of the search window in response. Thus, it is possible to flexibly accommodate files of an arbitrary search area.

Pixel data is generally formed by a plurality of bits (four bits, for example). In case of employing a shift register, it is necessary to provide 4-bit width registers in parallel with each other for a single pixel and a clock signal line for controlling a transfer operation for the registers must be arranged in each linear processor array, and there is a possibility of congestion of interconnection lines. When the register file is employed as the data buffer DL as shown in the embodiment 9, however, pixel data are independently read/written in each linear processor array, whereby it is not necessary to lay out an interconnection line of a clock signal for transfer control over all linear processor arrays, and increase of the occupying area of data buffer can be suppressed by employing SRAM cells. Thus, it is possible to implement a motion vector detection unit of a small occupying area which can readily accommodate change of the vertical size of the search area.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A motion vector detection unit for obtaining a motion vector employed for motion compensation predictive coding through block matching of a current screen image and a reference screen image, said motion vector detection unit comprising:

a plurality of first registers, arrayed in a matrix of rows and columns, and arranged in correspondence to pixels of a template block of said current screen image to be subjected to motion vector detection, for storing corresponding template block pixel data;

a plurality of second registers arranged in correspondence to respective ones of said plurality of first registers in said matrix for storing pixel data of a first reference block in a search area of said reference screen image related to said template block;

a plurality of third registers being provided in correspondence to respective ones of said plurality of first registers in parallel with said plurality of second registers for storing pixel data of a second reference block in said search area of said reference screen image related to said template block;

a plurality of data buffers arranged in correspondence to columns of said matrix and interconnected with each other such that input parts and outputs parts thereof form a one-dimensional array for transferring pixel data along one direction, for storing pixel data of said search area other than those of said reference blocks;

selective coupling means arranged on said columns respectively for coupling initial stage registers of either said second or third registers of corresponding columns with the output parts of said data buffers of the corresponding columns while coupling final stage registers of either said second or third registers of the corresponding columns with initial stage registers of either said third or second registers of columns adjacent to said corresponding columns respectively;

a plurality of operation means provided in correspondence to said first registers and sets of said second and third registers for performing prescribed operation on pixel data stored in corresponding registers to calculating components of evaluation values serving as candidates for said motion vector;

evaluation value calculation means for receiving output signals of said plurality of operation means for performing prescribed arithmetic processing on the received output signals and calculating evaluation values of said reference block, said search area defined by predetermined horizontal and vertical vector ranges, and control means for switching the connection path of said selective coupling means in units of said horizontal vectors and controlling connection for performing data transfer through interconnection over said columns of said second and third registers from said horizontal vector updating up to transfer of all pixel data of said fist reference block to said adjacent columns while supplying pixel data of registers being coupled to corresponding data buffers to said operation means among said second and third registers.

2. The motion vector detection unit according to claim 1, wherein said selective coupling means includes a plurality of first select gates provided corresponding to respective columns of the sets of the second and third registers and between the output parts of corresponding data buffers and the initial stages of the corresponding columns of the sets of the second and third registers, for selectively transferring output pixel data of the corresponding data buffers or applied search window pixel data, and a plurality of second select gates provided corresponding to respective columns of the sets of second and third registers and between final stages of the corresponding columns of the sets of the second and third registers and upstream adjacent first select gates, for selectively transferring output pixel data from the corresponding columns of the second registers and the corresponding columns of the third registers, and said control means includes means for causing said plurality of second select gates to select the output pixel data from the corresponding data buffers for application to the corresponding second register columns and to apply pixel data received from downstream adjacent second select gates to corresponding third register columns, and means for causing the second select gates to select pixel data received from the corresponding second register columns.

3. The motion vector detection unit according to claim 2, wherein each of said plurality of operation means includes a selector for selecting pixel data of corresponding second and third registers in a same manner as the selection of the second select gates.

4. The motion vector detection unit according to claim 2, wherein said control means includes means for switching the connection paths of the first and second select gates every updating of horizontal vector component.

5. The motion vector detection unit according to claim 2, wherein said control means includes means for transferring pixel data through the second and third registers in response to a clock signal defining a cycle of calculating an evaluation value, and means for stopping the transfer of pixel data through the second registers in response to storage of pixel data of a search window block.

6. The motion vector detection unit according to claim 5, wherein each of the second and third registers comprises a shift register for latching and transferring applied pixel data in response to said clock signal.

7. The motion vector detection unit according to claim 1, wherein each of said first registers comprises a shift register for latching and transferring pixel data, and said plurality of first registers are coupled to form a linear array upon transference of pixel data of the template block.

8. The motion vector detection unit in accordance with claim 1, further comprising:

a plurality of fourth registers provided in parallel with said plurality of first registers respectively for storing pixel data of a template block different from said template block, selection means for alternately coupling said plurality of first registers and said plurality of fourth registers to corresponding operation means every motion vector detection cycle, and means for writing said pixel data of said another template block in registers being not selected by said selection means of said first and fourth registers.

9. The motion vector detection unit in accordance with claim 1, further comprising:

at least a set including a plurality of fourth registers provided in parallel with said plurality of first registers respectively for storing pixel data of different template blocks, and at least a set of second operation means, provided in parallel with said operation means, in correspondence to said set of said plurality of fourth registers for receiving the pixel data stored in corresponding fourth registers and corresponding pixel data of either said second or third registers and performing said prescribed arithmetic processing, each of the second operation means receiving a same common pixel data as the first mentioned operation means from said either said second or third registers.

10. The motion vector detection unit in accordance with claim 9, further including means provided in correspondence to said set of second operation means for receiving outputs of corresponding set of said second operation means in parallel and calculating evaluation values.

11. The motion vector detection unit in accordance with claim 1, wherein said evaluation value calculation means includes means for receiving output signals of said plurality of operation means in parallel with each other and simultaneously calculating evaluation values serving as motion vector candidates corresponding to a plurality of predictive modes in accordance with said predictive modes.

12. The motion vector detection unit in accordance with claim 1, wherein each of said plurality of data buffers comprises a variable length data register for storing data in a first-in, first-out manner, said data register being capable of changing the number of valid storage pixel data.

13. The motion vector detection unit in accordance with claim 1, further comprising means for transmitting a first pixel data of a reference block for a horizontal vector subsequent to an updated horizontal vector in response to update of the horizontal vector component to either said second or third registers through said selective coupling means while transmitting a first pixel data of a reference block next to said first reference block for the subsequent horizontal vector to an input part of a first columns of said plurality of data registers.

* * * * *